(12) United States Patent
Ohkawa et al.

(10) Patent No.: US 7,128,953 B2
(45) Date of Patent: Oct. 31, 2006

(54) OPTICAL FILM COMPRISING SUPPORT AND POLARIZING LAYER

(75) Inventors: Atsuhiro Ohkawa, Kanagawa (JP); Hiroki Sasaki, Kanagawa (JP); Kensuke Morita, Kanagawa (JP); Ichiro Amimori, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 96 days.

(21) Appl. No.: 10/076,443

(22) Filed: Feb. 19, 2002

(65) Prior Publication Data

US 2003/0011725 A1 Jan. 16, 2003

(30) Foreign Application Priority Data

| Feb. 19, 2001 | (JP) | 2001-041766 |
| Feb. 20, 2001 | (JP) | 2001-043924 |
| Apr. 19, 2001 | (JP) | 2001-121263 |
| Apr. 19, 2001 | (JP) | 2001-121264 |
| Apr. 25, 2001 | (JP) | 2001-127969 |
| Aug. 15, 2001 | (JP) | 2001-246716 |
| Aug. 15, 2001 | (JP) | 2001-246717 |

(51) Int. Cl.
C09K 19/34 (2006.01)
G02F 1/01 (2006.01)
G02F 1/13 (2006.01)

(52) U.S. Cl. .............. 428/1.31; 428/1.1; 252/299.61; 252/299.62; 252/585; 349/96

(58) Field of Classification Search ........... 428/1.3, 428/1.31, 1.4, 1.55, 1.1; 252/299.6, 299.61, 252/299.62, 299.64, 585, 299.65, 299.66; 349/96–97
See application file for complete search history.

(56) References Cited

U.S. PATENT DOCUMENTS

| 4,685,771 | A |   | 8/1987 | West et al. |
| 4,772,885 | A | * | 9/1988 | Uehara et al. ............... 349/71 |
| 4,944,576 | A | * | 7/1990 | Lacker et al. ................ 349/94 |
| 5,672,296 | A | * | 9/1997 | Shen et al. ............ 252/299.01 |
| 5,751,388 | A | * | 5/1998 | Larson ......................... 349/96 |
| 5,783,120 | A |   | 7/1998 | Ouderkirk et al. |
| 5,825,543 | A |   | 10/1998 | Ouderkirk et al. |
| 5,867,316 | A |   | 2/1999 | Carlson et al. |
| 5,876,864 | A | * | 3/1999 | Kim et al. ................... 428/690 |
| 6,149,837 | A | * | 11/2000 | Sekine et al. ............ 252/299.6 |
| 6,163,667 | A | * | 12/2000 | Mafune ...................... 399/112 |
| 6,529,252 | B1 | * | 3/2003 | Nakao et al. ................. 349/86 |
| 6,645,397 | B1 | * | 11/2003 | Ichihashi ............... 252/299.61 |
| 6,665,042 | B1 | * | 12/2003 | Marshall et al. ............ 349/166 |
| 6,849,202 | B1 | * | 2/2005 | Sekine et al. .......... 252/299.01 |
| 2003/0137633 | A1 |   | 7/2003 | Ito et al. |

OTHER PUBLICATIONS

Nippon, Derwent Abstract 1981-48851D of JP 56057850A, May 1981.*

* cited by examiner

Primary Examiner—Rena Dye
Assistant Examiner—Sow-Fun Hon
(74) Attorney, Agent, or Firm—Buchanan Ingersoll & Rooney PC

(57) ABSTRACT

An optical film comprises a transparent support and a polarizing layer. The polarizing layer selectively transmits polarized light, and selectively reflects or scatters other polarized light. The polarizing layer contains a compound represented by the formula (I) of $Ar^1-C\equiv C-Ar^3-C\equiv C-Ar^2$. In the formula (I), each of $Ar^1$ and $Ar^2$ independently is a monovalent aromatic group, and $Ar^3$ is a divalent aromatic group.

17 Claims, 3 Drawing Sheets

OPTICAL FILM COMPRISING SUPPORT AND POLARIZING LAYER

FIELD OF THE INVENTION

The present invention relates to an optical film having a polarizing layer, which selectively transmits polarized light and which selectively reflects or scatters other polarized light. The invention also relates to a polarizing plate and a liquid crystal display utilizing the film.

BACKGROUND OF THE INVENTION

Light emitted from natural light sources such as the sun or from artificial ones such as lamps is generally non-polarized (randomly polarized). A polarizing plate can convert such non-polarized light into polarized light (linearly, circularly or elliptically polarized light). The thus-converted polarized light can be used in various optical instruments. For example, a liquid crystal display widely used nowadays is an instrument that utilizes characters of polarized light to display an image.

The term "polarizing plate" in a broad sense includes linearly, circularly and elliptically polarizing plates. However, that term usually means (in a narrow sense) only a linearly polarizing plate. Also in the present specification, the simple "polarizing plate" means a linearly polarizing plate.

A linearly polarizing plate is a basic polarizing plate. For example, a circularly polarizing plate is generally a layered composition of a linearly polarizing plate and a $\lambda/4$ plate, and also an elliptically polarizing plate is generally a layered composition of a linearly polarizing plate and a phase retarder other than the $\lambda/4$ plate. Therefore, the optical character of linearly polarizing plate is important for various kinds of polarizing plates (in a broad sense).

A linearly polarizing plate generally used is a polarizing plate of light-absorbing type made of polyvinyl alcohol. For preparing the polyvinyl alcohol polarizing plate, a polyvinyl alcohol film is stretched and made to adsorb iodine or a dichromatic dye. The thus-prepared plate has a transparent axis (polarizing axis) perpendicular to the stretching direction.

The polarizing plate of light-absorbing type transmits only a light component polarized parallel to the polarizing axis, and absorbs a perpendicularly polarized component. Therefore, usable light through the plate is theoretically 50% or less (practically less by far) of the original light.

In order to increase the amount of usable light (efficiency of light), it is proposed that a polarizing plate of light-scattering type be used in place of or in addition to that of light-absorbing type. The polarizing plate of light-scattering type also transmits only the light component polarized parallel to the polarizing axis, but scatters forward or backward the perpendicularly polarized component. Consequently, the plate of light-scattering type improves the efficiency of light.

There are some mechanisms in which the polarizing plate of light-scattering type improves the efficiency of light. The mechanisms (A) to (C) are described below.

(A) Depolarization of Front Scattered Light

The polarizing plate of light-scattering type scatters forward or backward the light component polarized perpendicularly to the polarizing axis. The light component scattered forward (front scattered light) is depolarized to rotate the polarizing direction. The thus rotated direction is different from the polarizing direction of the incident light, and hence the scattered light has a light component polarized parallel to the polarizing axis of the plate. Consequently, the component polarized in the polarizing direction of the plate is increased. If the polarizing plate contains many particles in the thickness direction, multiple scattering occurs to enhance the depolarization. In this way, the efficiency of light is improved by the depolarization of front scattered light if the polarizing plate of light-scattering type is used, as compared with the efficiency when the polarizing plate of light-absorbing type is used alone.

(B) Reuse (Depolarization) of Back Scattered Light

The component scattered backward (back scattered light) is depolarized when it scattered. The back scattered light is reflected by a metal reflector placed behind the backlight (light source), and again enters the polarizing plate of light-scattering type. Since the depolarized light (back scattered light) has the light component polarized parallel to the polarizing axis of the plate, a part of the reentering light passes through the plate. The scattering on the polarizing plate and the reflection on the reflector are repeated in this way to improve the efficiency of light.

(C) Reuse (Rotation of Polarizing Direction) of Back Scattered Light

In an optical system comprising a $\lambda/4$ plate and a metal reflector, incident light linearly polarized at 45° to the slow axis of the $\lambda/4$ plate is reflected to rotate its polarizing direction by 90°. For applying this effect, a $\lambda/4$ plate is provided between the polarizing plate of light-scattering type and the metal reflector (placed behind the backlight) so that the slow axis of the $\lambda/4$ plate may be placed at 45° to the polarizing axis of the polarizing plate.

The light scattered backward has a component polarized perpendicularly to the polarizing axis of the polarizing plate in a large amount. Accordingly, the light having passed through the $\lambda/4$ plate, reflected by the metal reflector and reentering the polarizing plate has a component polarized parallel to the polarizing axis of the polarizing plate in a large amount. Since the light component parallel polarized can pass through the polarizing plate, the efficiency of light can be improved by the $\lambda/4$ plate provided between the polarizing plate of light-scattering type and the metal reflector.

The polarizing plate of light-scattering type is described in Japanese Patent Provisional Publication Nos. 8(1996)-76114, 9(1997)-274108, 9(1997)-297204, Japanese Patent Publication Nos. 11(1999)-502036, 11(1999)-509014, U.S. Pat. Nos. 5,783,120, 5,825,543 and 5,867,316.

The known polarizing plates of light-scattering type disclosed in Japanese Patent Provisional Publication Nos. 8(1996)-76114, 9(1997)-274108, Japanese Patent Publication Nos. 11(1999)-502036, 11(1999)-509014, U.S. Pat. Nos. 5,783,120, 5,825,543 and 5,867,316 are stretched polymer films like the known polarizing plates of light-absorbing type. In the polarizing plates, the refractive induces of the binder and the dispersed particles should be highly adjusted. In more detail, the difference between the refractive induces of the binder and the particles should be small at the side of transmitting polarized light. On the other hand, the difference should be large at the side of scattering polarized light. The known plates described in the prior art references are insufficient for the above-described optical characteristics. Therefore, the improvement of the efficiency of light is insufficient.

The polarizing plate of light-scattering type disclosed in Japanese Patent Publication No. 11(1999)-502036 is a polymer film containing dispersed liquid crystal molecules (optically anisotropic molecules), which are aligned by applying an electric or magnetic field. However, it is practically difficult to apply the electric or magnetic field evenly to a large area, and accordingly it is difficult to obtain an even scattering character in a large area. Unevenness of the scattering character in the plane of the polarizing plate induces unevenness of brightness in the plane of a liquid crystal display.

SUMMARY OF THE INVENTION

An object of the present invention is to provide a polarizing optical film by which the efficiency of light through a polarizing plate is improved, by which scattering character of the polarizing plate is easily controlled and by which the polarizing plate can give large light scattering evenly in a large area.

The present invention provides an optical film comprising a transparent support and a polarizing layer which selectively transmits polarized light and which selectively reflects or scatters other polarized light, wherein the polarizing layer contains a compound represented by the following formula (I):

$$Ar^1—C≡C—Ar^3—C≡C—Ar^2 \quad (I)$$

in which each of $Ar^1$ and $Ar^2$ independently is a monovalent aromatic group, and $Ar^3$ is a divalent aromatic group.

The invention also provides a polarizing plate comprising a polarizing element of light-scattering type and a polarizing element of light-absorbing type, said polarizing element of light-scattering type selectively transmitting polarized light and selectively reflecting or scattering other polarized light, and said polarizing element of light-absorbing type selectively transmitting polarized light and selectively absorbing other polarized light, wherein the polarizing element of light-scattering type has a polarizing layer consisting of an optically isotropic phase and an optically anisotropic phase, wherein the polarizing element of light-scattering type has a polarizing plane perpendicular to a surface plane of the polarizing element, the polarizing element of light-scattering type at the polarizing plane has the maximum transmittance for all rays of more than 75% and the minimum transmittances for all rays of less than 60%, wherein an axis having the polarizing plane giving the maximum transmittance for all rays is essentially parallel to the transparent axis of the polarizing element of light-absorbing type, and wherein the optically anisotropic phase contains a compound represented by the formula (I).

The invention further provides a liquid crystal display which comprises a liquid crystal cell in which a liquid crystal compound is sealed between a pair of substrates having a transparent electrode and a pixel electrode, and also which comprises a pair of polarizing plates sandwiching the liquid crystal cell, wherein the above-defined optical film is provided between a backlight and the polarizing plate on the backlight side of the cell.

The invention furthermore provides a liquid crystal display comprising a backlight, a polarizing plate, a liquid crystal cell and another polarizing plate in this order, wherein the polarizing plate placed between the backlight and the liquid crystal cell comprises a polarizing element of light-scattering type and a polarizing element of light-absorbing type, said polarizing element of light-scattering type selectively transmitting polarized light and selectively reflecting or scattering other polarized light, and said polarizing element of light-absorbing type selectively transmitting polarized light and selectively absorbing other polarized light, wherein the polarizing element of light-scattering type has a polarizing layer consisting of an optically isotropic phase and an optically anisotropic phase, wherein the polarizing element of light-scattering type has a polarizing plane perpendicular to a surface plane of the polarizing element, the polarizing element of light-scattering type at the polarizing plane has the maximum transmittance for all rays of more than 75% and the minimum transmittances for all rays of less than 60%, wherein an axis having the polarizing plane giving the maximum transmittance for all rays is essentially parallel to the transparent axis of the polarizing element of light-absorbing type, and wherein the optically anisotropic phase contains a compound represented by the formula (I).

In the present specification, the term "optically isotropy" means the character giving a birefringent index of less than 0.05, while the term "optically anisotropy" means the character giving a birefringent index of 0.05 or more.

The inventors have found that the compound represented by the formula (I) gives large optical anisotropy to the optical film. Further, since molecules of the compound can be easily aligned in a large area, the optical film can be made to have a large and even scattering character in a large area.

As described above, the optical film of the invention can easily gain optical characters required as a polarizing plate of light-scattering type. The polarizing plate having such optical characters remarkably improves the efficiency of usable light according to the depolarization of front scattered light, the depolarization of back scattered light or the rotation of polarizing direction of back scattered light.

DETAILED DESCRIPTION OF THE INVENTION

Figure 1:
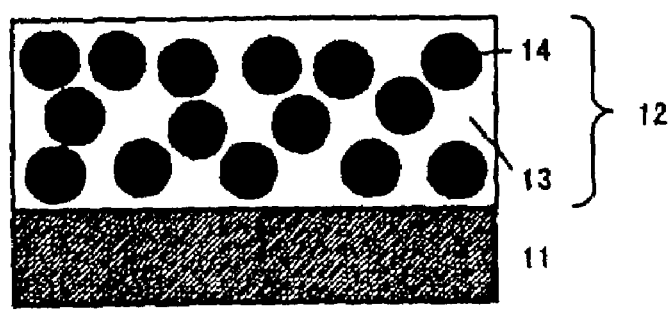
FIG. 1 is a sectional view schematically illustrating a basic structure of an optical film according to the invention.

The optical film of the invention has a polarizing layer, which contains a compound represented by the formula (I).

$$Ar^1—C≡C—Ar^3—C≡C—Ar^2 \quad (I)$$

In the formula (I), each of $Ar^1$ and $Ar^2$ independently is a monovalent aromatic group, which is an aromatic hydrocarbon group or an aromatic heterocyclic group.

Examples of the monovalent aromatic hydrocarbon group include phenyl, naphthyl, biphenyl, anthryl and phenanthryl. Preferred groups are phenyl, 1-naphthyl, 2-naphthyl, 4-biphenyl, 1-anthryl, 2-anthryl, 9-anthryl, 1-phenanthryl, 2-phenanthryl and 9-phenanthryl. Further preferred are phenyl, 2-naphthyl, 4-biphenyl, 2-anthryl and 2-phenanthryl, and most preferred is phenyl.

The monovalent aromatic heterocyclic group preferably has an aromatic five- or six-membered heterocyclic ring.

The aromatic five-membered heterocyclic ring contains two double bonds and one to four hetero-atoms, which are preferably oxygen, sulfur and/or nitrogen atoms. It is particularly preferred that the ring have at least one sulfur or nitrogen atom.

The aromatic five-membered heterocyclic ring may be condensed with another ring (another heterocyclic ring, an aliphatic ring or an aromatic hydrocarbon ring), which is preferably an aromatic hydrocarbon ring or an aromatic heterocyclic ring, more preferably an aromatic hydrocarbon ring, and most preferably benzene ring.

Examples of the monovalent aromatic five-membered heterocyclic group and the monovalent condensed aromatic five-membered heterocyclic group are shown below.

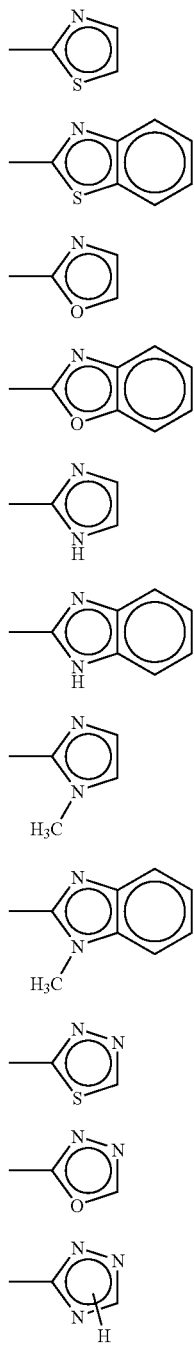

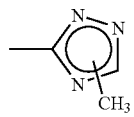
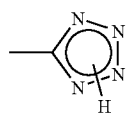
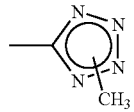
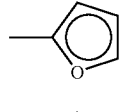
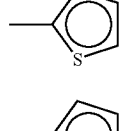
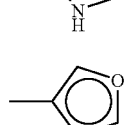
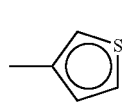
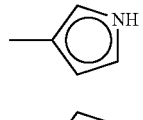
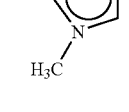
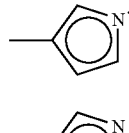
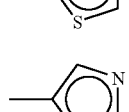
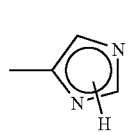

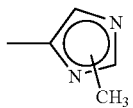 (Ar526)

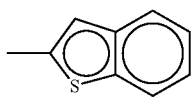 (Ar527)

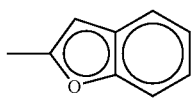 (Ar528)

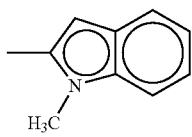 (Ar529)

The aromatic six-membered heterocyclic ring contains two double bonds and one to four hetero-atoms, which are preferably phosphorous, silicon and/or nitrogen atoms. The ring has more preferably at least one nitrogen atom, further preferably one or two nitrogen atoms.

The aromatic six-membered heterocyclic ring may be condensed with another ring (another heterocyclic ring, an aliphatic ring or an aromatic hydrocarbon ring), which is preferably an aromatic hydrocarbon ring or an aromatic heterocyclic ring, more preferably an aromatic hydrocarbon ring, and most preferably benzene ring.

Examples of the monovalent aromatic six-membered heterocyclic group and the monovalent condensed aromatic six-membered heterocyclic group are shown below.

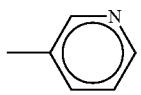 (Ar601)

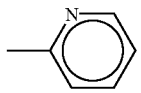 (Ar602)

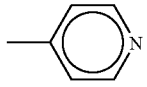 (Ar603)

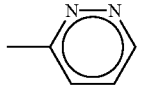 (Ar604)

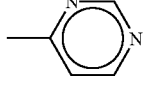 (Ar605)

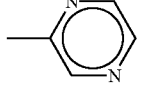 (Ar606)

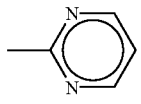 (Ar607)

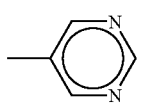 (Ar608)

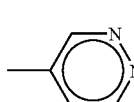 (Ar609)

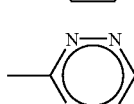 (Ar610)

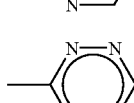 (Ar611)

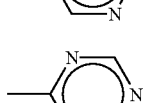 (Ar612)

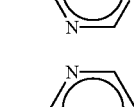 (Ar613)

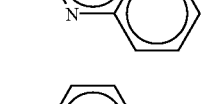 (Ar614)

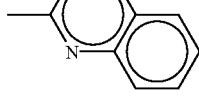 (Ar615)

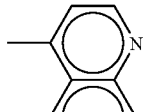 (Ar616)

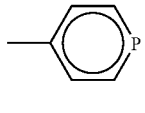 (Ar617)

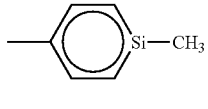 (Ar618)

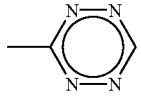 (Ar619)

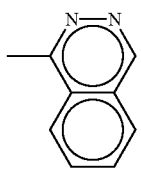
(Ar620)

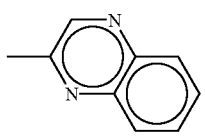
(Ar621)

The monovalent aromatic group (Ar$^1$, Ar$^2$) can have a monovalent aromatic group itself as the substituent group. Examples of the monovalent aromatic groups having a monovalent aromatic substituent group are shown below.

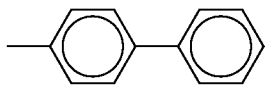
(Ar131)

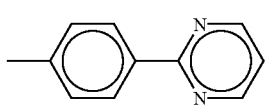
(Ar132)

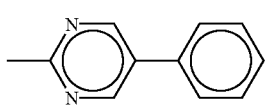
(Ar631)

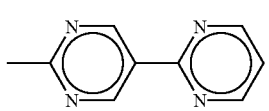
(Ar632)

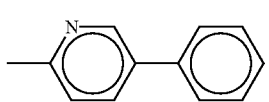
(Ar633)

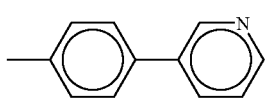
(Ar133)

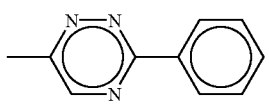
(Ar634)

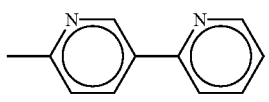
(Ar635)

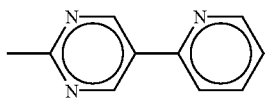
(Ar636)

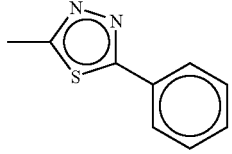
(Ar531)

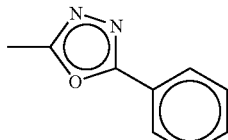
(Ar532)

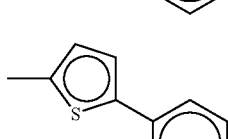
(Ar533)

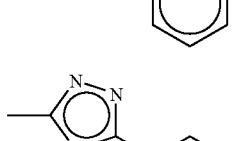
(Ar534)

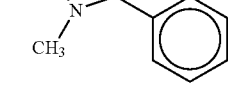
(Ar134)

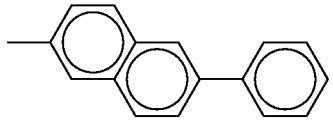
(Ar134)

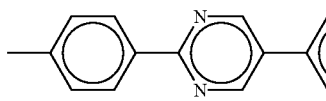
(Ar135)

In the formula (I), Ar$^3$ is a divalent aromatic group, which is an aromatic hydrocarbon group or an aromatic heterocyclic group.

Examples of the divalent aromatic hydrocarbon group include phenylene, naphthylene, anthrylene, phenanthrylene, pyrenylene, biphenylene and terphenylene. Preferred groups are 1,4-phenylene, 2,6-naphthylene, 1,5-naphthylene, 1,4-naphthylene, 2,6-anthrylene, 2,7-phenanthrylene, 2,7-pyrenylene, 4,4'-biphenylene and 4,4',4"-terphenylene. Further preferred are 1,4-phenylene, 2,6-naphthylene and 4,4'-biphenylene.

The divalent aromatic heterocyclic group preferably has an aromatic five- or six-membered heterocyclic ring.

The aromatic five-membered heterocyclic ring contains two double bonds and one to four hetero-atoms, which are preferably oxygen, sulfur and/or nitrogen atoms. It is particularly preferred that the ring have at least one sulfur or nitrogen atom.

The aromatic five-membered heterocyclic ring may be condensed with another ring (another heterocyclic ring, an aliphatic ring or an aromatic hydrocarbon ring), which is preferably an aromatic hydrocarbon ring or an aromatic heterocyclic ring, more preferably an aromatic hydrocarbon ring, and most preferably benzene ring.

The divalent aromatic five-membered heterocyclic group or the condensed group thereof may combine with another divalent aromatic group (e.g., a divalent aromatic hydrocarbon group, another divalent aromatic five-membered heterocyclic group or another condensed group thereof, a divalent aromatic six-membered heterocyclic group or a condensed group thereof), to form a divalent aromatic group (Ar³ in the formula (I)) as a whole. The number of combined groups is preferably two or three.

Examples of the divalent aromatic five-membered heterocyclic group, the divalent condensed aromatic five-membered heterocyclic group, and the divalent aromatic group of the combination thereof are shown below.

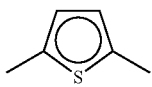
(Ar551)

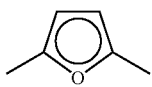
(Ar552)

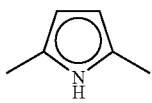
(Ar553)

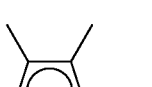
(Ar554)

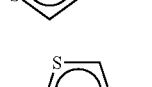
(Ar555)

(Ar556)

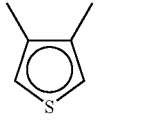
(Ar557)

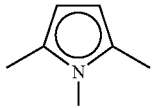
(Ar558)

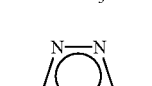
(Ar559)

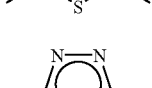
(Ar560)

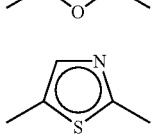
(Ar561)

-continued

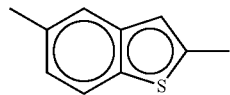
(Ar562)

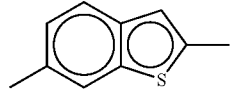
(Ar563)

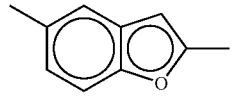
(Ar564)

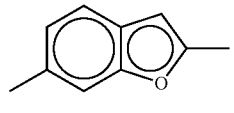
(Ar565)

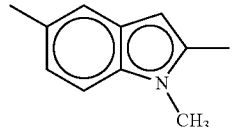
(Ar566)

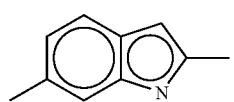
(Ar567)

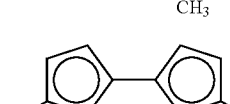
(Ar568)

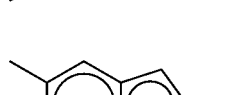
(Ar569)

The aromatic six-membered heterocyclic ring contains two double bonds and one to four heteroatoms, which are preferably phosphorous, silicon and/or nitrogen atoms. The ring has more preferably at least one nitrogen atom, further preferably one or two nitrogen atoms.

The aromatic six-membered heterocyclic ring may be condensed with another ring (another heterocyclic ring, an aliphatic ring or an aromatic hydrocarbon ring), which is preferably an aromatic hydrocarbon ring or an aromatic heterocyclic ring, more preferably an aromatic hydrocarbon ring, and most preferably benzene ring.

The divalent aromatic six-membered heterocyclic group or the condensed group thereof may combine with another divalent aromatic group (e.g., a divalent aromatic hydrocarbon group, a divalent aromatic five-membered heterocyclic group or a condensed group thereof, another divalent aromatic six-membered heterocyclic group or another condensed group thereof), to form a divalent aromatic group (Ar³ in the formula (I)) as a whole. The number of combined groups is preferably two or three.

Examples of the divalent aromatic six-membered heterocyclic group, the divalent condensed aromatic six-membered heterocyclic group, and the divalent aromatic group of the combination thereof are shown below.

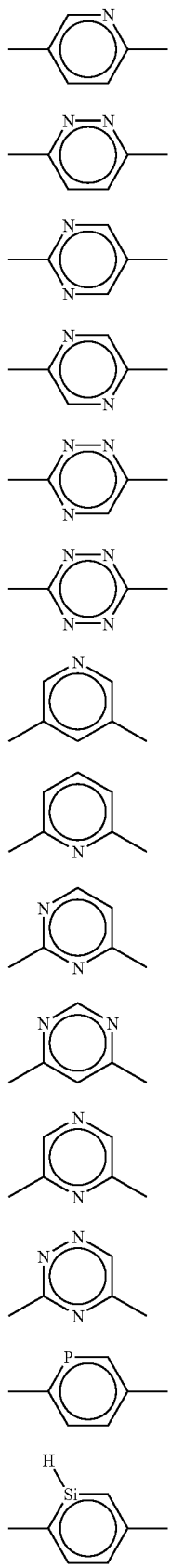
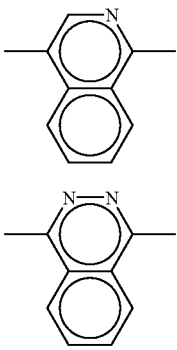

Each aromatic group (Ar$^1$, Ar$^2$ or Ar$^3$) may have a substituent group. Examples of the substituent group include halogen atoms (e.g., fluorine atom, chlorine atom), cyano, an alkyl group having 1 to 20 (preferably 1 to 15) carbon atoms (e.g., methyl, ethyl, hexyl, octyl, undecyl, tetradecyl), an alkenyl group having 2 to 20 (preferably 2 to 15) carbon atoms (e.g., vinyl, propenyl, hexenyl, decenyl, tetradecenyl), an alkynyl group having 2 to 20 (2 to 15) carbon atoms (e.g., ethynyl, propynyl, hexynyl, decynyl, tetradecynyl), an alkoxy group having 1 to 20 (preferably 1 to 15) carbon atoms (e.g., methoxy, ethoxy, hexyloxy, octyloxy, tetradecyloxy), an alkylthio group having 1 to 20 (preferably 1 to 15) carbon atoms (e.g., methylthio, butylthio, hexylthio, decylthio, tetradecylthio), an alkoxylcarbonyl group having 2 to 20 (preferably 2 to 15) carbon atoms (e.g., methoxycarbonyl, ethoxycarbonyl, hexyloxycarbonyl, dodecyloxycarbonyl), an acyloxy group having 2 to 20 (preferably 2 to 15) carbon atoms (e.g., acetyloxy, acryloyloxy, methacryloyloxy, hexanoyloxy, decanoyloxy), an amide group having 2 to 20 (preferably 2 to 15) carbon atoms (e.g., acetamide), and a sulfoneamide group having 1 to 20 (preferably 1 to 15) carbon atoms (e.g., octanesulfoneamide). The polymerizable groups (Q1 to Q17) described after are also included in the substituent groups. The above monovalent aromatic hydrocarbon groups themselves are also usable as the substituent groups. The monovalent aromatic group has preferably one to three, more preferably one or two substituent groups.

The above alkyl, alkenyl, alkynyl, alkoxy, alkylthio, alkoxycarbonyl and acyloxy groups may further have substituent groups, examples of which include hydroxyl, halogen atoms (e.g., fluorine atom, chlorine atom), cyano, epoxy, aziridinyl and an acyloxy group having 2 to 20 (preferably 2 to 15) carbon atoms (e.g., acetyloxy, acryloyloxy, methacryloyloxy, hexanoyloxy, decanoyloxy). Further, the polymerizable groups (Q1 to Q17) described after are also included in the substituent groups.

The substituent group preferably contains cyano to increase the optical anisotropy of the film. Preferably, cyano is directly connected to the aromatic group. More preferably, cyano is directly connected to each of the end aromatic groups ($Ar^1$ and $Ar^2$). The substituent group preferably contains hydroxyl group to increase interaction of the liquid crystal compound with an optical isotropic binder (preferably water-soluble polymer). The interaction (e.g., hydrogen bond) can improve the optical characteristics and the stability of the film. Preferably, hydroxyl is connected through a linking group to at least one aromatic group ($Ar^1$, $Ar^2$ or $Ar^3$).

The total number of the substituent groups having hydroxyls is preferably 1 to 6, more preferably 1 to 3, and most preferably 1 or 2. Further, one aromatic group has preferably one to three, more preferably one or two substituent groups having hydroxyls. It is particularly preferred for one aromatic group to have only one substituent group having hydroxyl. In other words, if the compound contains three substituent groups having hydroxyls, each of $Ar^1$, $Ar^2$ and $Ar^3$ has one of the substituent groups. In the case where two substituent groups having hydroxyls are contained in the compound, each of the two of $Ar^1$, $Ar^2$ and $Ar^3$ has one of the substituent groups. In that case, it is particularly preferred that each of $Ar^1$ and $Ar^2$ have one of the substituent groups. If the compound contains one substituent group having hydroxyl, one of $Ar^1$, $Ar^2$ and $Ar^3$ has the substituent group.

The linkage among the aromatic group, the linking group and hydroxyl is represented by the formula: $Ar-L(-OH)_m$ in which Ar is one of the three aromatic groups ($Ar^1$, $Ar^2$, $Ar^3$), L is a m+1 valent linking group, and m is an integer of 1 or more.

Preferred examples of the linking group (L) include —O—, —S—, —NH—, —CO—, a multivalent aliphatic group, a multivalent aliphatic heterocyclic group and a combination thereof. The integer (m) is preferably 2 to 6.

The formula $Ar-L(-OH)_m$ is further preferably represented by $Ar-L^1-L^2(-OH)_m$ in which Ar is one of the three aromatic groups ($Ar^1$, $Ar^2$, $Ar^3$), $L^1$ is —O—, —S—, —NH—, —CO—, a divalent aliphatic group or a combination thereof, $L^2$ is an m+1 valent aliphatic group or an m+1 valent aliphatic heterocyclic group, and m is an integer of 1 or more.

The divalent aliphatic group is an alkylene group, a substituted alkylene group, an alkenylene group, a substituted alkenylene group, an alkynylene group or a substituted alkynylene group. Preferred are an alkylene group, a substituted alkylene group, an alkenylene group and a substituted alkenylene group. An alkylene group and a substituted alkylene group are more preferred, and an alkylene group is most preferred.

The alkylene group has preferably 1 to 20, more preferably 1 to 12 carbon atoms. A chained alkylene group is preferred to a cyclic one, and a straight-chained alkylene group is preferred to a branched one.

The alkenylene group has preferably 2 to 20, more preferably 2 to 12 carbon atoms. A chained alkenylene group is preferred to a cyclic one, and a straight-chained alkenylene group is preferred to a branched one.

The alkynylene group has preferably 2 to 20, more preferably 2 to 12 carbon atoms. A chained alkynylene group is preferred to a cyclic one, and a straight-chained alkynylene group is preferred to a branched one.

The alkylene moiety of the substituted alkylene group, the alkenylene moiety of the substituted alkenylene group and the alkynylene moiety of the substituted alkynylene group are the same as the corresponding groups described above. Examples of the substituent group of the above substituted groups include halogen atoms (e.g., fluorine atom, chlorine atom), cyano and an acyloxy group having 2 to 20 (preferably 2 to 15) carbon atoms (e.g., acetyloxy, hexanoyloxy, decanoyloxy).

The multivalent (m+1 valent) aliphatic group may have a cyclic structure. The multivalent aliphatic group has 2 to 15 carbon atoms. The multivalent aliphatic group is preferably saturated.

The multivalent (m+1 valent) aliphatic heterocyclic group is preferably saturated. The multivalent aliphatic heterocyclic group is preferably five- or six-membered, more preferably six-membered. The hetero-atom is preferably oxygen or sulfur atom.

Examples of $Ar-L(-OH)_m$ are shown below.
L1: Ar—CO—NH-divalent aliphatic group-OH
L2: Ar—CO—NH-trivalent aliphatic group($-OH)_2$
L3: Ar—CO—NH-hexavalent aliphatic group($-OH)_5$
L4: Ar—CO—NH-pentavalent aliphatic heterocyclic group ($-OH)_4$
L5: Ar—CO—O-trivalent aliphatic group($-OH)_2$
L6: Ar—CO—O-divalent aliphatic group-O-trivalent aliphatic group($-OH)_2$
L7: Ar—CO—O-divalent aliphatic group-O-divalent aliphatic group-O-trivalent aliphatic group($-OH)_2$
L8: Ar—CO—O-divalent aliphatic group-O-divalent aliphatic group-O-divalent aliphatic group-O-trivalent aliphatic group($-OH)_2$
L9: Ar-divalent aliphatic group-O-trivalent aliphatic group ($-OH)_2$
L10: Ar-divalent aliphatic group-O-divalent aliphatic group-O-trivalent aliphatic group($-OH)_2$
L11: Ar-divalent aliphatic group-O-divalent aliphatic group-O-divalent aliphatic group-O-trivalent aliphatic group($-OH)_2$
L12: Ar-divalent aliphatic group-O-divalent aliphatic group-O-divalent aliphatic group-O-trivalent aliphatic group($-OH)_2$ The compound represented by the formula (I) preferably has a polymerizable group. If so, aligned molecules of the compound can be polymerized to fix the alignment, and thereby the optical character can be kept from changing by temperature.

The polymerizable group can be connected directly or through a linking group to the aromatic groups ($Ar^1$, $Ar^2$, $Ar^3$). The polymerizable group is preferably contained in a substituent group of the monovalent aromatic group ($Ar^1$ or $Ar^2$). Further preferably, each of the monovalent aromatic groups (Ar¹ and Ar²) has the substituent group containing the polymerizable group. In other words, the compound represented by the formula (I) preferably has a symmetric structure, and hence it preferably has the polymerizable group at each end.

Examples of the polymerizable group (Q) are shown below.

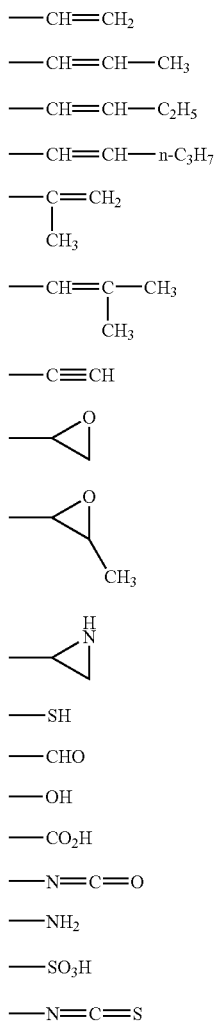

The polymerizable group (Q) preferably is an unsaturated polymerizable group (Q1 to Q7), an epoxy group (Q8, Q9) or an aziridinyl group (Q10), more preferably is an unsaturated polymerizable group, further preferably is an ethylenically unsaturated group (Q1 to Q6), and most preferably is vinyl (Q1).

The polymerizable group is preferably connected through a linking group to the aromatic ring (of the aromatic group).

The linkage among the aromatic group, the linking group and the polymerizable group is represented by the formula: Ar—L—Q in which Ar is one of the three aromatic groups (Ar¹, Ar², Ar³), L is a divalent linking group, and Q is a polymerizable group.

Preferred examples of the linking group (L) include —O—, —S—, —NH—, —CO—, a divalent aliphatic group and a combination thereof.

The divalent aliphatic group is an alkylene group, a substituted alkylene group, an alkenylene group, a substituted alkenylene group, an alkynylene group or a substituted alkynylene group. Preferred are an alkylene group, a substituted alkylene group, an alkenylene group and a substituted alkenylene group. An alkylene group and a substituted alkylene group are more preferred, and an alkylene group is most preferred.

The alkylene group has preferably 1 to 20, more preferably 2 to 12 carbon atoms. A chained alkylene group is preferred to a cyclic one, and a straight-chained alkylene group is preferred to a branched one.

The alkenylene group has preferably 2 to 20, more preferably 2 to 12 carbon atoms. A chained alkenylene group is preferred to a cyclic one, and a straight-chained alkenylene group is preferred to a branched one.

The alkynylene group has preferably 2 to 20, more preferably 2 to 12 carbon atoms. A chained alkynylene group is preferred to a cyclic one, and a straight-chained alkynylene group is preferred to a branched one.

The alkylene moiety of the substituted alkylene group, the alkenylene moiety of the substituted alkenylene group and the alkynylene moiety of the substituted alkynylene group are the same as the corresponding groups described above. Examples of the substituent group of the above substituted groups include halogen atoms (e.g., fluorine atom, chlorine atom), cyano, and an acyloxy group having 2 to 20 (preferably 2 to 15) carbon atoms (e.g., acetyloxy, hexanoyloxy, decanoyloxy).

Examples of Ar—L—Q are shown below.

L21: Ar—CO—O-alkylene-O—CO—Q
L22: Ar—NH—CO-alkylene-O—CO—Q
L23: Ar—CO-O-alkylene-O—Q
L24: Ar—CO—O-alkylene-Q
L25: Ar—NH—CO-alkylene-NH—CO—Q
L26: Ar—O—CO-alkylene-O—CO—Q
L27: Ar—O-alkylene-O—CO—Q
L28: Ar—O-alkylene-Q
L29: Ar—S-alkylene-O—CO—Q
L30: Ar-alkylene-O—CO—Q Examples of the compound represented by the formula (I) are shown below.

The compounds of (1) to (33) are examples in which in the formula (I) each of Ar¹ and Ar² independently is a monovalent aromatic hydrocarbon group, and Ar³ is a divalent aromatic hydrocarbon group.

The compounds of (101) to (135) are examples in which in the formula (I) each of Ar¹ and Ar² independently is a monovalent aromatic hydrocarbon group, and Ar³ is a divalent aromatic five-membered heterocyclic group, a divalent condensed aromatic five-membered heterocyclic group or a divalent aromatic group formed by connecting two or three thereof.

The compounds of (201) to (228) are examples in which in the formula (I) each of Ar¹ and Ar² independently is a monovalent aromatic hydrocarbon group, and Ar³ is a divalent aromatic six-membered heterocyclic group, a divalent condensed aromatic six-membered heterocyclic group or a divalent aromatic group formed by connecting two or three thereof.

The compounds of (301) to (343) are examples in which in the formula (I) $Ar^1$ is a monovalent aromatic hydrocarbon group, a monovalent aromatic five-membered heterocyclic group or a monovalent condensed aromatic five-membered heterocyclic group, $Ar^2$ is a monovalent aromatic five-membered heterocyclic group or a monovalent aromatic hydrocarbon group, and $Ar^3$ is a divalent aromatic hydrocarbon group, a divalent aromatic five-membered heterocyclic group, a divalent condensed aromatic five-membered heterocyclic group, a divalent aromatic six-membered heterocyclic group, a divalent condensed aromatic six-membered heterocyclic group or a divalent aromatic group formed by connecting two or three thereof.

The compounds of (401) to (447) are examples in which in the formula (I) each of $Ar^1$ and $Ar^2$ independently is a monovalent cyano-substituted aromatic group, and $Ar^3$ is a divalent aromatic group.

The compounds of (501) to (521) are examples in which in the formula (I) $Ar^1$ is a monovalent aromatic group, $Ar^2$ is a monovalent aromatic six-membered heterocyclic group, and $Ar^3$ is a divalent aromatic hydrocarbon group, a divalent aromatic five-membered heterocyclic group, a divalent condensed aromatic five-membered heterocyclic group, a divalent aromatic six-membered heterocyclic group, a divalent condensed aromatic six-membered heterocyclic group or a divalent aromatic group formed by connecting two or three thereof.

The compounds of (601) to (626) are examples in which in the formula (I) each of $Ar^1$ and $Ar^2$ independently is a monovalent aromatic group, $Ar^3$ is a divalent aromatic group, and at least one of $Ar^1$, $Ar^2$ and $Ar^3$ has a substituent group containing hydroxyl.

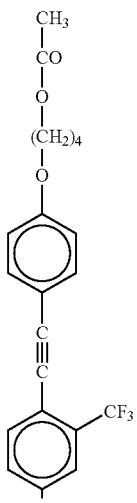

(1)

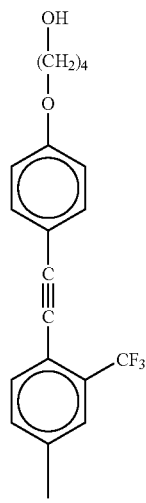

(2)

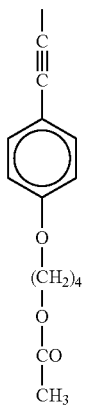

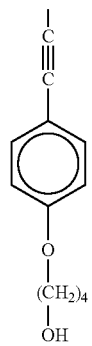

-continued
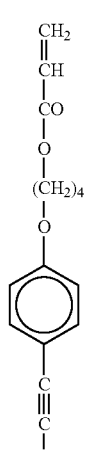 (3) 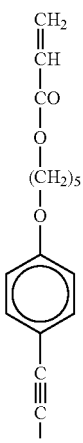 (4)
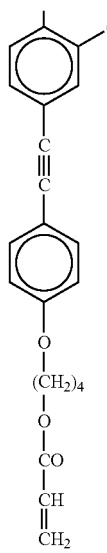 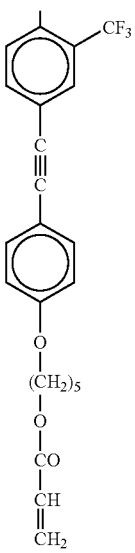
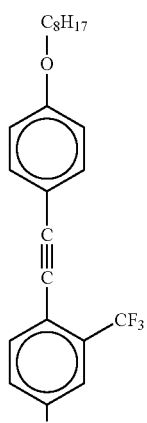 (5) 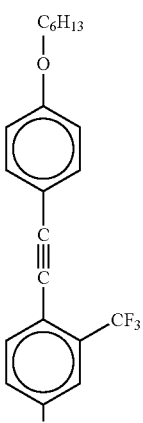 (6)

-continued
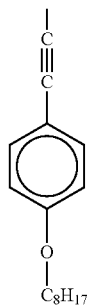
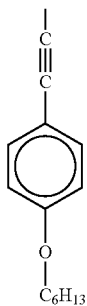
(7)
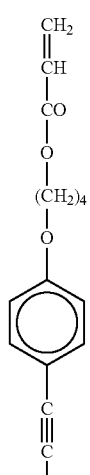
(8)
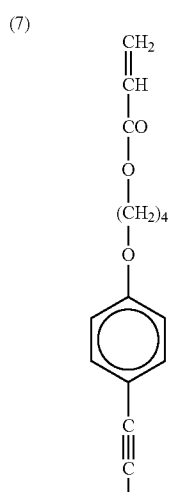
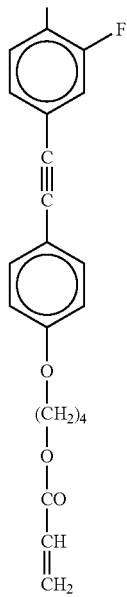
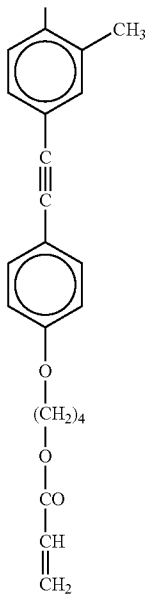

-continued
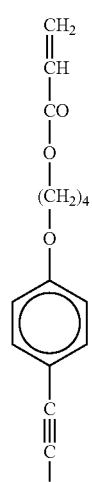 (9)
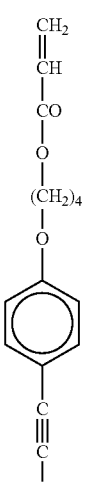 (10)
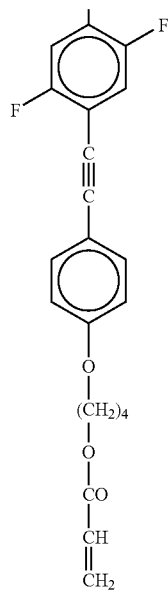 (11)
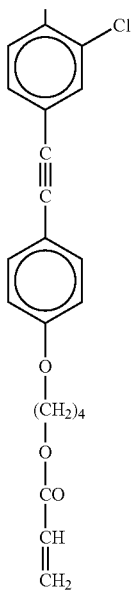 (12)
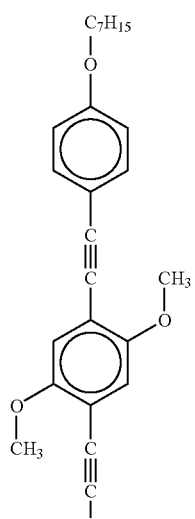
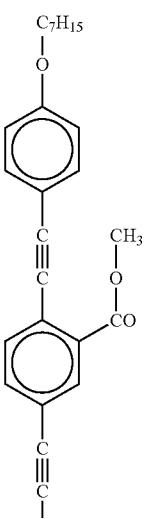

-continued
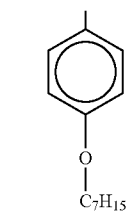
(13)
(14)
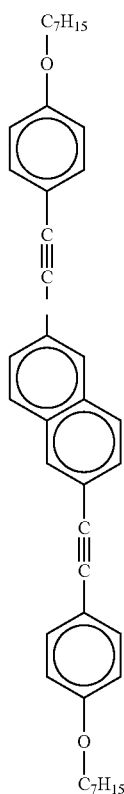
(15)
(16)
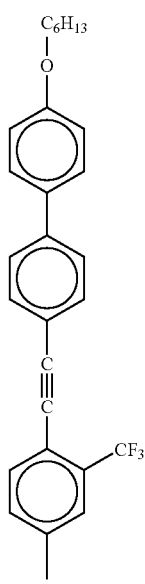
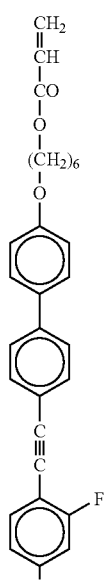

-continued
(17)
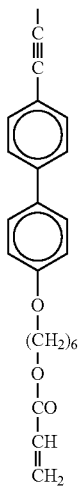
(18)
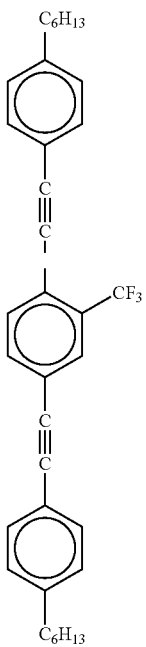
(19)
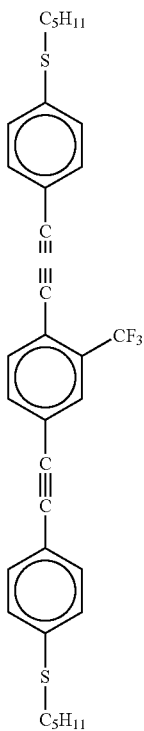
(20)
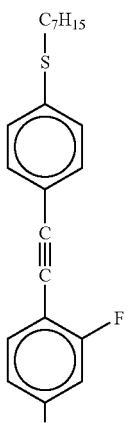
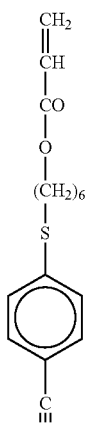

-continued
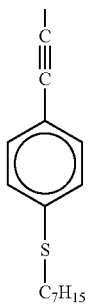
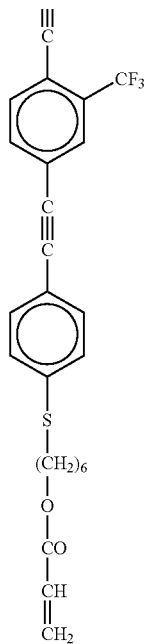
(21)
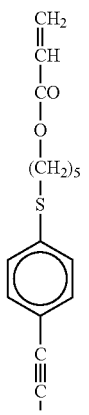
(22)
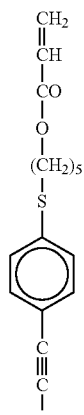
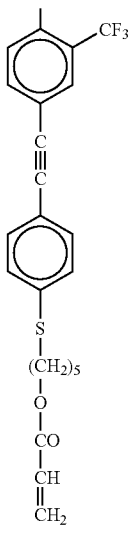
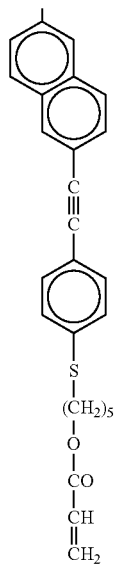

(23)
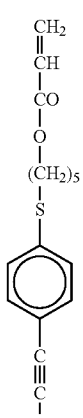
(24)
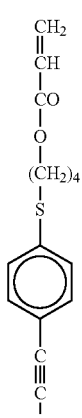
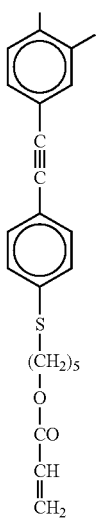
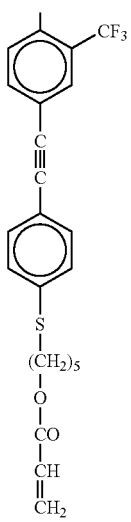
(25)
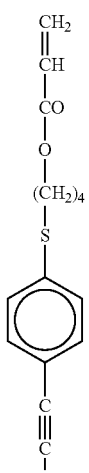
(26)
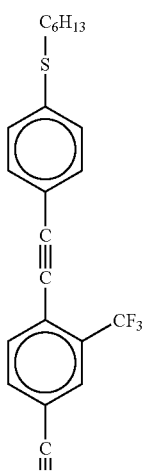

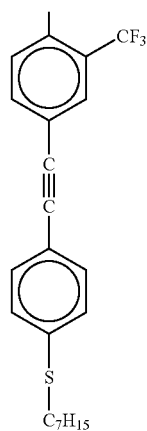
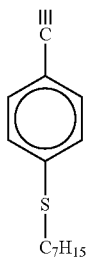
(27)
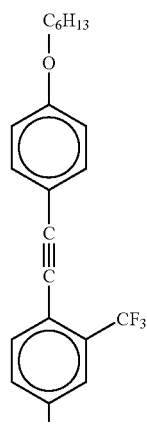
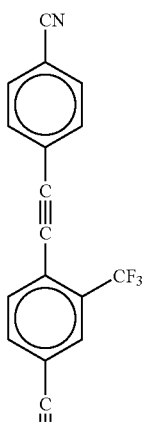
(28)
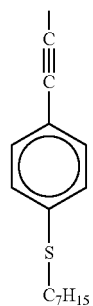
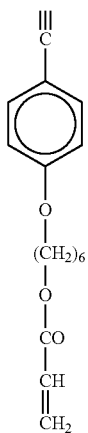

-continued
(29)
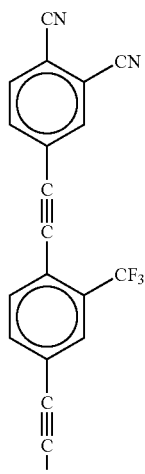
(30)
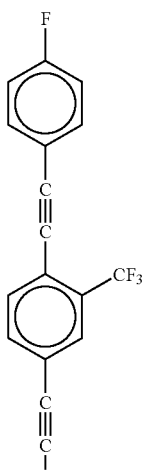
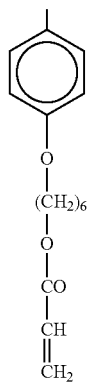
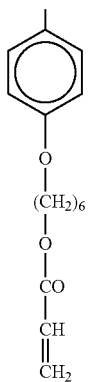
(31)
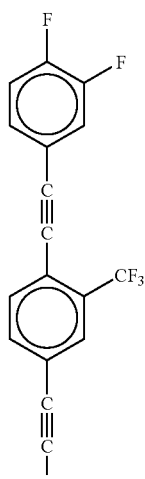
(32)
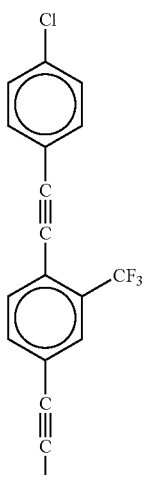

-continued
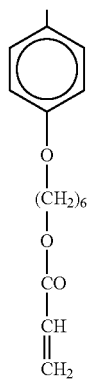
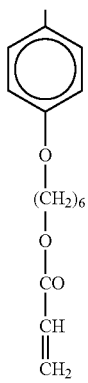
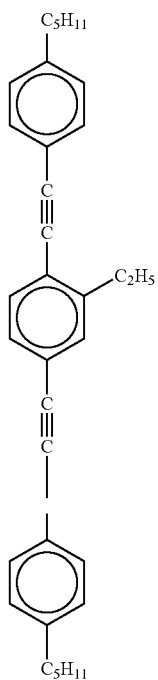
(33)
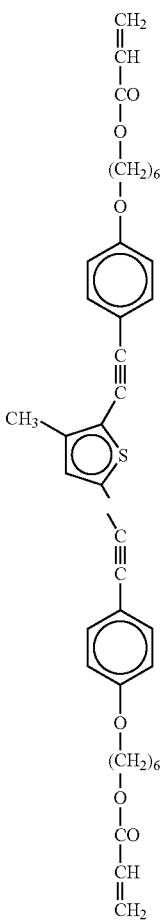
(101)

-continued
(102) 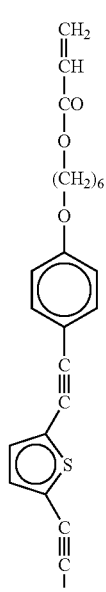
(103) 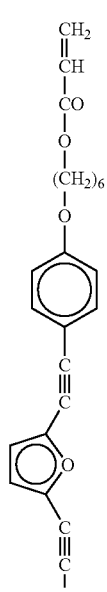
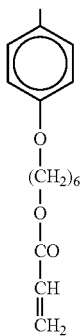
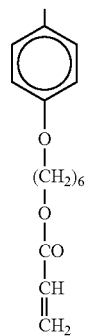
(104) 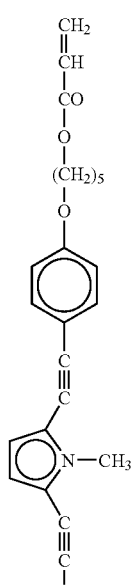
(105) 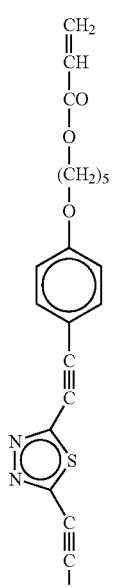

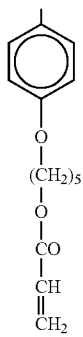
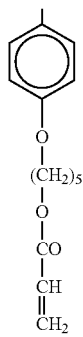
(106)
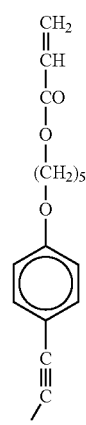
(107)
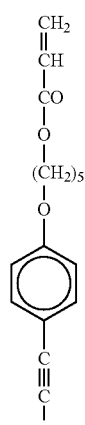
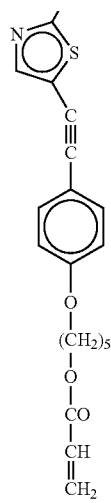
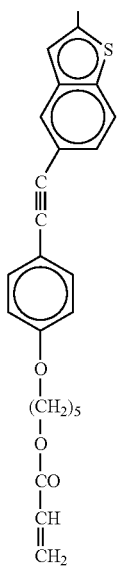

-continued
(108) 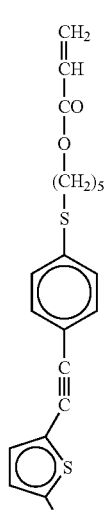 (109) 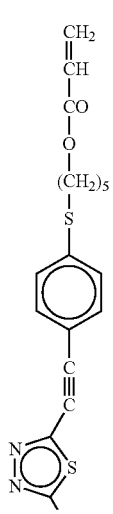
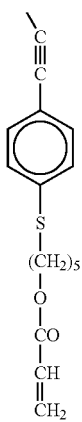 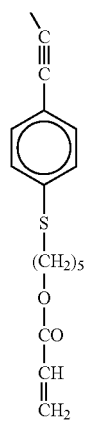
(110) 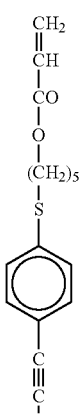 (111) 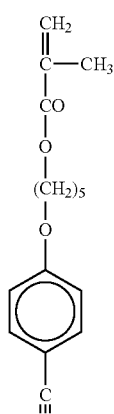

-continued
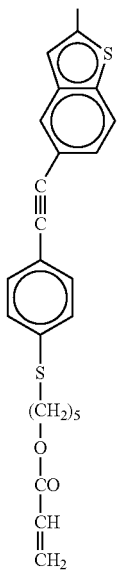
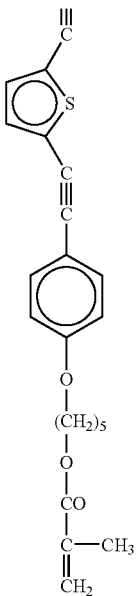
(112)
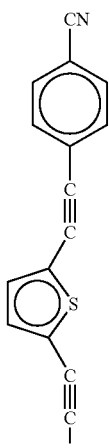
(113)
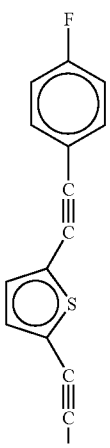
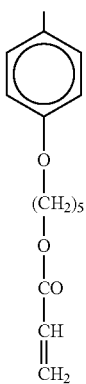
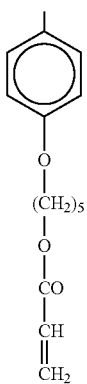

-continued
(114)
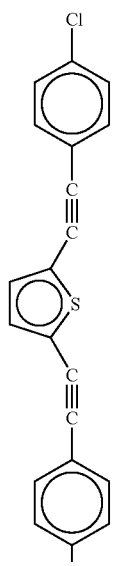
(115)
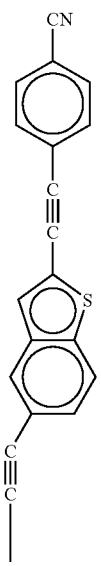
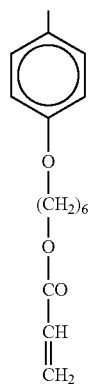
(116)
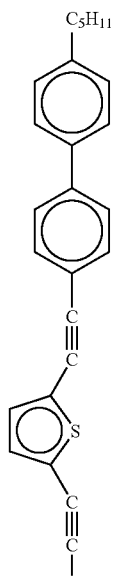
(117)
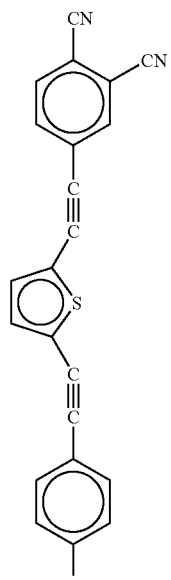

-continued
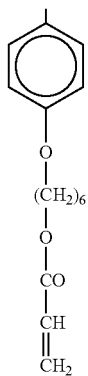
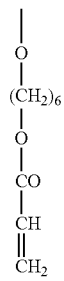
(118)
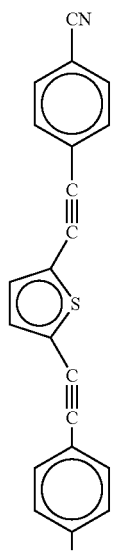
(119)
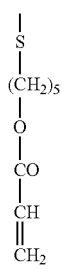
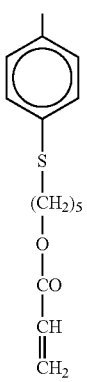

(120) 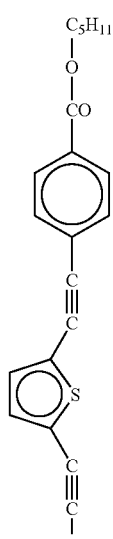 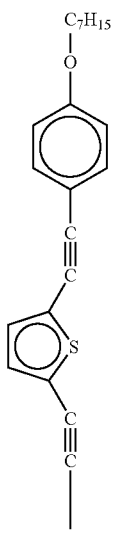 (121)
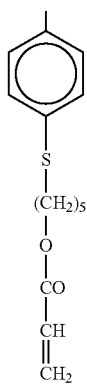 
(122) 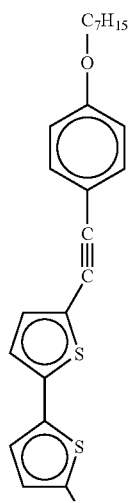 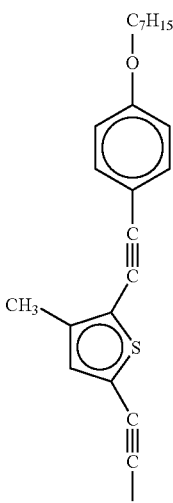 (123)

-continued
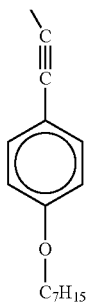
(124)
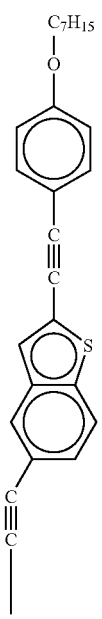
(125)
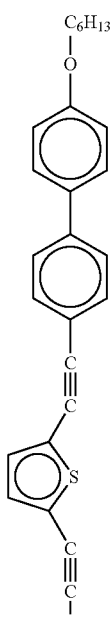
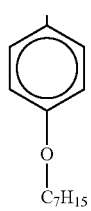
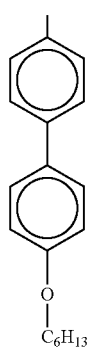

-continued
(126) 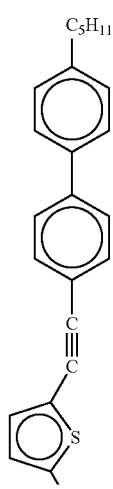
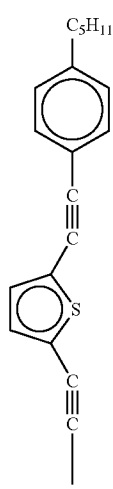 (127)
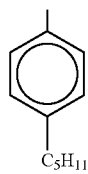
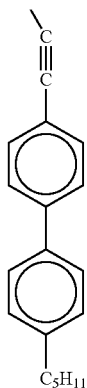
(128) 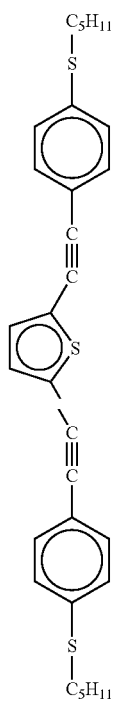
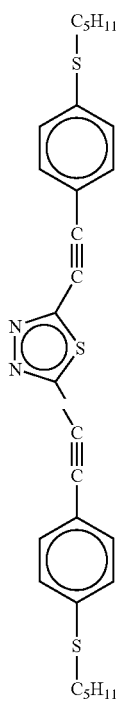 (129)

(130)
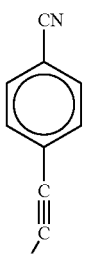
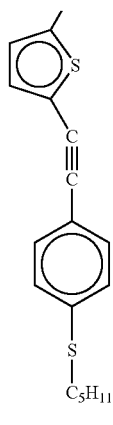
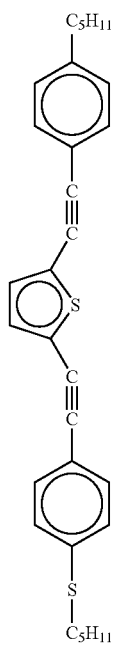
(131)
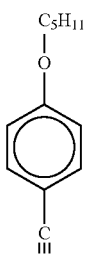
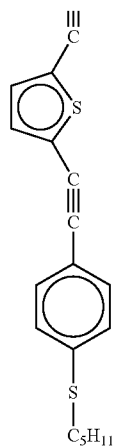
(132)
(133)
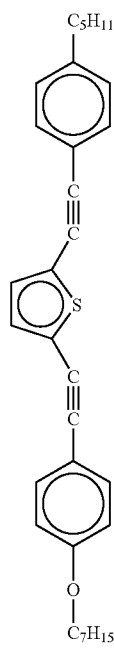

-continued
(134)
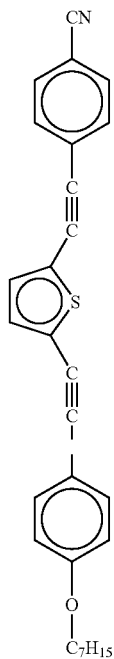
(135)
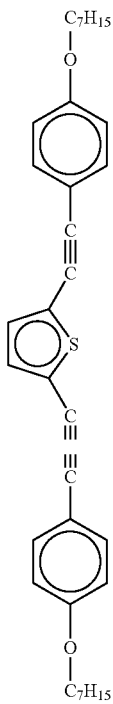
(201)
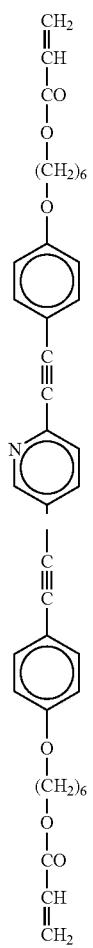
(202)

-continued
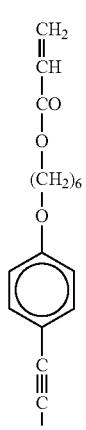
(203)
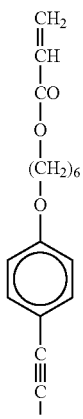
(204)
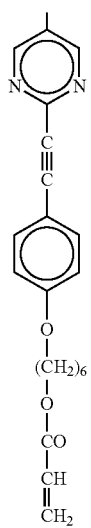
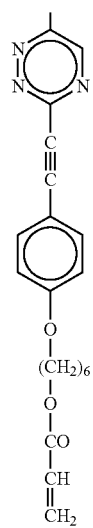
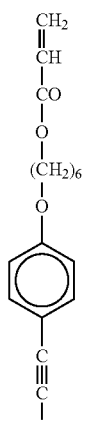
(205)
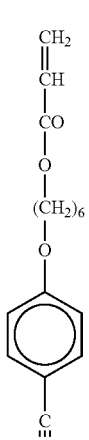
(206)

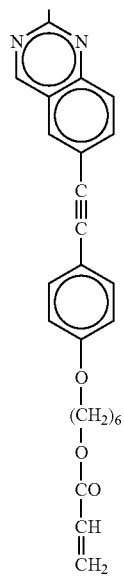
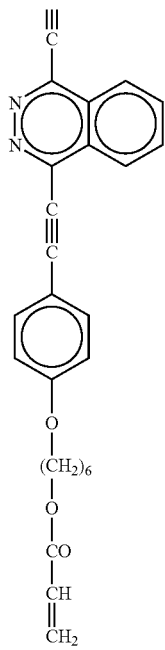
(207)
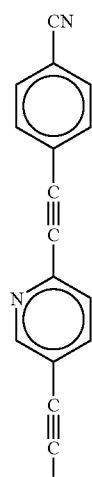
(208)
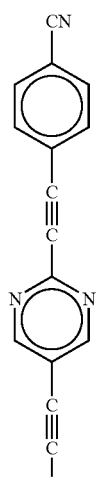
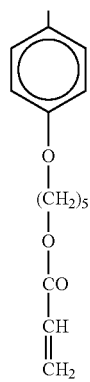
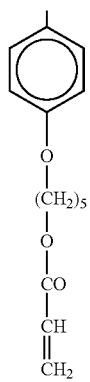

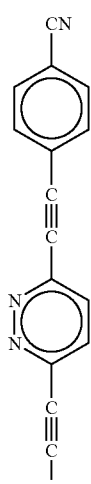 (209)
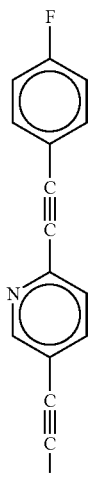 (210)
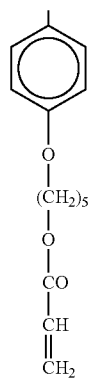
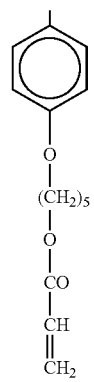
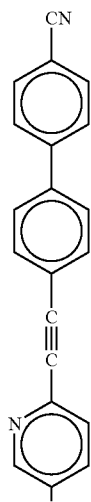 (211)
 (212)

-continued
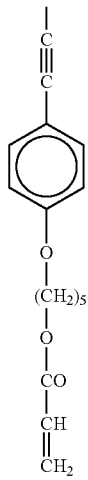 (213) 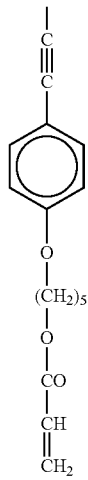 (214)
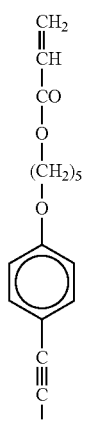 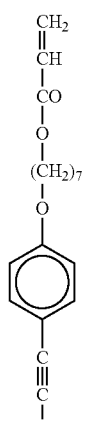
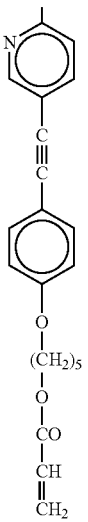 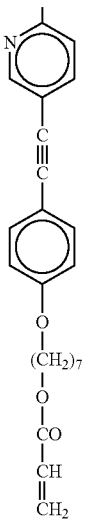

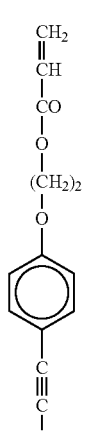 (215)
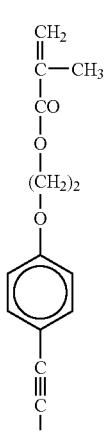 (216)
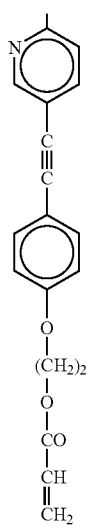 (217)
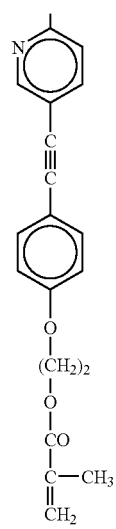 (218)
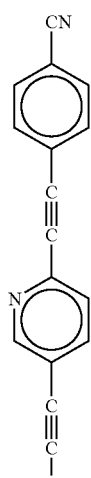
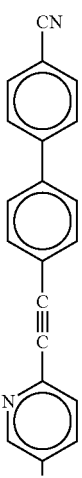

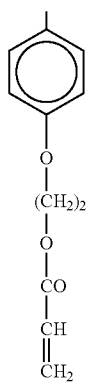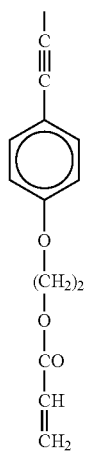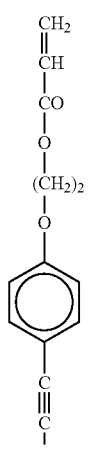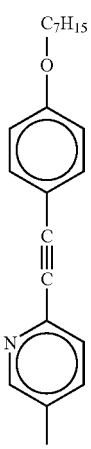
(219)
(220)
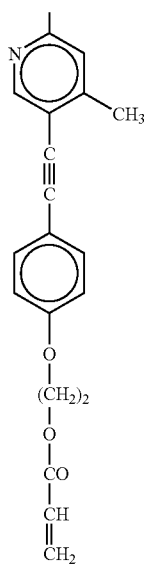

(221)
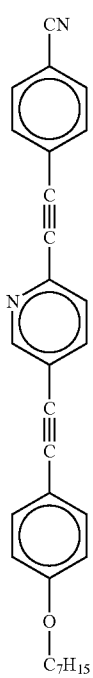
(222)
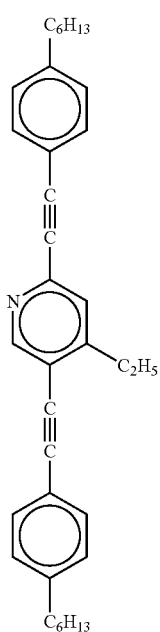
(223)
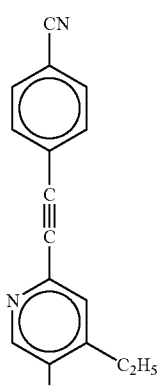
(224)
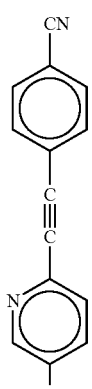
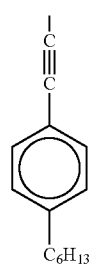
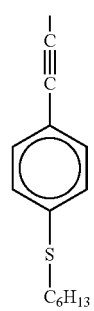

-continued
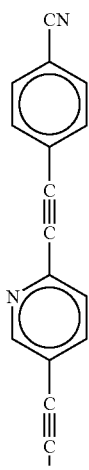 (225)
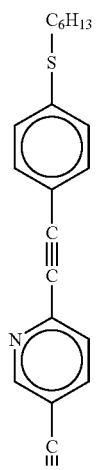 (226)
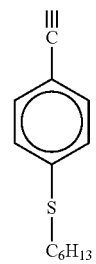
 (227)
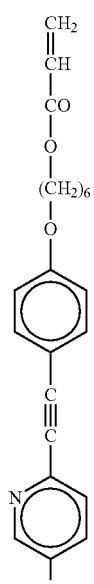 (228)

-continued
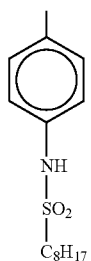
(301)
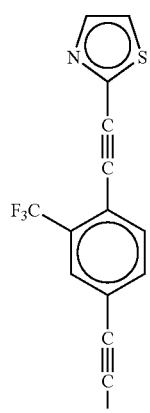
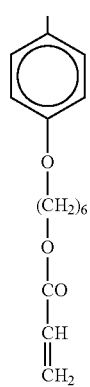
(302)
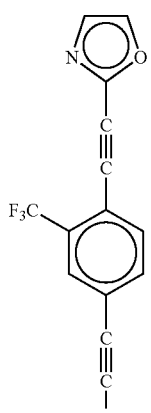
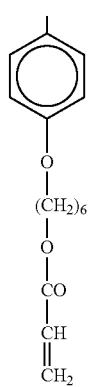

(303)
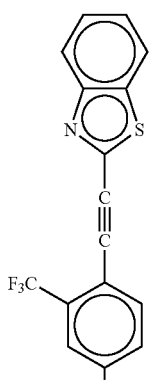
(304)
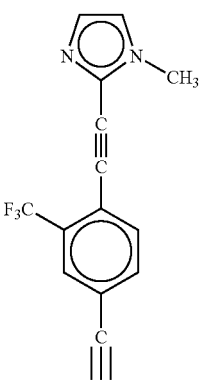
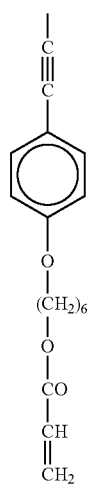
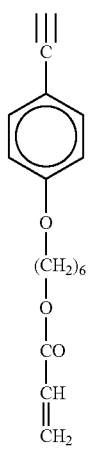
(305)
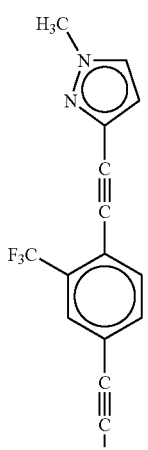
(306)
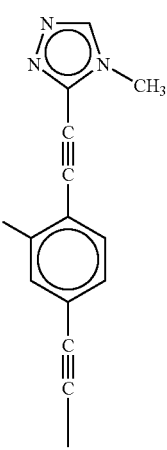

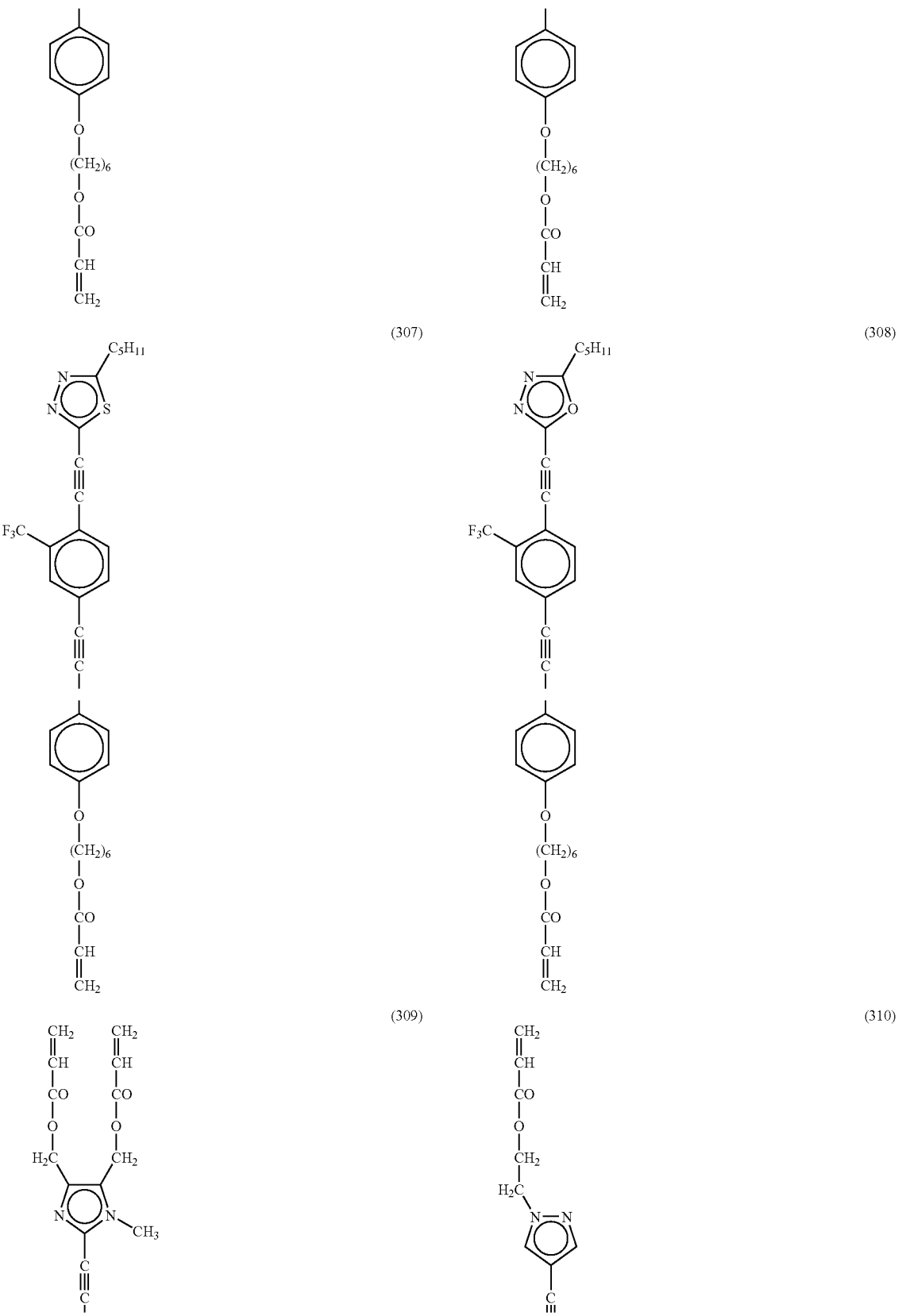

-continued
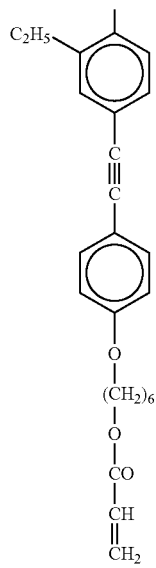 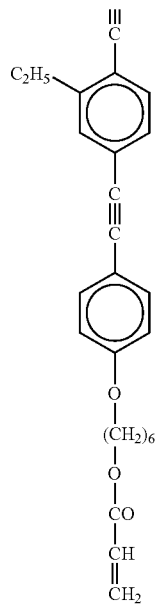
(311) 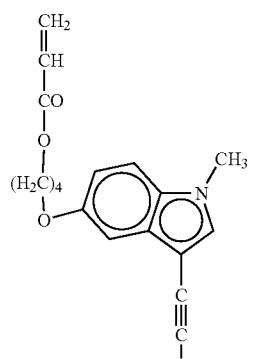
(312) 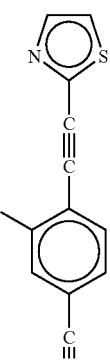
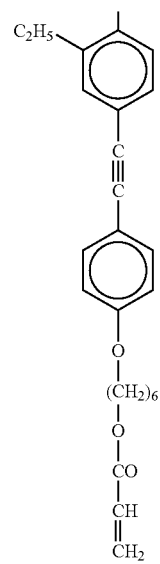 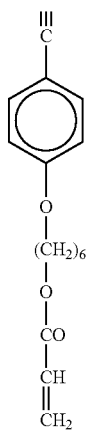

-continued
(313) 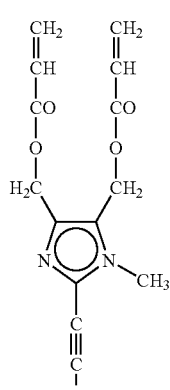 (314) 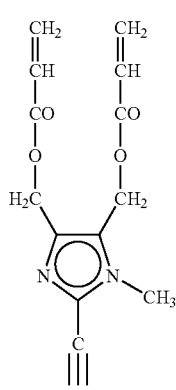
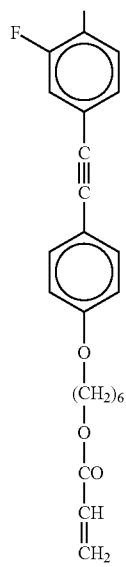 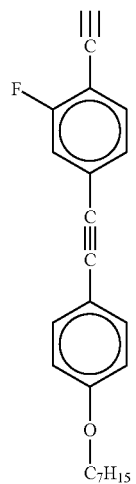
(315) 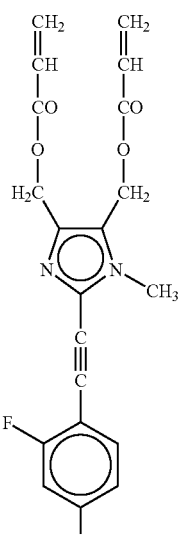 (316) 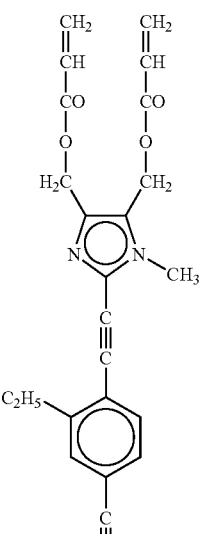

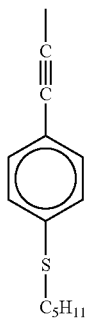
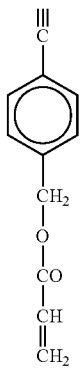
(317)
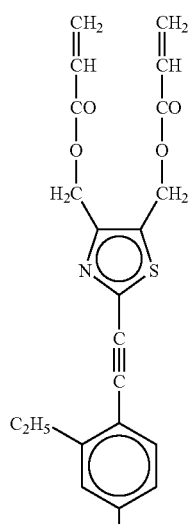
(318)
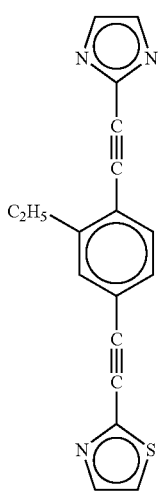

-continued
(319)
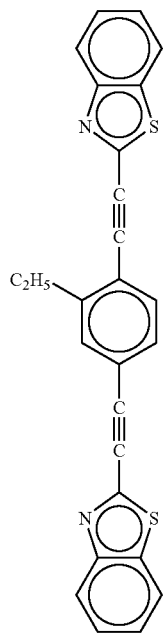
(320)
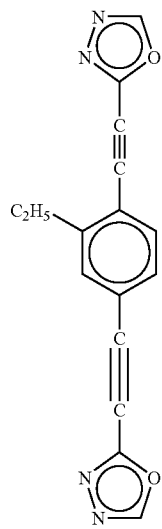
(321)
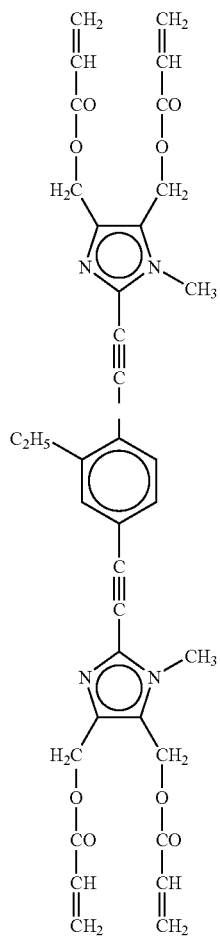
(322)
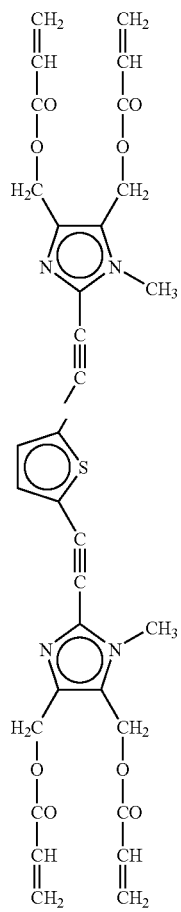

(323) 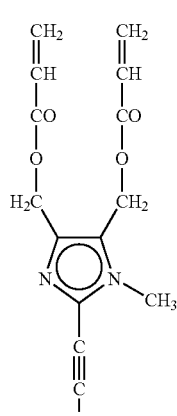 (324) 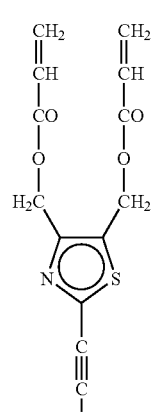
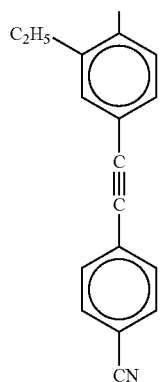 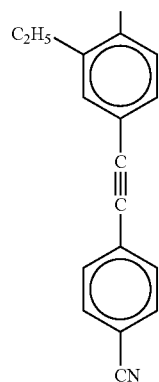
(325) 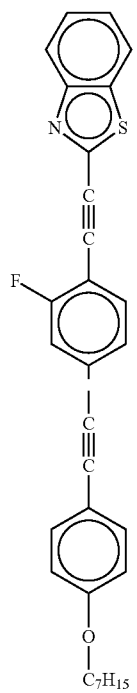 (326) 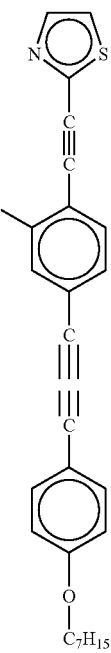

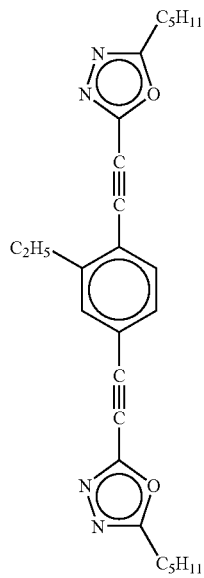
(327)
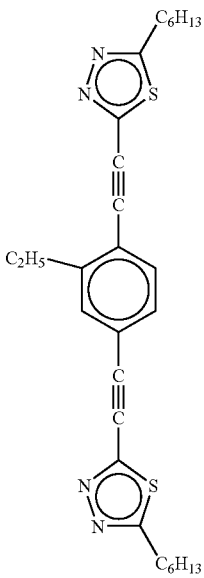
(328)
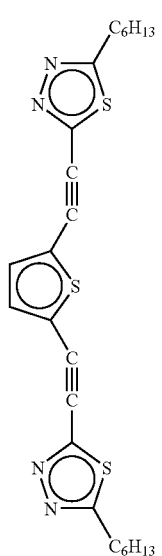
(329)
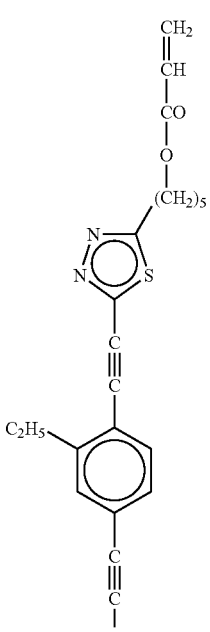
(330)

-continued
(331)
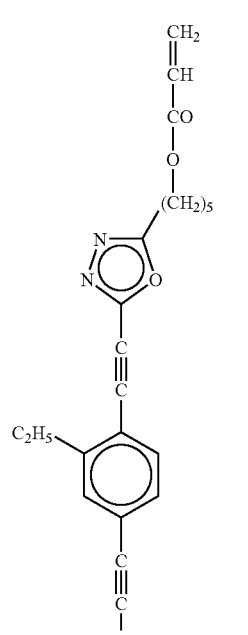
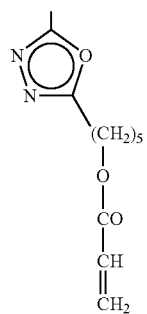
(332)
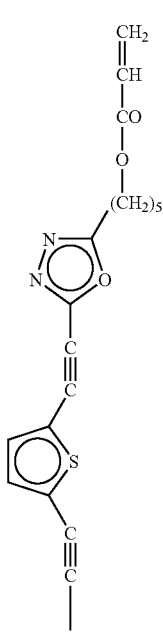
(333)
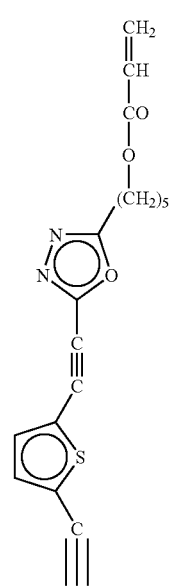
(334)
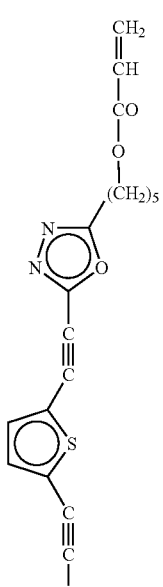

-continued
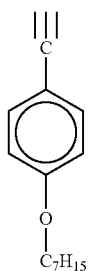 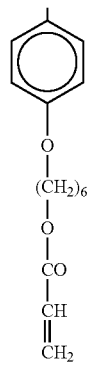
(335) 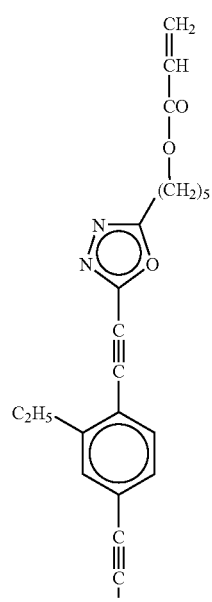 (336) 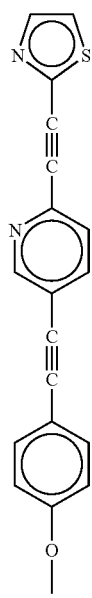
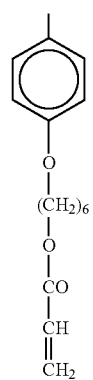 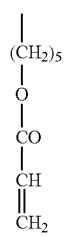

-continued
(337)
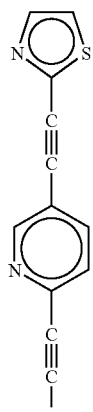
(338)
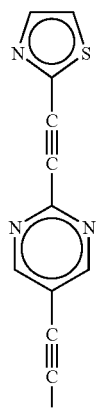
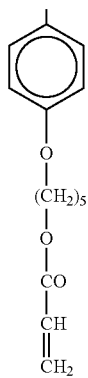
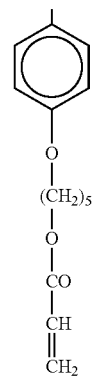
(339)
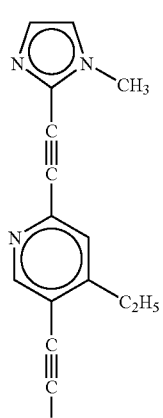
(340)
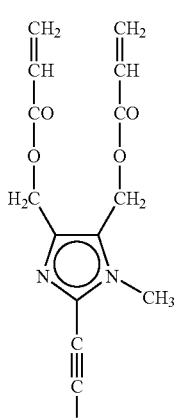

-continued
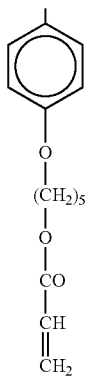 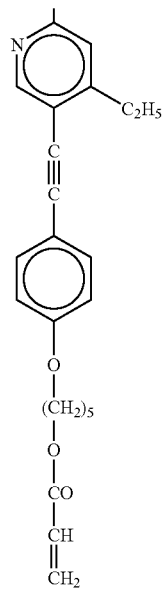
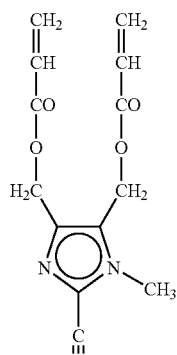 (341) 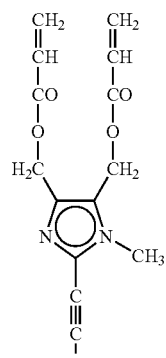 (342)
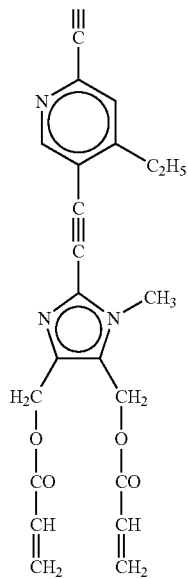 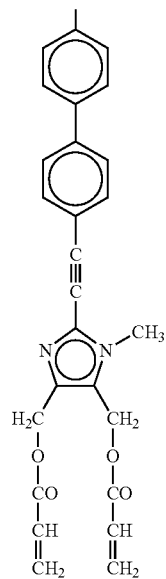

-continued
(343)
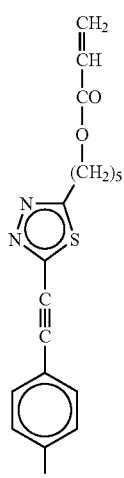
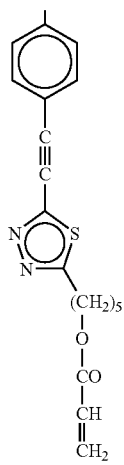
(401)
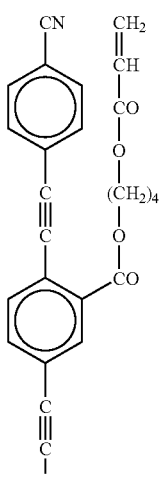
(402)
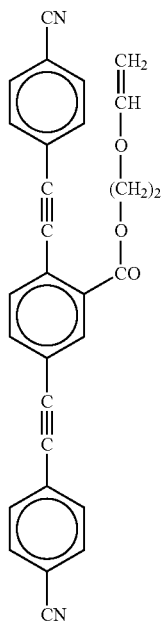
(403)
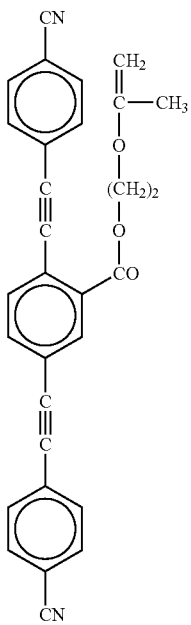

-continued
(404)
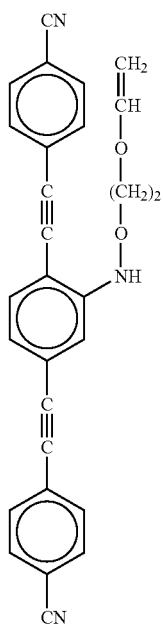
(405)
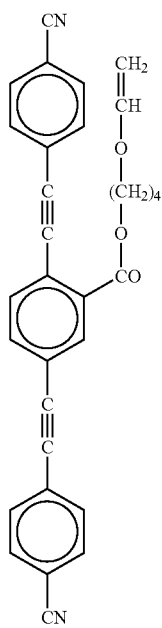
(406)
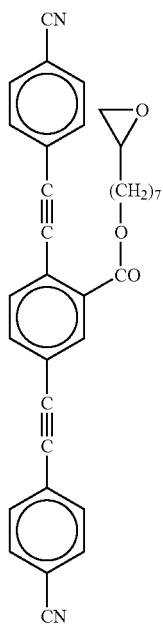
(407)
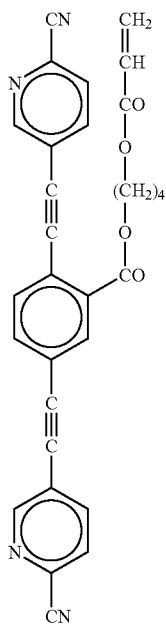

-continued
(408)
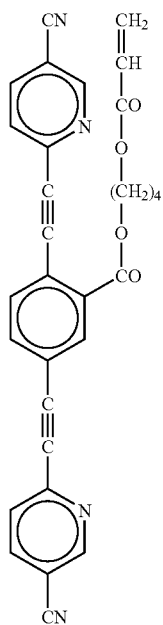
(409)
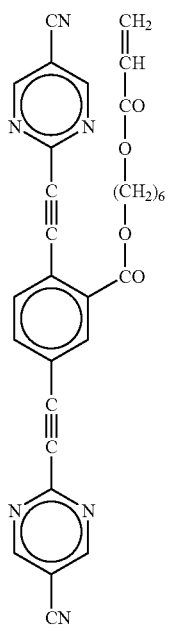
(410)
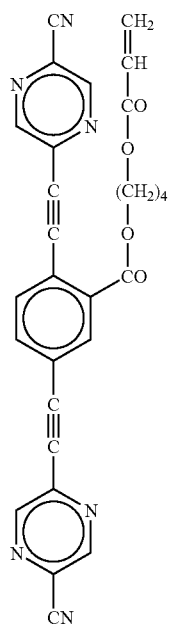
(411)
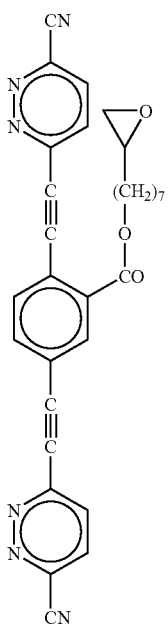

(412)
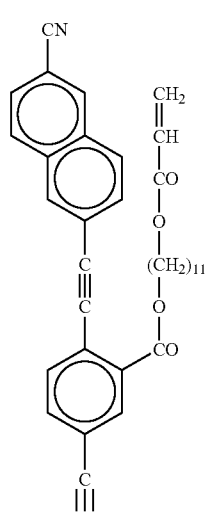
(413)
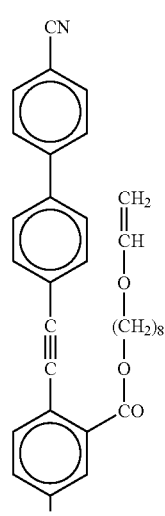
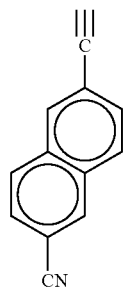
(414)
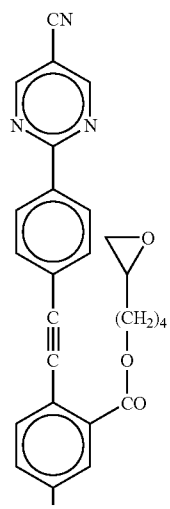
(415)
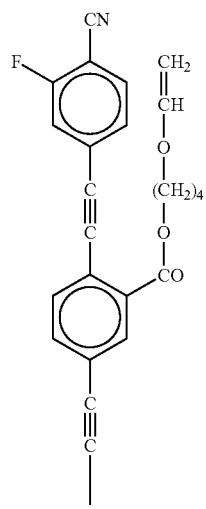

-continued
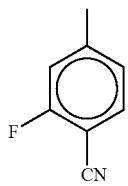
(416)
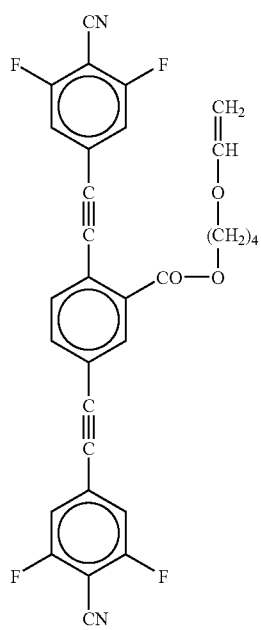
(417)
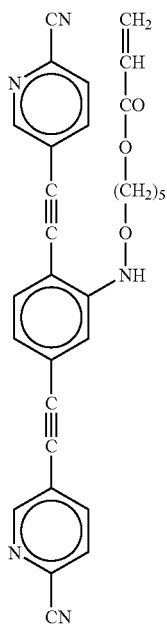
(418)
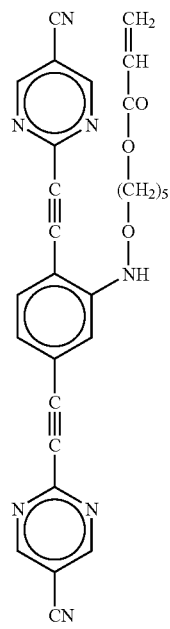
(419)
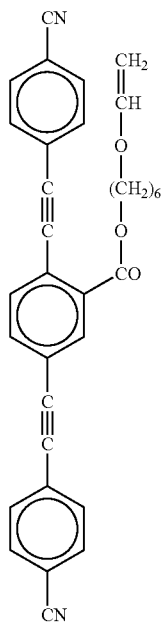

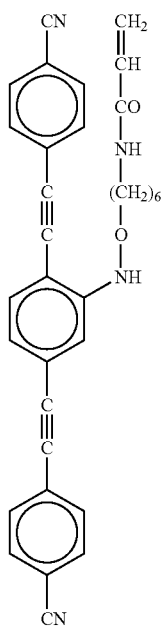 (420)
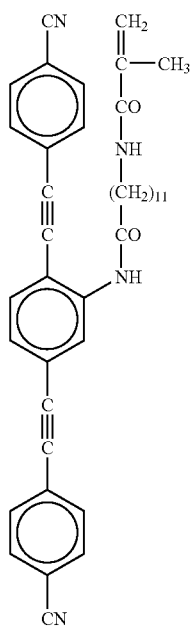 (421)
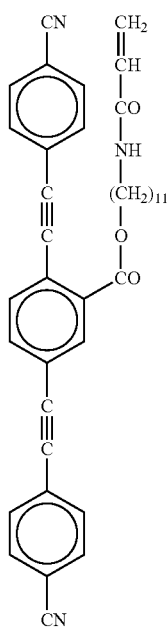 (422)
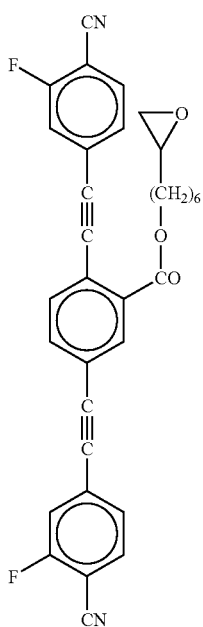 (423)

-continued
(424)
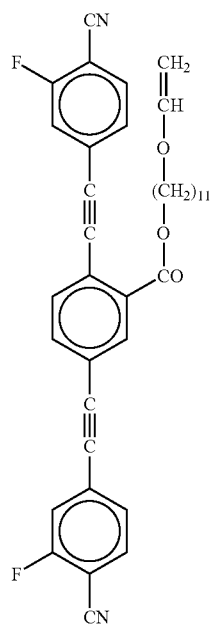
(425)
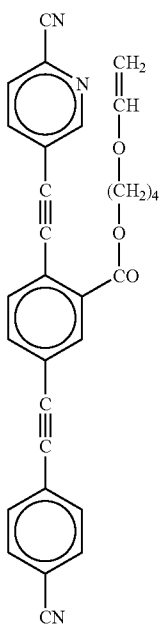
(426)
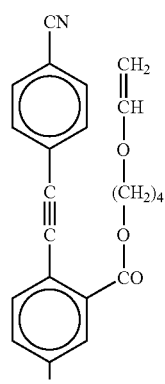
(427)
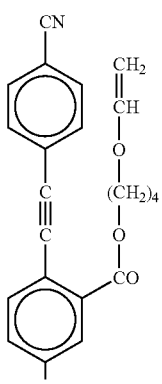
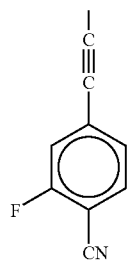

-continued
(428)
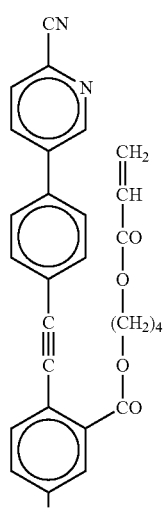
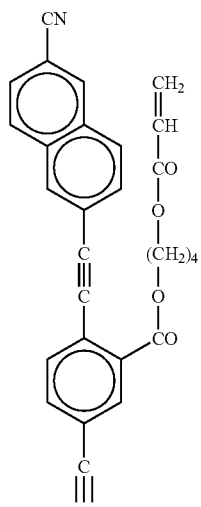
(429)
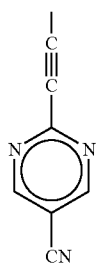
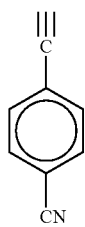
(430)
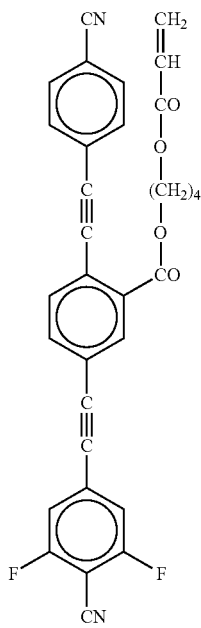
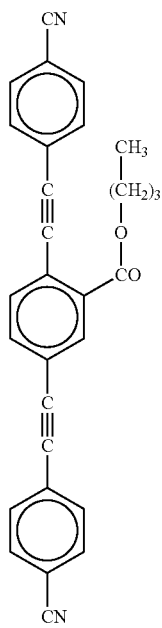
(431)

-continued
(432)
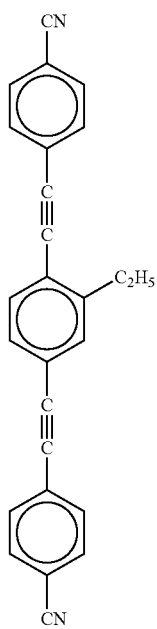
(433)
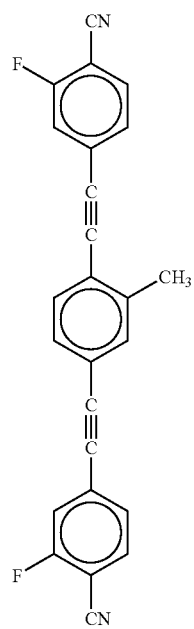
(434)
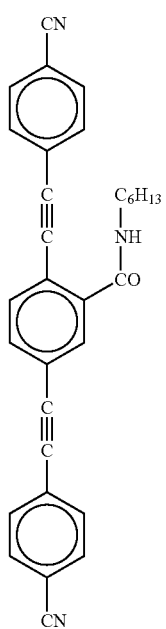
(435)
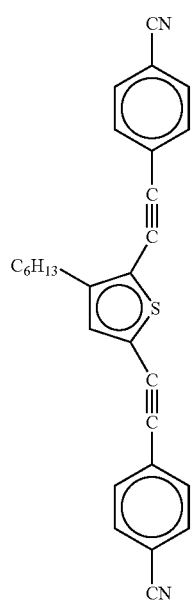

-continued
(436)
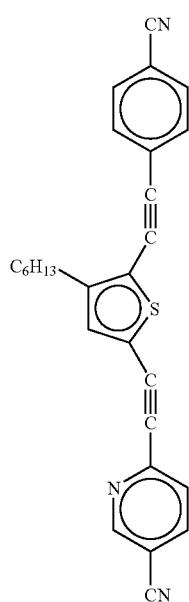
(437)
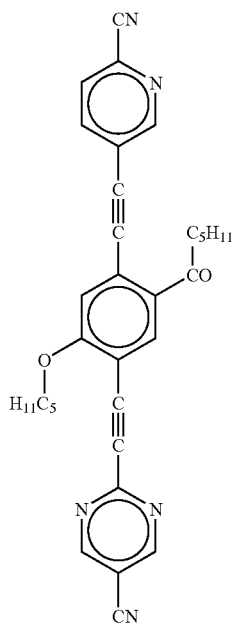
(438)
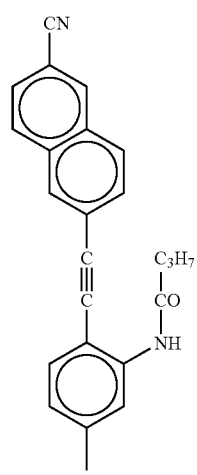
(439)
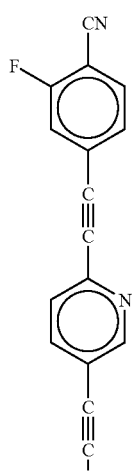
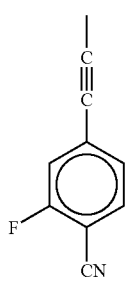
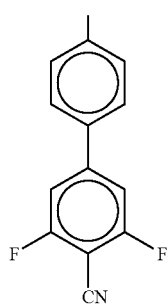

-continued
(440)
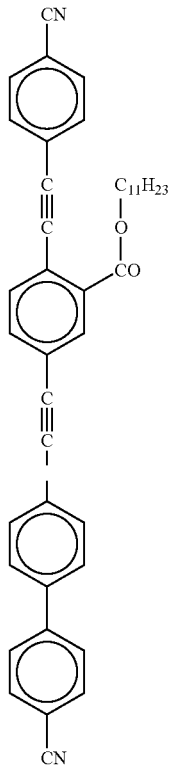
(441)
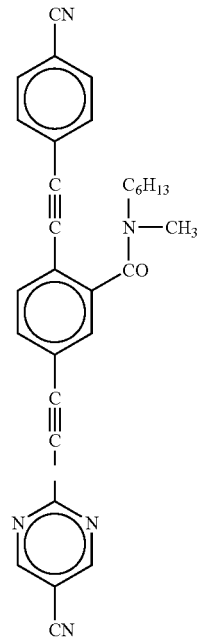
(442)
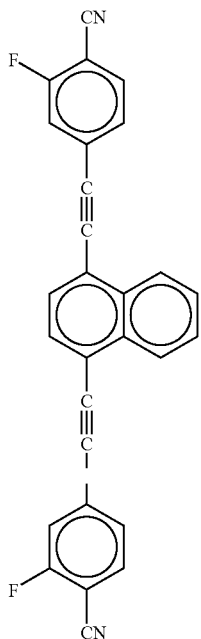
(443)
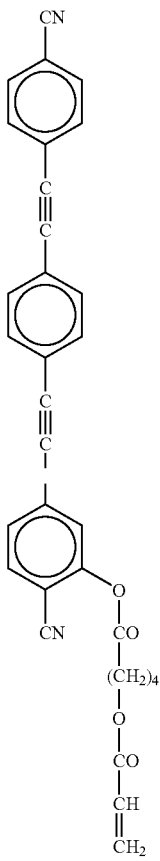

(444)
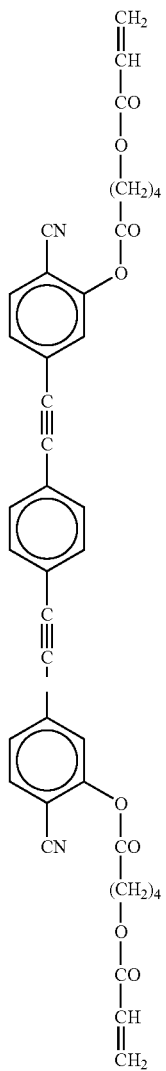
(445)
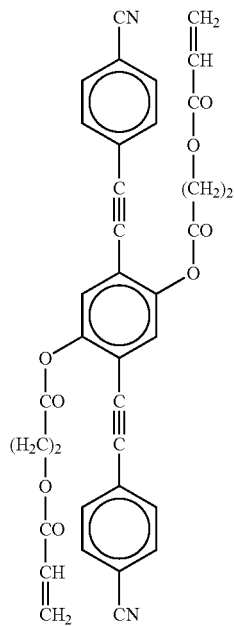
(446)
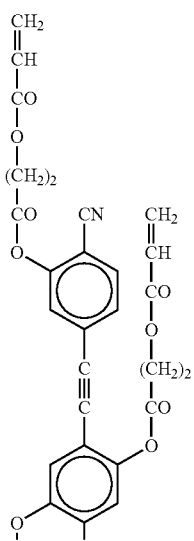
(447)
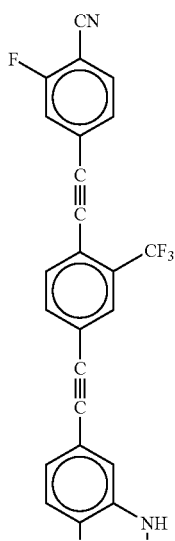

-continued
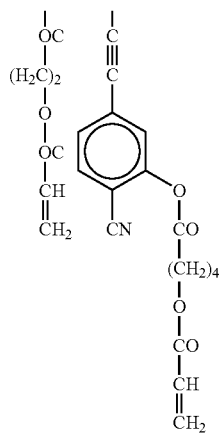 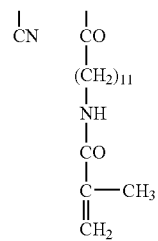
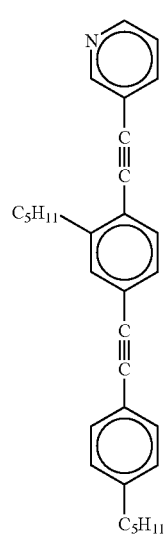 (501) 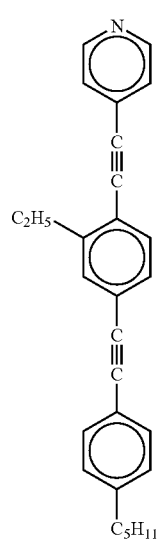 (502)
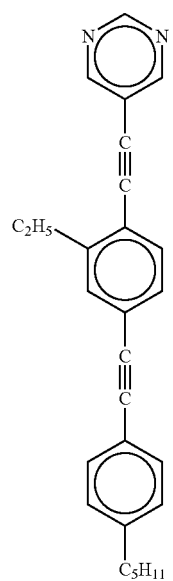 (503) 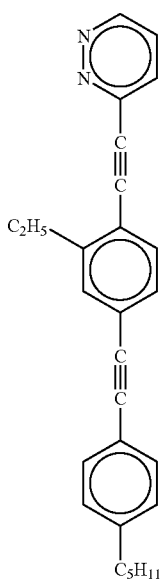 (504)

-continued
(505)
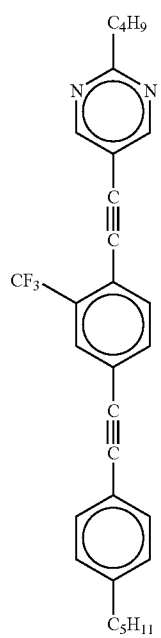
(506)
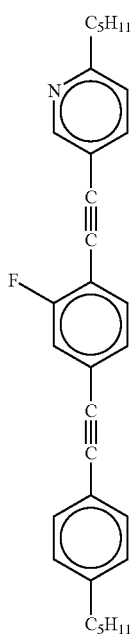
(507)
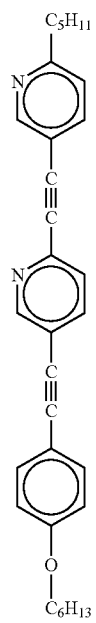
(508)
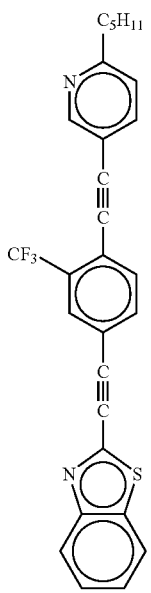

-continued
(509)
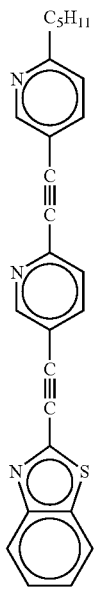
(510)
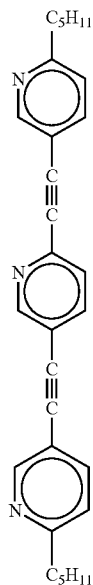
(511)
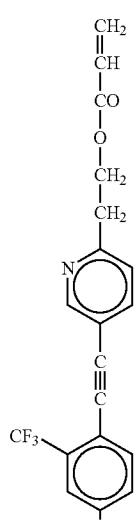
(512)
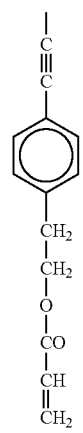
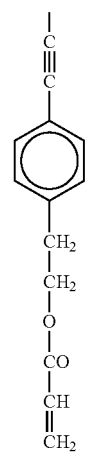

-continued
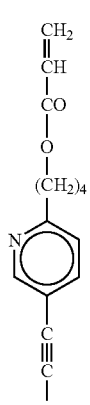 (513)
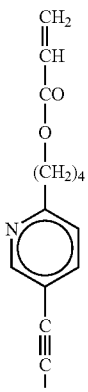 (514)
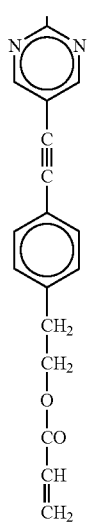
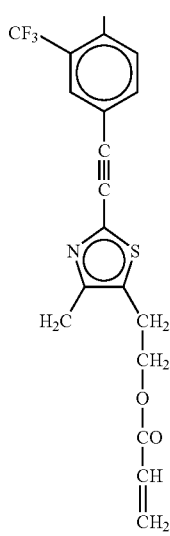
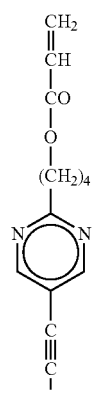 (515)
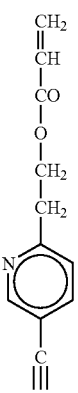 (516)

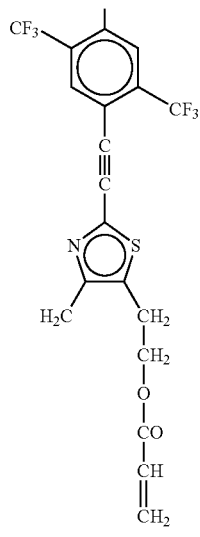
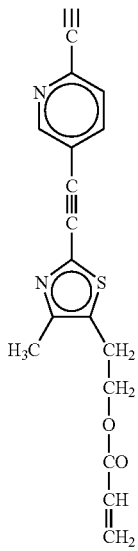
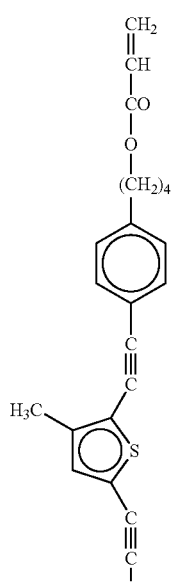
(517)
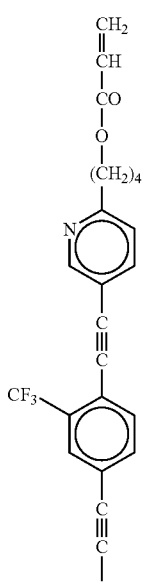
(518)
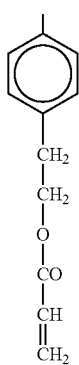
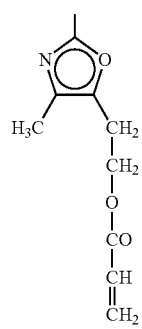

-continued
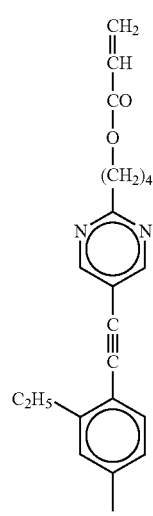 (519)
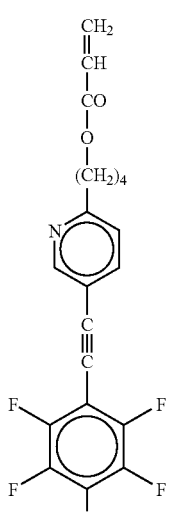 (520)
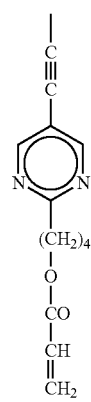
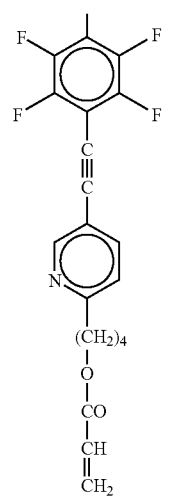
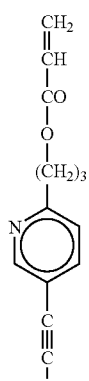 (521)
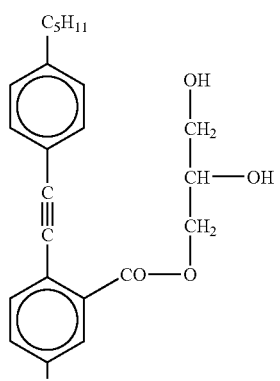 (601)

-continued
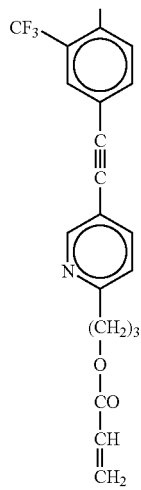
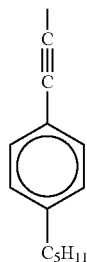
(602)
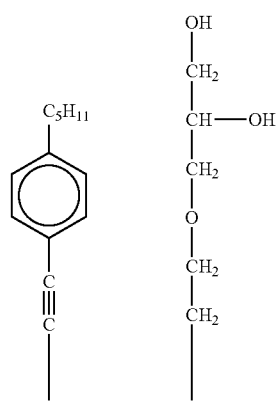
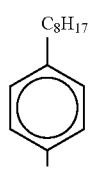
(603)
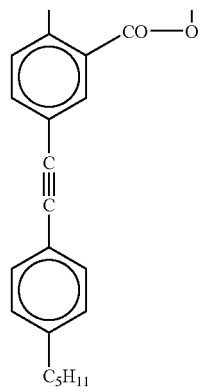
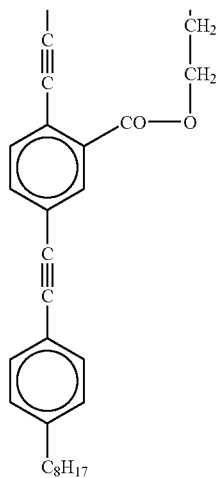

-continued
(604)
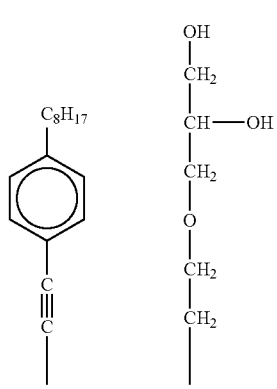
(605)
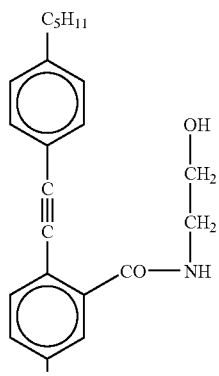
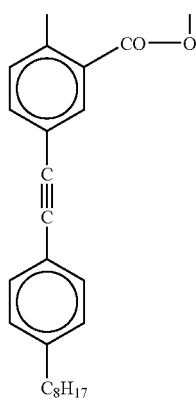
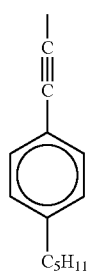
(606)
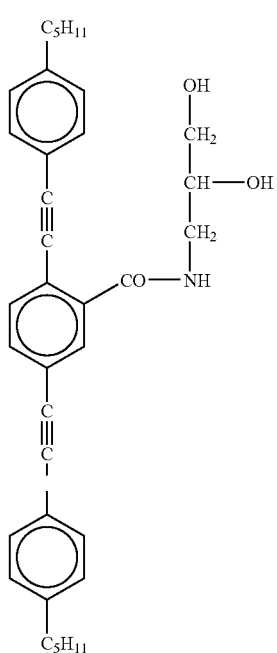
(607)
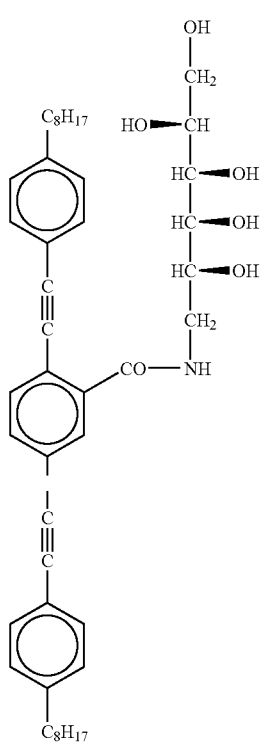

-continued
(608)
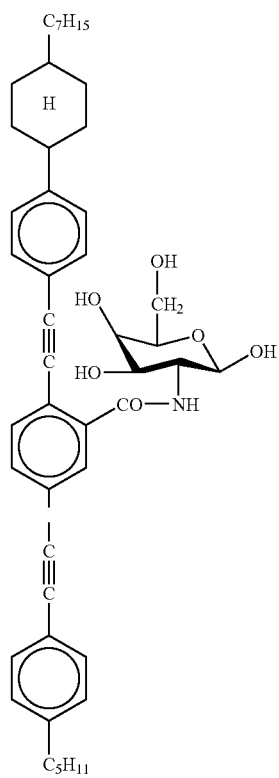
(609)
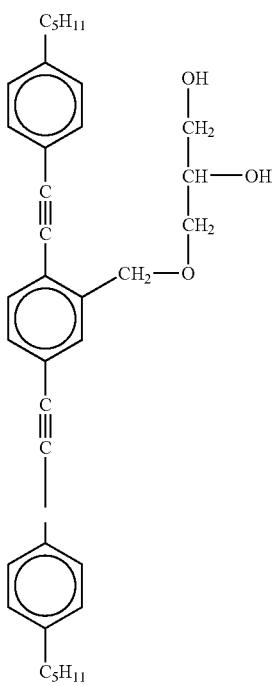
(610)
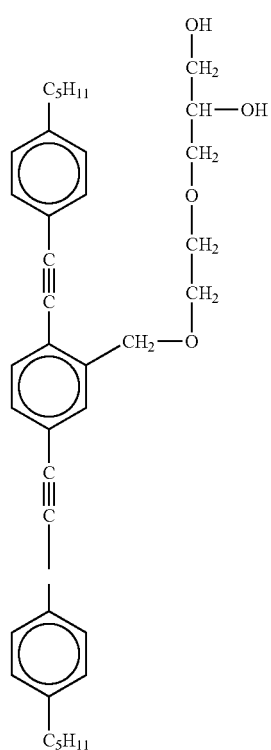
(611)
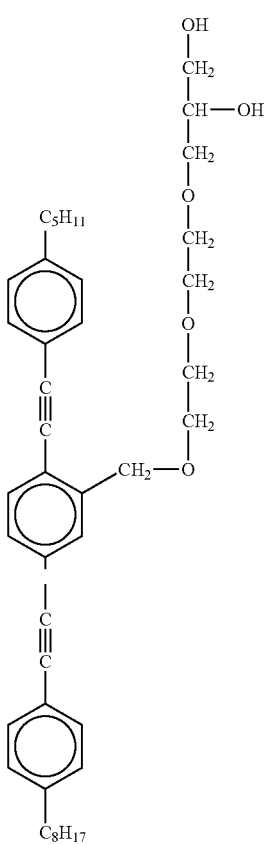

-continued
(612) 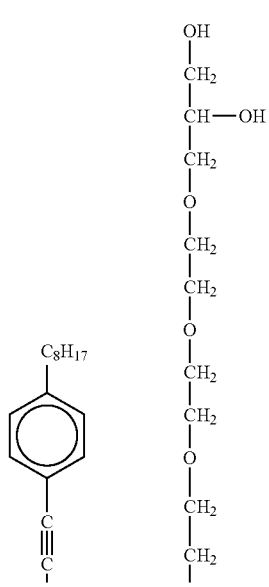
(613) 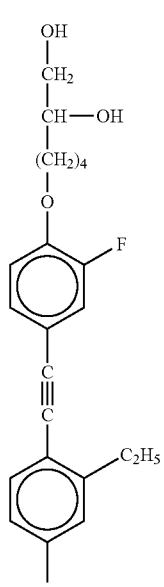
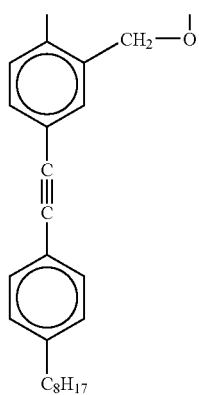
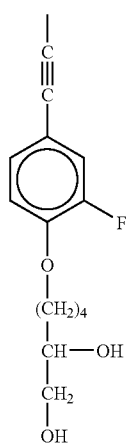
(614) 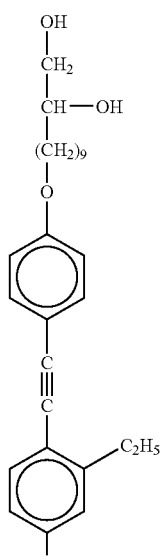
(615) 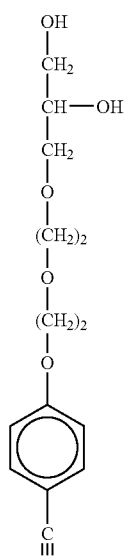

-continued
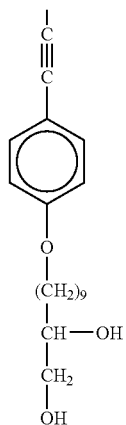
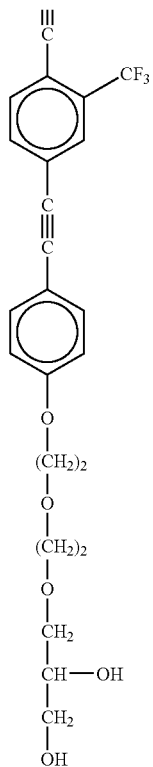
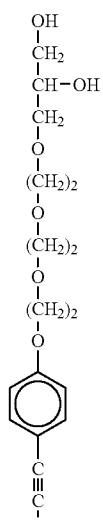
(616)
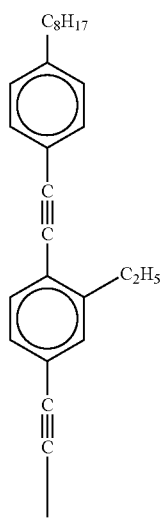
(617)

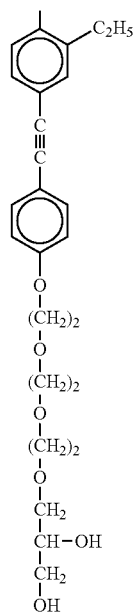
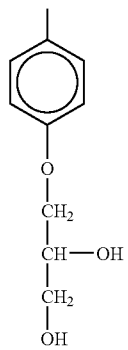
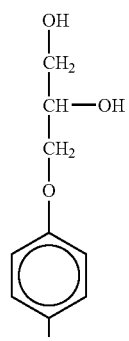
(618)
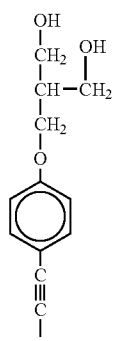
(619)
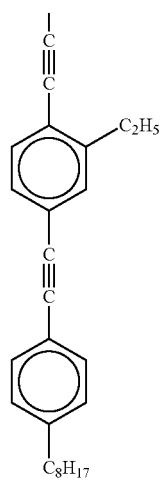
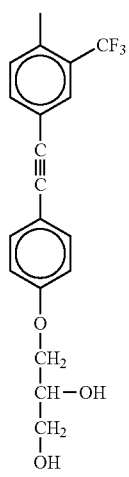

-continued
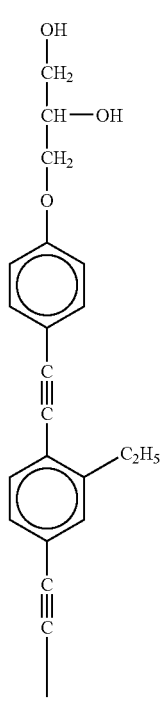
(620)
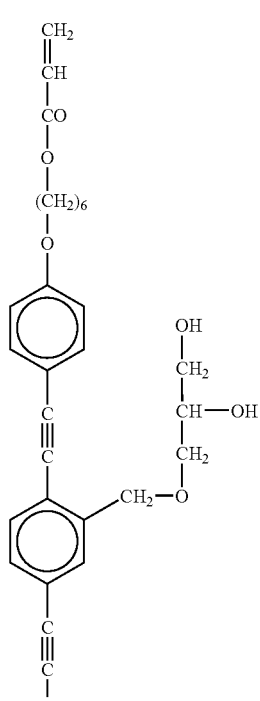
(621)
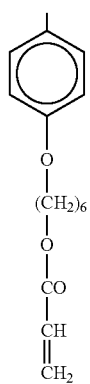
(622)
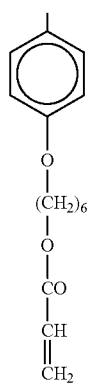
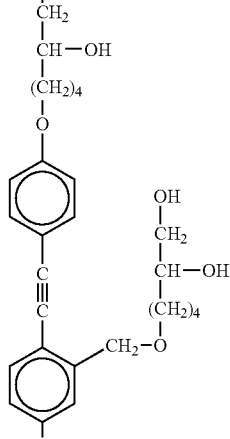
(623)

-continued
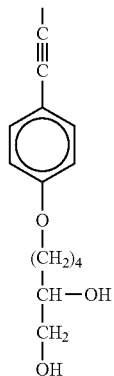 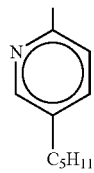
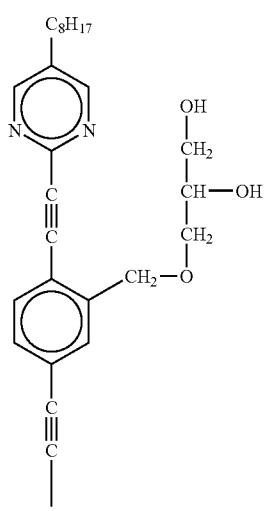
(624)
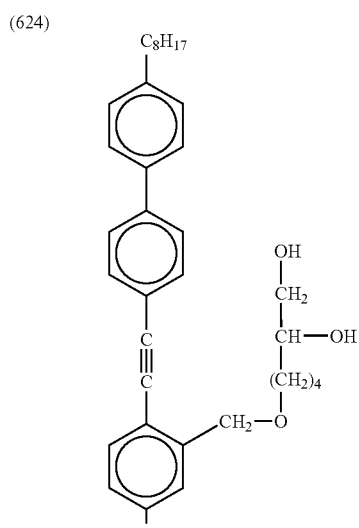
(625)

-continued
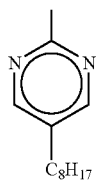
(626)
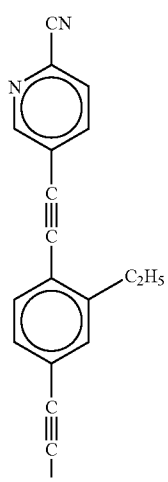
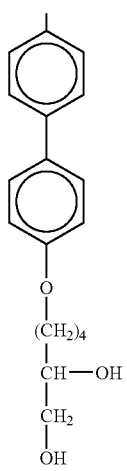

The compound represented by the formula (I) can be synthesized according to, for example, Macromolecules, 26(1993), pp. 5840, J. Mater. Chem., 4(1994), pp. 1547 and Japanese Patent Publication No. 2000-198755.

SYNTHESIS EXAMPLE 1

Synthesis of Compound (1)

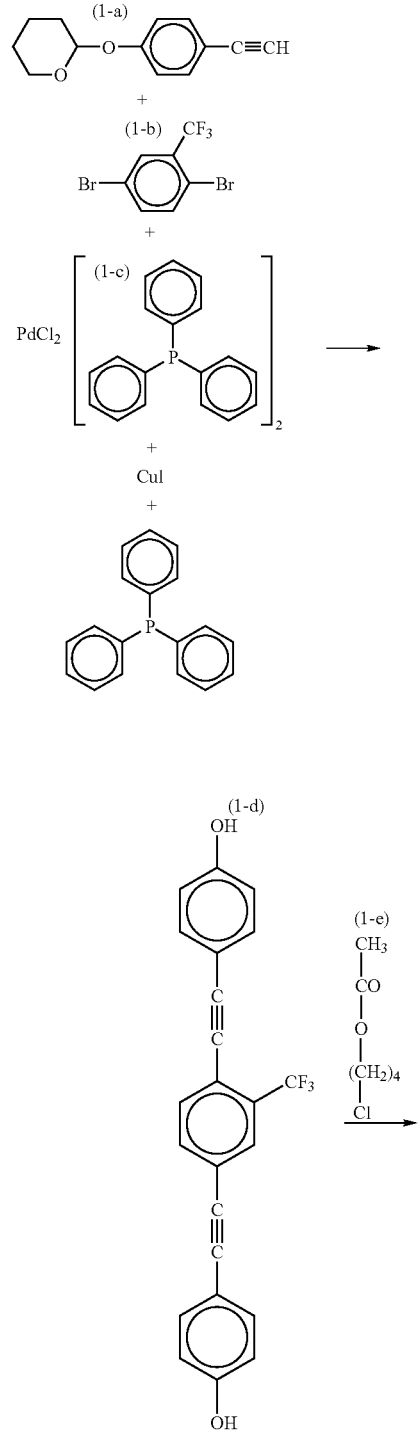

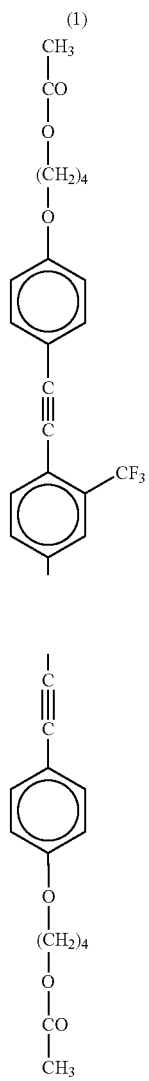

A mixture of 0.34 mol of Compound (1-a), 0.165 mol of Compound (1-b), 0.00049 mol of Compound (1-c), 0.00059 mol of copper(I) iodide and 0.0025 mol of triphenylphosphine was added into 480 ml of triethyl amine, and then refluxed under nitrogen gas atmosphere for 8 hours. After cooled to room temperature, 800 ml of ethyl acetate was added to the reaction liquid to precipitate fine crystals. The formed crystals were removed by filtration, and washed with 200 ml of ethyl acetate. The filtrate was condensed under reduced pressure, and the residue was dissolved in 500 ml of tetrahydrofuran. To the solution, 60 ml of water and 20 ml of concentrated hydrochloric acid were added and stirred for 3 hours at room temperature. After 400 ml of ethyl acetate was further added, the organic phase was washed with water.

The organic phase was condensed, and then purified through silica-gel column chromatography (eluent: ethyl acetate/hexane, 1/4 to 1/2 by volume) to obtain Compound (1-d). [Yield: 64%]

To 150 ml of dimethylacetamide solution containing 0.20 mol of Compound (1-d), an oil dispersion containing 0.60 mol of sodium hydride was added under nitrogen gas atmosphere. The mixture was stirred at room temperature for 30 minutes, and then 0.44 mol of Compound (1-e) was added. The liquid was allowed to react at 70° C. for 8 hours. After cooled to room temperature, 400 ml of ethyl acetate, 100 ml of 2M hydrochloric acid and 400 ml of water were added. The aqueous phase was removed, and the organic phase was washed twice with 300 ml of 1M hydrochloric acid and once with 200 ml of saturated aqueous NaCl solution. The washed organic phase was dried with magnesium sulfate, and then condensed. The residue was purified through silica-gel column chromatography (eluent: ethyl acetate/hexane, 1/4 by volume) to obtain Compound (1). [Yield: 83%]

The obtained compound showed phase transition to Nematic phase at 85° C. and to isotropic phase at 116° C.

SYNTHESIS EXAMPLE 2

Synthesis of Compound (2)

In 300 ml of ethanol, 0.02 mol of Compound (1) and 0.06 mol of t-butoxy potassium were mixed and refluxed for 4 hours. After ethanol was removed, 300 ml of ethyl acetate, 300 ml of water and 20 ml of concentrated hydrochloric acid were added. The aqueous phase was removed, and the organic phase was washed with 0.5 M hydrochloric acid, dried with magnesium sulfate, and condensed. The residue was purified through silica-gel column chromatography (eluent: ethyl acetate) to obtain Compound (2). [Yield: 92%]

The obtained compound showed phase transition to Nematic phase at 138° C. and to isotropic phase at 201° C.

SYNTHESIS EXAMPLE 3

Synthesis of Compound (3)

To 50 ml of dimethylacetamide solution containing 0.01 mol of Compound (2), 0.03 mol of acrylic chloride was added and allowed to react for 5 hours. After 100 ml of ethyl acetate was added, the reaction liquid was washed three times with 200 ml of 1 M hydrochloric acid. The organic phase was dried with magnesium sulfate, and condensed. The residue was purified through silica-gel column chromatography (eluent: ethyl acetate/hexane, 1/4 by volume) to obtain Compound (3). [Yield: 75%]

The obtained compound showed phase transition to Nematic phase at 62° C. and to isotropic phase at 107° C.

SYNTHESIS EXAMPLE 4

Synthesis of Compound (101)

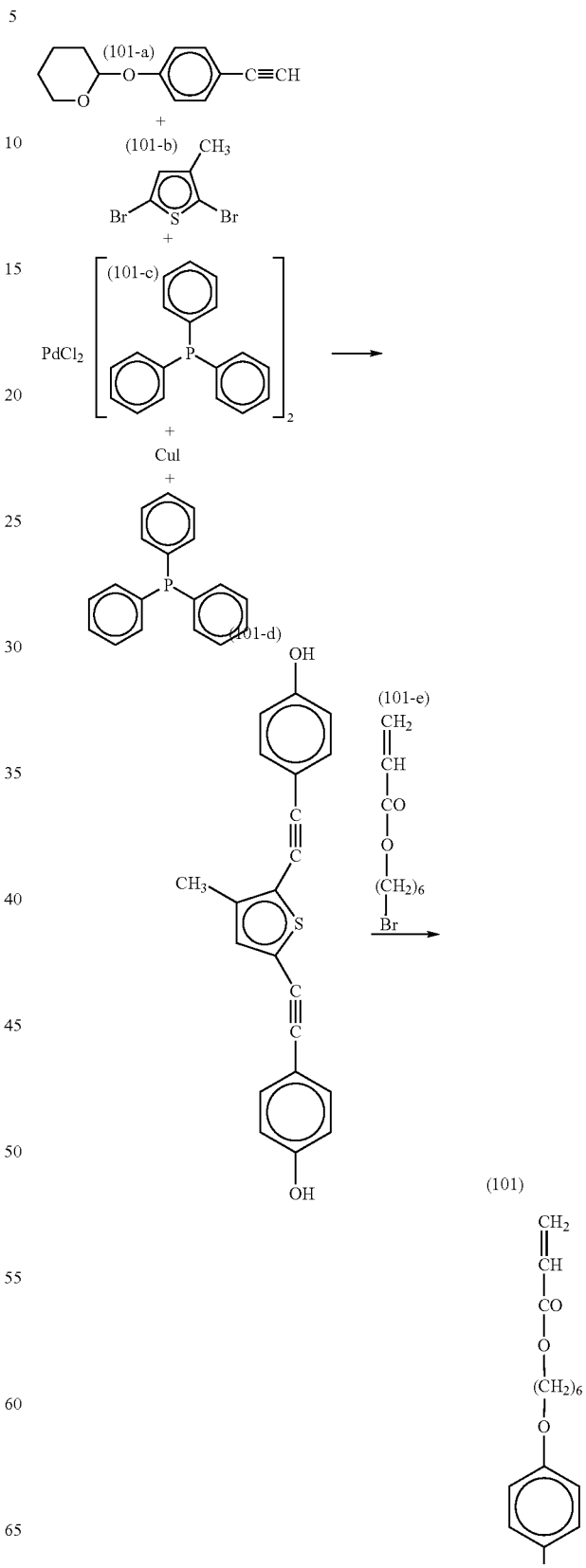

-continued

[Structure: I-C≡C-(3-methylthiophene-2,5-diyl)-C≡C-C6H4-O-(CH2)6-O-CO-CH=CH2]

A mixture of 0.34 mol of Compound (101-a), 0.165 mol of Compound (101-b), 0.00049 mol of Compound (101-c), 0.00059 mol of copper(I) iodide and 0.0025 mol of triphenylphosphine was added into 480 ml of triethyl amine, and then refluxed under nitrogen gas atmosphere for 8 hours. After cooled to room temperature, 800 ml of ethyl acetate was added to the reaction liquid to precipitate fine crystals. The formed crystals were removed by filtration, and washed with 200 ml of ethyl acetate. The filtrate was condensed under reduced pressure, and the residue was dissolved in 500 ml of tetrahydrofuran. To the solution, 60 ml of water and 20 ml of concentrated hydrochloric acid were added and stirred for 3 hours at room temperature. After 400 ml of ethyl acetate was further added, the organic phase was washed with water. The organic phase was condensed, and then purified through silica-gel column chromatography (eluent: ethyl acetate/hexane, 1/4 to 1/2 by volume) to obtain Compound (101-d). [Yield: 58%]

To 50 ml of dimethylacetamide solution containing 0.01 mol of Compound (101-d), 0.022 mol of Compound (101-e) was added and allowed to react for 5 hours at room temperature. After 100 ml of ethyl acetate was added, the liquid was washed three times with 200 ml of 1M hydrochloric acid. The organic phase was dried with magnesium sulfate, and then condensed. The residue was purified through silica-gel column chromatography (eluent: ethyl acetate/hexane, 1/4 by volume) to obtain Compound (101). [Yield: 31%]

The obtained compound showed phase transition to Nematic phase at 64° C. and to isotropic phase at 67° C.

SYNTHESIS EXAMPLE 5

Synthesis of Compound (123)

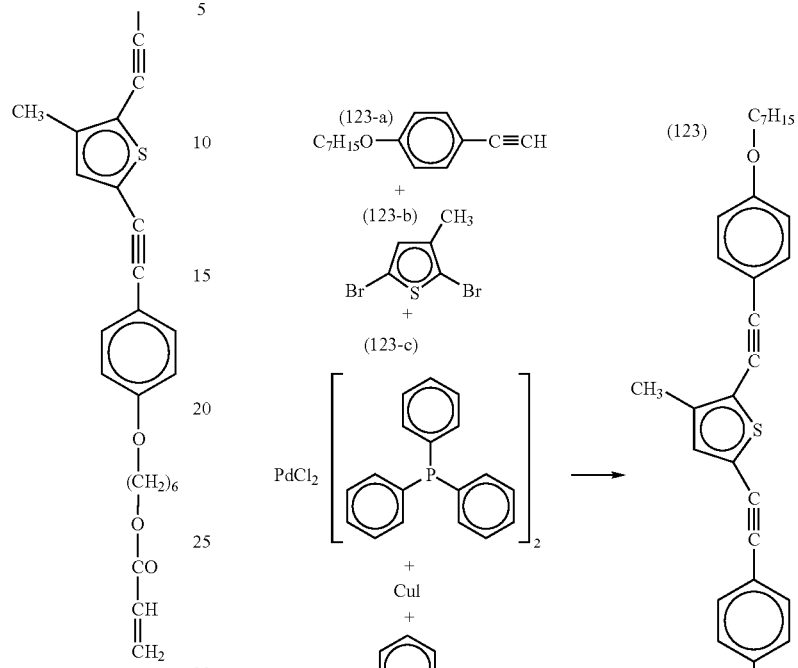

A mixture of 40 mmol of Compound (123-a), 19.5 mmol of Compound (123-b), 0.19 mmol of Compound (123-c), 0.59 mmol of copper(I) iodide and 2.5 mmol of triphenylphosphine was added into a mixed solvent of 30 ml of triethyl amine and 30 ml of tetrahydrofuran, and then refluxed under nitrogen gas atmosphere for 8 hours. After cooled to room temperature, 100 ml of ethyl acetate was added to the reaction liquid to precipitate fine crystals. The formed crystals were removed by filtration! and washed with 50 ml of ethyl acetate. The filtrate was condensed under reduced pressure, and the residue was dissolved in 100 ml of ethyl acetate. After washed with water, the organic phase was condensed and recrystallized twice from a mixed solvent of ethyl acetate/hexane to obtain Compound (123). [Yield: 52%]

The obtained compound showed phase transition to Nematic phase at 76° C. and to isotropic phase at 101° C.

SYNTHESIS EXAMPLE 6

Synthesis of Compound (121)

The procedure of Synthesis example 5 is repeated except that 2,5-dibromothiophene was used in place of 2,5-dibromo-3-methylthiophene (123-b), to prepare Compound (121).-

The obtained compound showed phase transition to Nematic phase at 78° C. and to isotropic phase at 125° C.

SYNTHESIS EXAMPLE 7

Synthesis of Compound (122)

The procedure of Synthesis example 5 is repeated except that 5,5'-dibromo-2,2'-bithiophene was used in place of 2,5-dibromo-3-methylthiophene (123-b), to prepare Compound (122).

The obtained compound showed phase transition to Nematic phase at 158° C. and to isotropic phase at 214° C.

SYNTHESIS EXAMPLE 8

Synthesis of Compound (135)

The procedure of Synthesis example 2 is repeated except that 2,5-dibromofuran was used in place of 2,5-dibromo-3-methylthiophene (123-b), to prepare Compound (135).

The obtained compound showed phase transition from isotropic phase to Nematic phase at 101° C. while the temperature is descending.

SYNTHESIS EXAMPLE 9

Synthesis of Compound (201)

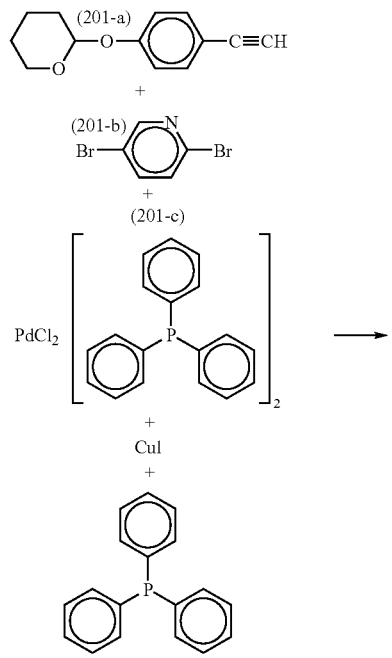

A mixture of 0.41 mol of Compound (201-a), 0.20 mol of Compound (201-b), 0.00059 mol of Compound (201-c), 0.00072 mol of copper(I) iodide and 0.0030 mol of triphenylphosphine was added into 600 ml of triethyl amine, and then refluxed under nitrogen gas atmosphere for 8 hours. After cooled to room temperature, 1,000 ml of ethyl acetate was added to the reaction liquid to precipitate fine crystals. The formed crystals were removed by filtration, and washed with 200 ml of ethyl acetate. The filtrate was condensed under reduced pressure, and the residue was dissolved in 600 ml of tetrahydrofuran. To the solution, 80 ml of water and 25 ml of concentrated hydrochloric acid were added and stirred for 3 hours at room temperature. After 500 ml of chloroform was added, the organic phase was washed with water. The organic phase was condensed, and then purified through silica-gel column chromatography (eluent: chloroform/hexane, 1/2 to 3/1 by volume) to obtain Compound (201-d). [Yield: 53%]

To 50 ml of dimethylacetamide solution containing 0.01 mol of Compound (201-d), 0.022 mol of Compound (201-e) was added and allowed to react for 5 hours at room temperature. After 200 ml of ethyl acetate was added, the liquid was washed three times with 200 ml of 1M citric acid. The organic phase was dried with magnesium sulfate, and then condensed. The residue was purified through silica-gel column chromatography (eluent: ethyl acetate/hexane, 1/4 to 1/2, by volume) to obtain Compound (201), which was confirmed by mass spectrum. [Yield: 34%]

SYNTHESIS EXAMPLE 10

Synthesis of Compound (316)

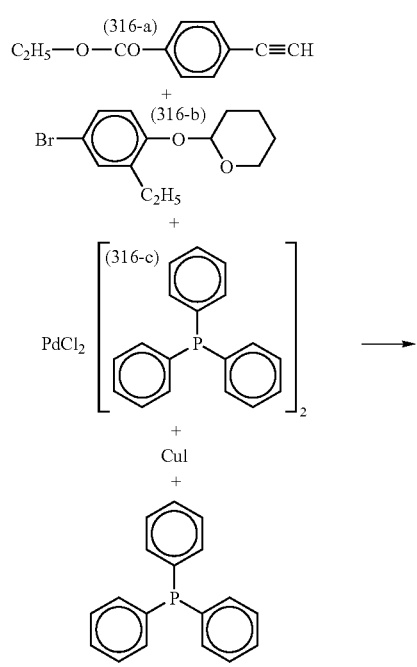

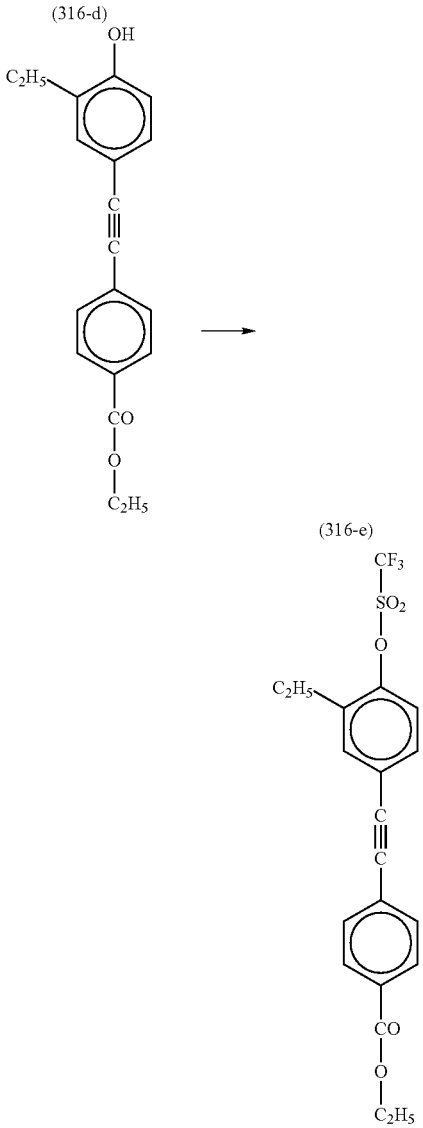

A mixture of 0.3 mol of Compound (316-a), 0.315 mol of Compound (316-b), 0.9 mmol of Compound (316-c), 1.08 mmol of copper(I) iodide and 4.5 mmol of triphenylphosphine was added into 600 ml of triethyl amine, and then refluxed under nitrogen gas atmosphere for 8 hours. After cooled to room temperature, 800 ml of ethyl acetate was added to the reaction liquid to precipitate fine crystals. The formed. crystals were removed by filtration, and washed with 200 ml of ethyl acetate. The filtrate was condensed under reduced pressure, and the residue was dissolved in 500 ml of tetrahydrofuran. To the solution, 60 ml of water and 20 ml of concentrated hydrochloric acid were added and stirred for 3 hours at room temperature. After 400 ml of ethyl acetate was further added, the organic phase was washed with water. The organic phase was condensed, and then purified through silica-gel column chromatography (eluent: ethyl acetate/hexane, 1/4 to 1/2, by volume) to obtain Compound (316-d). [Yield: 72%]

In a mixed solvent of 400 ml of toluene and 160 ml of pyridine, 0.2 mol of Compound (316-d) was dissolved and cooled to 0° C. To the solution, 180 ml of toluene solution dissolving 0.3 mol of trifluorosulfuric acid anhydride was dropped while the reaction liquid was kept at the temperature of 15° C. or below. The liquid was stirred for 3 hours at room temperature, and then left overnight. The reaction liquid was poured into a mixed solvent of 600 ml of icy water and 400 ml of ethyl acetate, and stirred for 1 hour. After the aqueous phase was removed, the organic phase was washed twice with 300 ml of water. The organic phase was dried with magnesium sulfate, and then condensed. The residue was purified through silica-gel column chromatography (eluent: ethyl acetate/hexane, 1/7 to 1/4, by volume) to obtain Compound (316-e). [Yield: 92%]

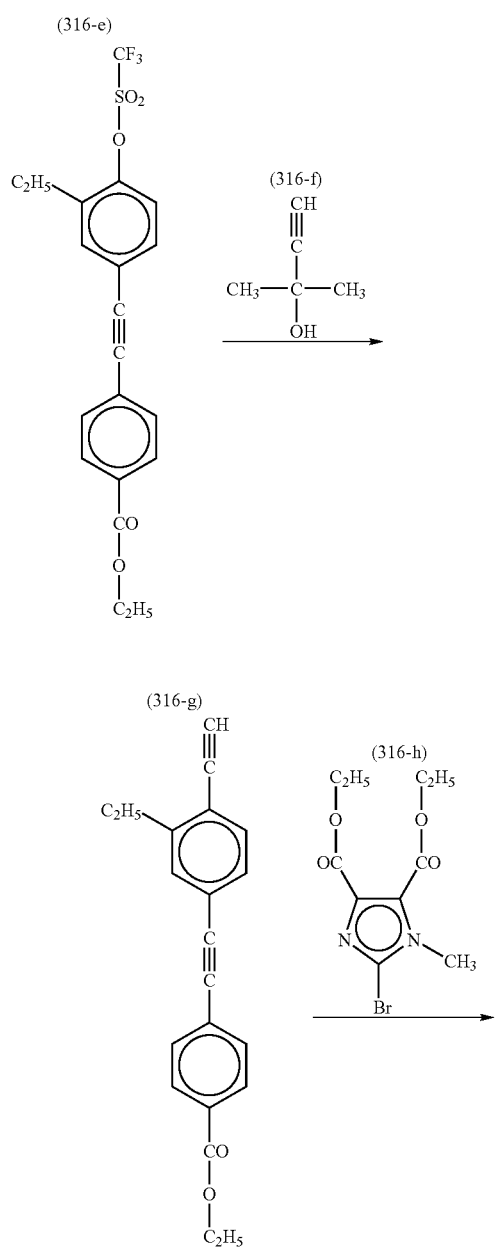

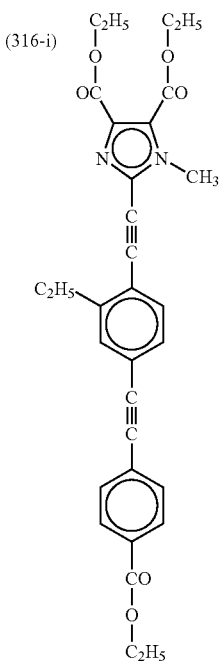

A mixture of 0.16 mol of Compound (316-e), 0.17 mol of Compound (316-f), 0.48 mmol of Compound (316-c), 0.58 mmol of copper(I) iodide and 2.4 mmol of triphenylphosphine was added into 300 ml of triethyl amine, and then refluxed under nitrogen gas atmosphere for 8 hours. After cooled to room temperature, 400 ml of ethyl acetate was added to the reaction liquid to precipitate fine crystals. The formed crystals were removed by filtration, and washed with 100 ml of ethyl acetate. After the filtrate was condensed under reduced pressure, the residue was mixed with 300 ml of isopropanol and 0.24 mol of t-butoxy potassium, followed by refluxing for 3 hours. From the reaction liquid, about 200 ml of isopropanol was distilled off under atmospheric pressure. After cooled to room temperature, 300 ml of ethyl acetate, 100 ml of 1 M hydrochloric acid and 200 ml of water were added. The aqueous phase was removed, and the organic phase was once washed with 200 ml of water. The organic phase was condensed, and the residue was purified through silica-gel column chromatography (eluent: ethyl acetate/hexane, 1/4 to 1/2, by volume) to obtain Compound (316-g). [Yield: 58%]

A mixture of 0.08 mol of Compound (316-g), 0.085 mol of Compound (316-h), 0.24 mmol of Compound (316-c), 0.29 mmol of copper(I) iodide and 1.2 mmol of triphenylphosphine was added into 150 ml of triethyl amine, and then refluxed under nitrogen gas atmosphere for 8 hours. After cooled to room temperature, 200 ml of ethyl acetate was added to the reaction liquid to precipitate fine crystals. The formed crystals were removed by filtration, and the crystals were washed with 50 ml of ethyl acetate. After the filtrate was condensed under reduced pressure, the residue was mixed with 200 ml of ethyl acetate, 50 ml of 1M citric acid and 200 ml of water. The aqueous phase was removed, and the organic phase was washed three times with 100 ml of water. The organic phase was condensed, and the residue was purified through silica-gel column chromatography (eluent: ethyl acetate/hexane, 1/4 to 1/2, by volume) to obtain Compound (316-i). [Yield: 72%]

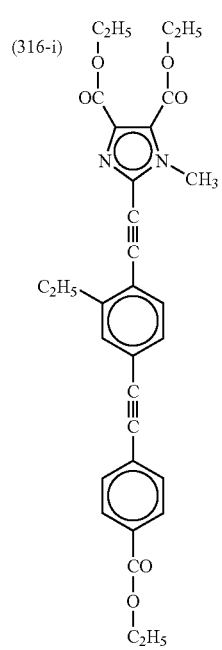

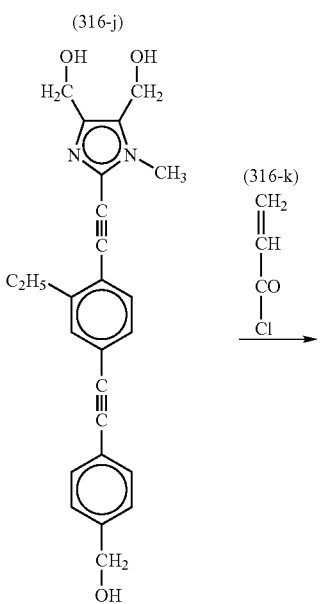

-continued

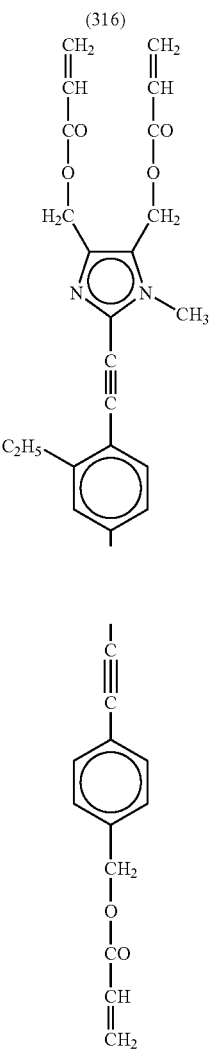

To 0.12 mol of lithium aluminium hydride, 50 ml of tetrahydrofuran was added. To the resulting solution, 50 ml of tetrahydrofuran containing 0.04 mol of Compound (316i) was slowly added. The reaction liquid was refluxed for 4 hours, and then cooled to room temperature. After further cooled with icy water, 4.55 ml of water, 4.55 ml of 15 wt. % aqueous solution of sodium hydroxide and 13.7 ml of water were sequentially and slowly added. The mixture was stirred for 2 hours at room temperature, and left overnight. The liquid was filtered, and washed with 50 ml of tetrahydrofuran. After the reaction liquid was condensed, the residue was purified through silica-gel column chromatography (eluent: chloroform/methanol, 1/0 to 10/1, by volume) to obtain Compound (316-j). [Yield: 92%]

To 50 ml of dimethylacetoamide solution containing 0.03 mol of Compound (315-j), 0.12 mol of Compound (316-k), a catalytic amount of 4-(N,N-dimethylamino)pyridine and a catalytic amount of nitrobenzene were added and allowed to react for 8 hours at room temperature. After 200 ml of ethyl acetate was added, the reaction liquid was washed three times with 200 ml of 1 M hydrochloric acid. The organic phase was dried with magnesium sulfate, and then condensed. The residue was purified through silica-gel column chromatography (eluent: ethyl acetate/hexane, 1/4, by volume) to obtain Compound (316). [Yield: 53%]

SYNTHESIS EXAMPLE 11

Synthesis of Compound (318)

SYNTHESIS EXAMPLE 12

Synthesis of Compound (326)

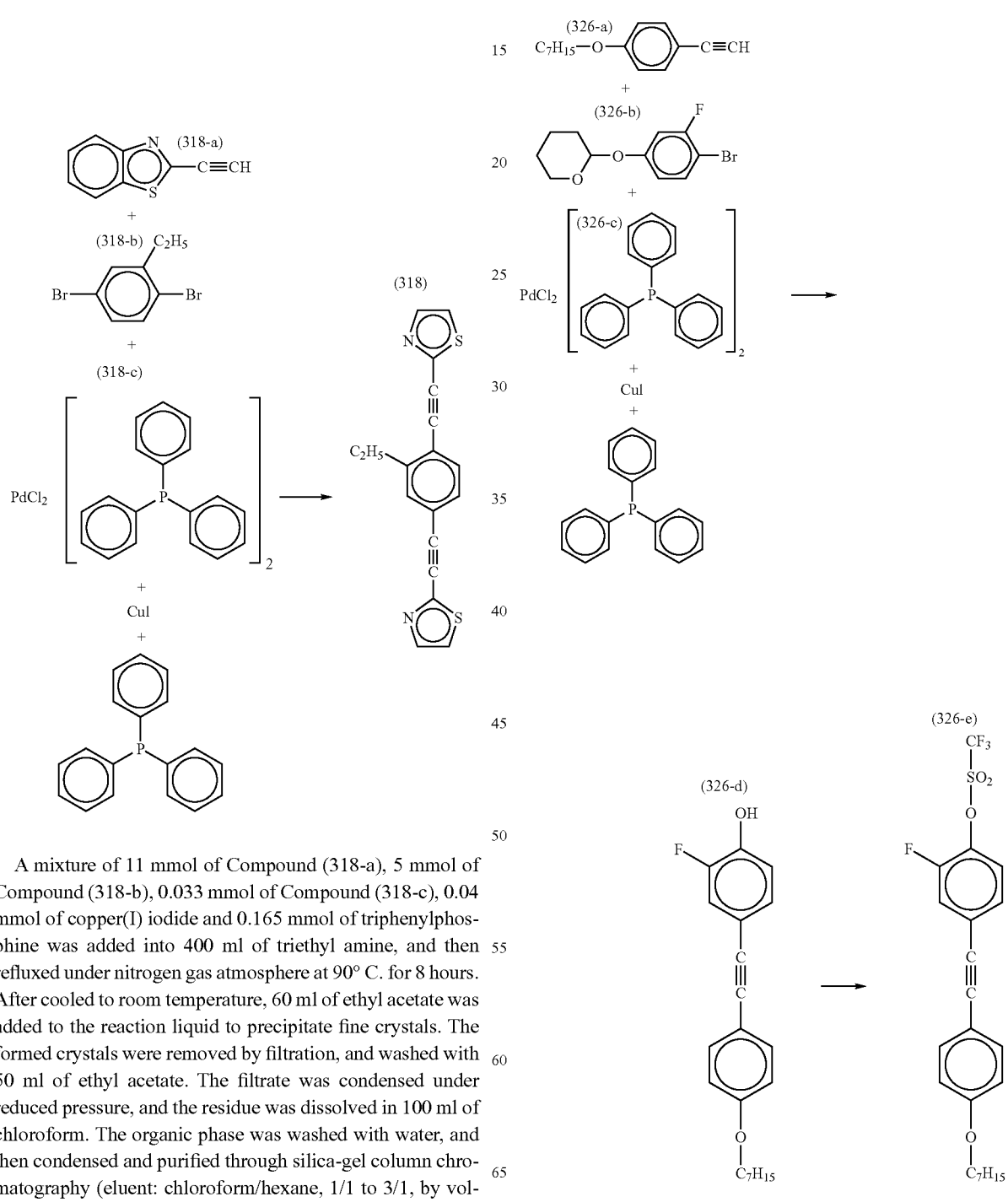

A mixture of 11 mmol of Compound (318-a), 5 mmol of Compound (318-b), 0.033 mmol of Compound (318-c), 0.04 mmol of copper(I) iodide and 0.165 mmol of triphenylphosphine was added into 400 ml of triethyl amine, and then refluxed under nitrogen gas atmosphere at 90° C. for 8 hours. After cooled to room temperature, 60 ml of ethyl acetate was added to the reaction liquid to precipitate fine crystals. The formed crystals were removed by filtration, and washed with 50 ml of ethyl acetate. The filtrate was condensed under reduced pressure, and the residue was dissolved in 100 ml of chloroform. The organic phase was washed with water, and then condensed and purified through silica-gel column chromatography (eluent: chloroform/hexane, 1/1 to 3/1, by volume) to obtain Compound (318). [Yield: 63%]

The procedure for preparing Compound (316-e) in Synthesis example 10 was repeated except that Compound (326-a) and Compound (326-b) were used as the starting materials, to obtain Compound (326-e).

SYNTHESIS EXAMPLE 13

Synthesis of Compound (401)

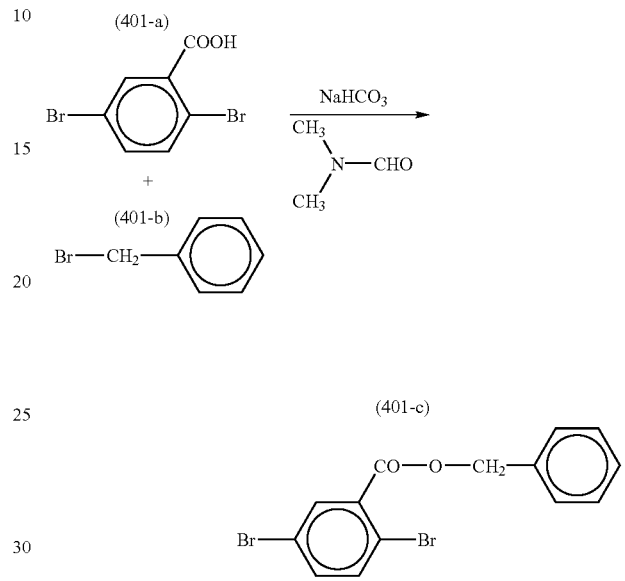

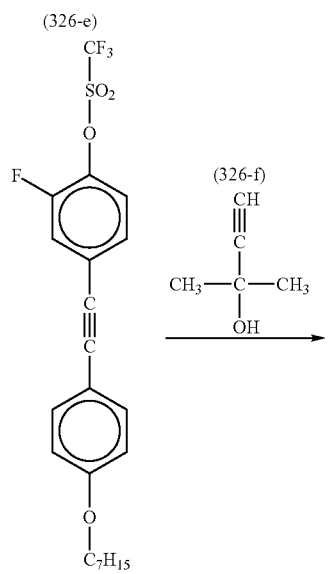

To 800 ml of dimethylformamide, 0.4 mol of Compound (401-a) and 0.4 mol of sodium hydrogencarbonate were added. After the mixture was stirred for 1 hour at 70° C., 0.4 mol of Compound (401-b) was added and then further stirred for 6 hours at 70° C. The reaction mixture was cooled to room temperature, and poured into 1,500 ml of water. The product was abstracted with ethyl acetate, and washed twice with water. After dried with magnesium sulfate, the solvent was distilled off. By recrystallization from ethyl acetate/hexane, Compound (401-c) in the form of white solid was obtained. [Yield: 95%]

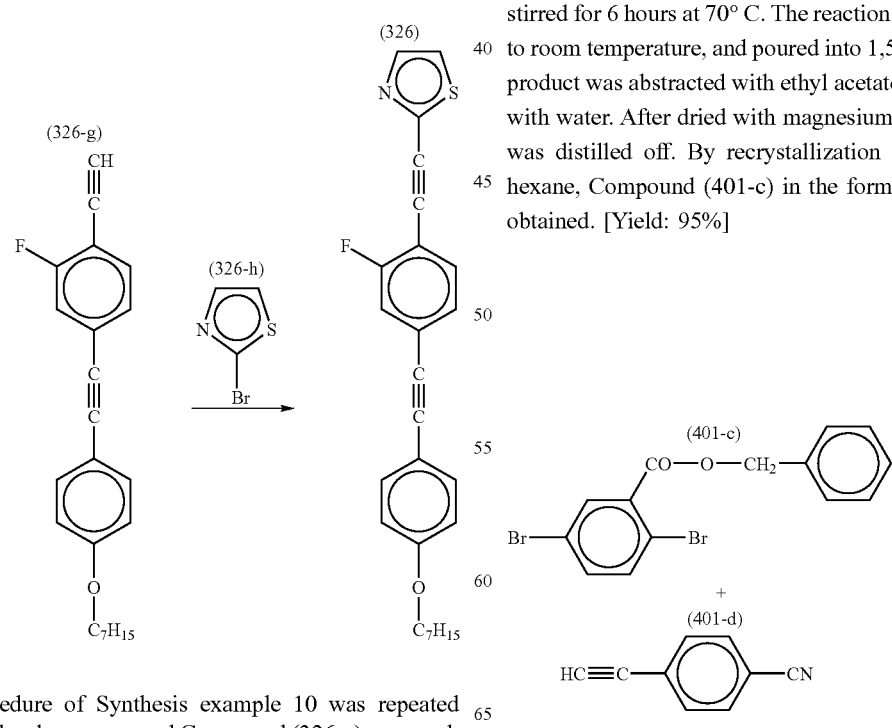

The procedure of Synthesis example 10 was repeated except that the above-prepared Compound (326-e) was used, to obtain Compound (326).

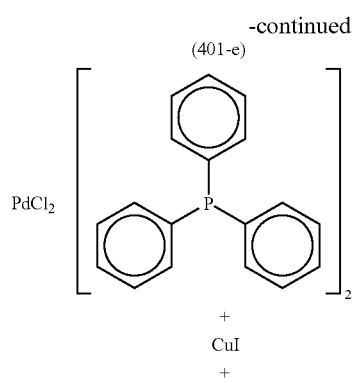
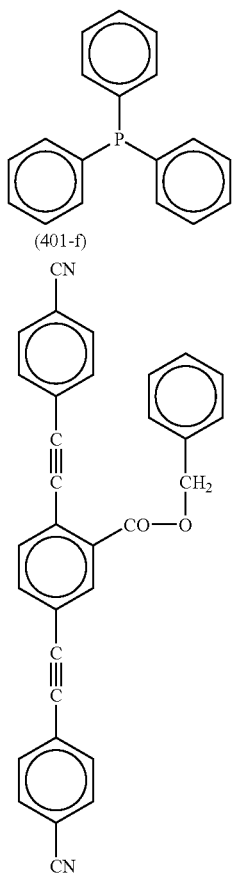
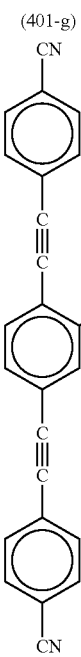
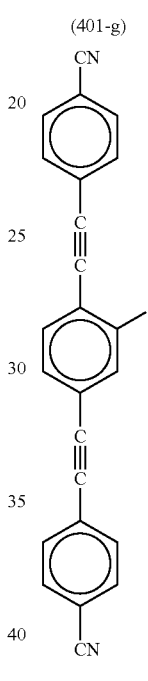
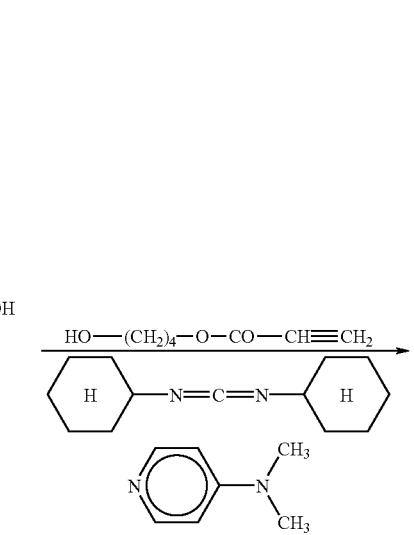
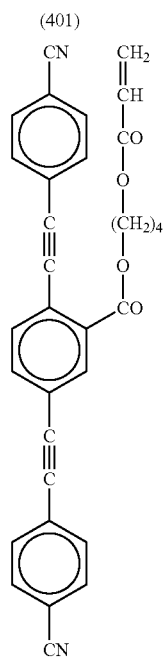

In 50 ml of dichloromethane, 0.01 mol of Compound (401-f) was dissolved. To the solution, a liquid in which 14 g of sodium hydroxide was dissolved in 35 ml of water and 250 ml of ethanol was added. The mixture was refluxed for 24 hours, and the organic phase was distilled off under reduced pressure to obtain crude product. The crude product was added into 1 L of water, and the pH value was adjusted to 1 with concentrated hydrochloric acid. The formed yellowish precipitate of Compound (401-g) was collected by filtration, and washed with water. The thus-obtained product was dried in vacuum with phosphorus pentoxide, and used without purification in the following procedure. The yield of Compound (401-g) was 91%.

A mixture of 0.165 mol of Compound (401-c), 0.34 mol of Compound (401-d), 0.00049 mol of Compound (401-e), 0.00059 mol of copper(I) iodide and 0.0025 mol of triphenylphosphine was added into 480 ml of triethyl amine, and then refluxed under nitrogen gas atmosphere for 8 hours. After cooled to room temperature, 800 ml of ethyl acetate was added to the reaction liquid to precipitate fine crystals. The formed crystals were removed by filtration, and washed with 200 ml of ethyl acetate. The filtrate was condensed under reduced pressure. The organic phase was washed with water, and then condensed and purified through silica-gel column chromatography (eluent: ethyl acetate/hexane, 1/10 to 1/5, by volume) to obtain Compound (401-f). [Yield: 54%]

The above Compound (401-d) was beforehand prepared according to the report by Takahashi et al (SYNTHESIS, pp. 627 to 630(1980)).

In 70 ml of dried tetrahydrofuran, 0.008 mol of Compound (401-g) and 0.008 mol of 4-hydroxydibutylacrylate were dissolved. To the solution, 0.08 mol of 1,3-dicyclohexylcarbodiimide and 0.18 g of 4-dimethylaminopyridine were added. The mixture was stirred for 24 hours, and then the solvent was distilled off under reduced pressure. Hydrated dicyclohexylcarbodidimide was filtered off, and washed with dichloromethane. After the solvent was distilled off, purification through silica-gel column chromatography (eluent: chloroform/hexane, 1/3 to 1/1, by volume) was carried out to obtain Compound (401), which was confirmed by $^1$H-NMR and mass spectrum. [Yield: 63%]

SYNTHESIS EXAMPLE 14

Synthesis of Compound (521)

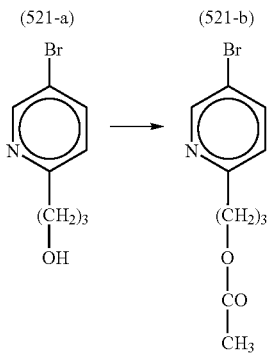

In 1.2 L of methylene chloride, 1.0 mol of Compound (521-a) was dissolved. After 2.0 mol of pyridine was added to the solution, the liquid was cooled to 3° C. While the liquid was kept at 10° C. or below, 1.1 mol of acetylchloride was dropped. After stirred for 5 hours, the reaction liquid was washed with water. The liquid was condensed, and purified through silica-gel column chromatography (eluent: chloroform/hexane, 1/4 to 1/0, by volume) to obtain 0.83 mol of Compound (521-b).

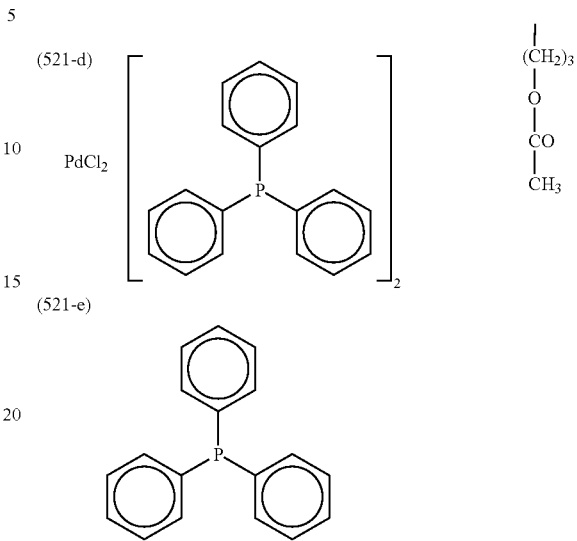

A mixture of 0.83 mol of Compound (521-b), 1.25 mol of Compound (521-c), 3.7 mmol of Compound (521-d), 4.5 mmol of copper(I) iodide and 18.7 mmol of Compound (521-e) was added into 1.5 L of triethyl amine, and then refluxed under nitrogen gas atmosphere for 8 hours. After cooled to room temperature, 800 ml of ethyl acetate was added to the reaction liquid to precipitate fine crystals. The formed crystals were removed by filtration, and washed with 200 ml of ethyl acetate. The filtrate was condensed under reduced pressure. The residue was dissolved in 1 L of ethyl acetate, and washed with water and aqueous solution of sodium chloride. The organic phase was condensed, and purified through silica-gel column chromatography (eluent: chloroform/hexane, 1/4 to 1/2, by volume) to obtain 0.62 mol of Compound (521-f).

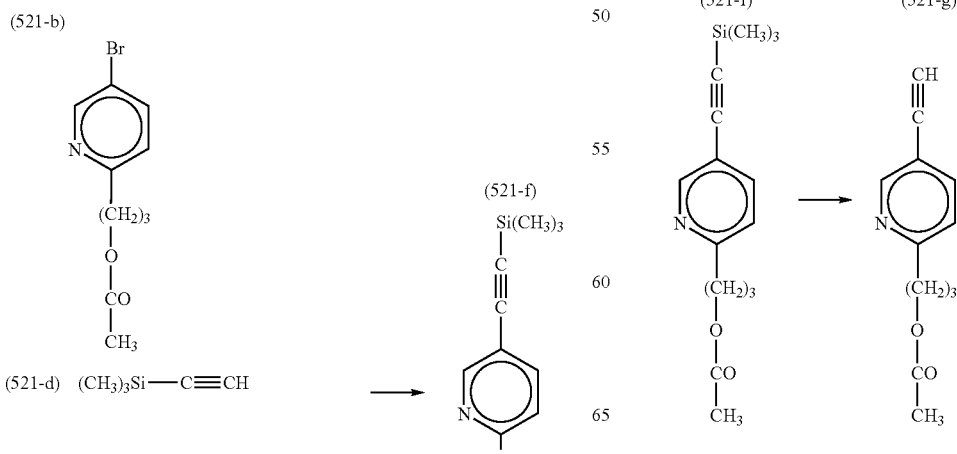

In 800 ml of methanol, 0.62 mol of Compound (521-f) was suspended. To the liquid, 0.75 mol of potassium carbonate was added. After stirred for 5 hours at room temperature, the reaction liquid was poured into 3 L of 0.5 N hydrochloric acid. The precipitated crystals were collected by filtration, washed and dried to obtain 0.60 mol of Compound (521-g).

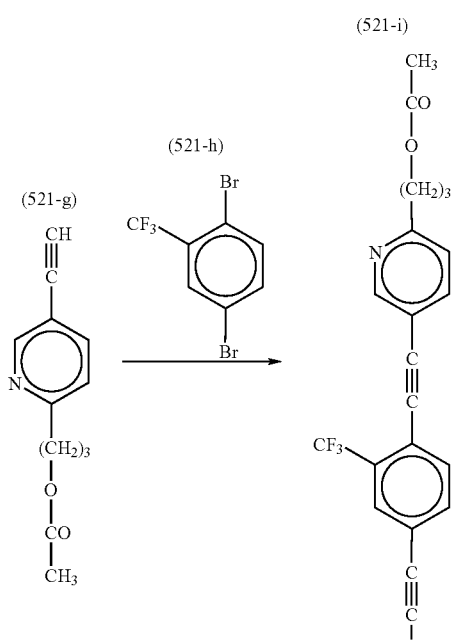

A mixture of 0.60 mol of Compound (521-g), 0.29 mol of Compound (521-h), 1.8 mmol of Compound (521-d), 2.2 mmol of copper(I) iodide and 9.0 mmol of Compound (521-e) was added into 800 ml of triethyl amine, and then refluxed under nitrogen gas atmosphere for 8 hours. After cooled to room temperature, 400 ml of ethyl acetate was added to the reaction liquid to precipitate fine crystals. The formed crystals were removed by filtration, and washed with 100 ml of ethyl acetate. The filtrate was condensed under reduced pressure. The residue was dissolved in 600 ml of chloroform, and washed with water and aqueous solution of sodium chloride. The organic phase was condensed, and purified through silica-gel column chromatography (eluent: chloroform/hexane, 1/8 to 1/2, by volume) to obtain 0.17 mol of Compound (521-i).

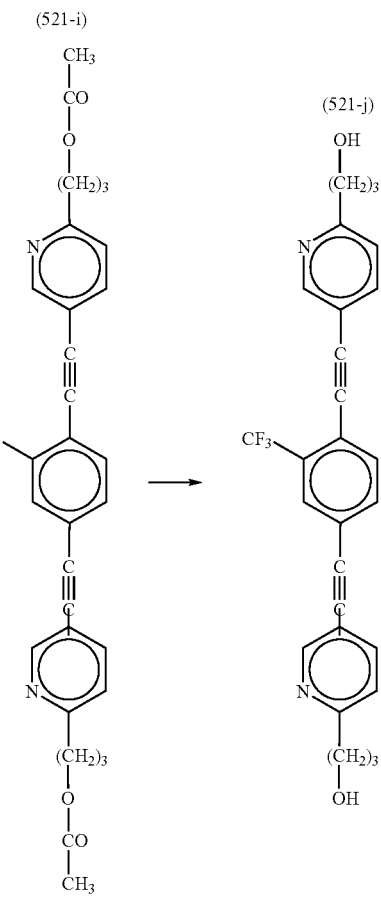

In a mixture of 500 ml of tetrahydrofuran and 100 ml of methanol, 0.17 mol of Compound (521-i) was dissolved. To the solution, 70 ml of 6N sodium hydroxide aqueous solution was added. The reaction liquid was stirred for 5 hours, and then poured into 800 ml of water to precipitate crystals. The crystals were collected by filtration, washed with water, and dried to obtain 0.155 mol of Compound (521-j).

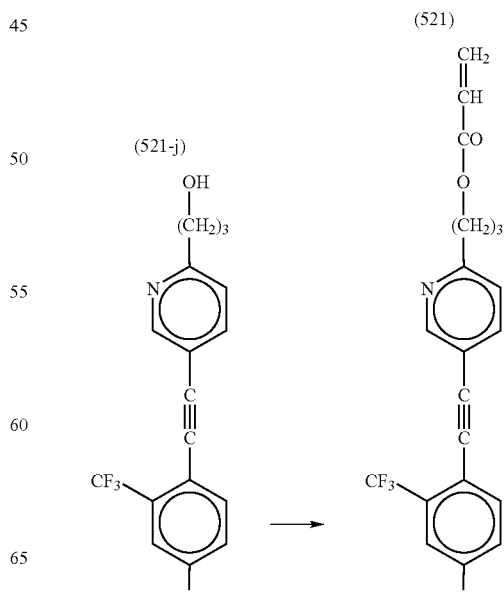

-continued

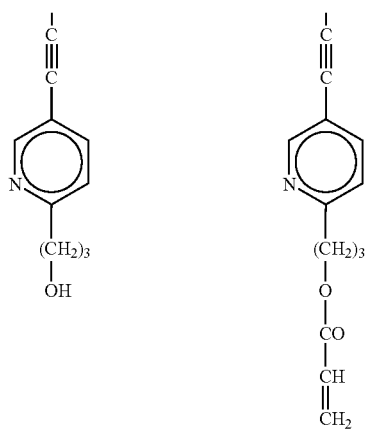

In 300 ml of methylene chloride, 0.1 mol of Compound (521-j) was dissolved. After 0.4 mol of pyridine and 0.1 ml of nitrobenzene were added to the solution, the liquid was cooled to 3° C. While the liquid was kept at 10° C. or below, 0.25 mol of acrylchloride was dropped. After stirred for 5 hours at room temperature, the reaction liquid was washed with water. The liquid was condensed, and purified through silica-gel column chromatography (eluent: chloroform/hexane, 1/8 to 1/2, by volume) to obtain 0.063 mol of Compound (521).

SYNTHESIS EXAMPLE 15

Synthesis of Compound (601)

(601-a)

COOH
Br—⬡—Br (601-b)

Br—CH₂—⬡

(601-c)

CO—O—CH₂—⬡
Br—⬡—Br

In 1,000 ml of benzene, 0.4 mol of Compound (601-a) and 0.4 mol of 1,8-diazabicyclo[5.4.0]-7-undecene were refluxed for 5 hours. After the reaction liquid was cooled to room temperature, 500 ml of ethyl acetate was added. The liquid was washed sequentially with 2 N hydrochloric acid, water and 5% sodium hydrogencarbonate aqueous solution in this order, and then dried with magnesium sulfate. The solvent was distilled off to obtain Compound (601-c). [Yield: 95%]

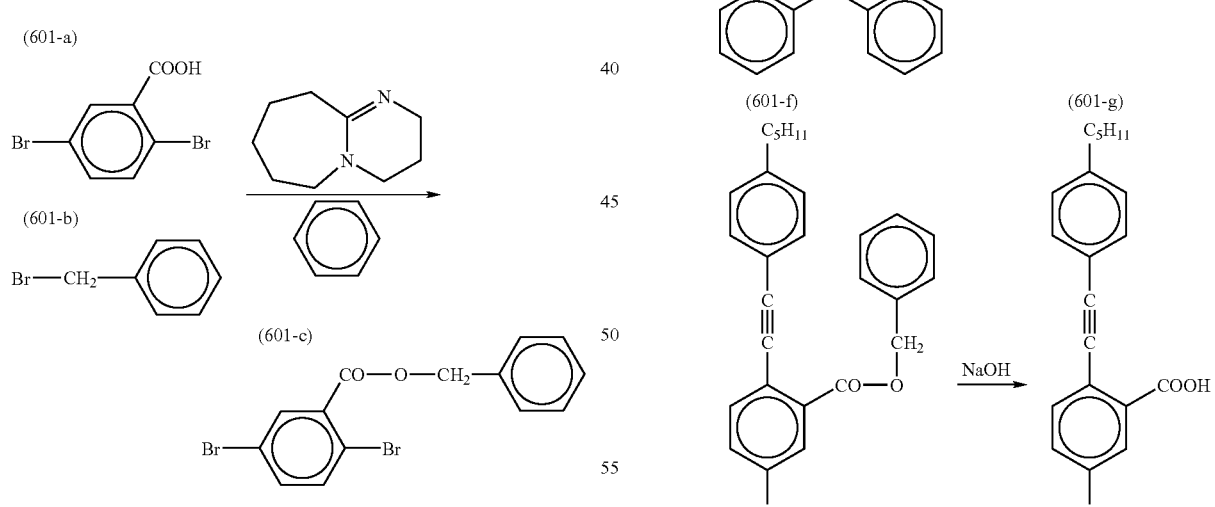

A mixture of 0.165 mol of Compound (601-c), 0.34 mol of Compound (601-d), 0.00049 mol of Compound (601-e), 0.00059 mol of copper(I) iodide and 0.0025 mol of triphenylphosphine was added into 480 ml of triethyl amine, and then refluxed under nitrogen gas atmosphere for 6 hours. After cooled to room temperature, 800 ml of ethyl acetate was added to the reaction liquid, so as to precipitate fine crystals. The formed crystals were removed by filtration, and washed with 200 ml of ethyl acetate. The filtrate was condensed under reduced pressure, and 400 ml of ethyl acetate was added. The organic phase was washed with water, and then condensed and purified through silica-gel column chromatography (eluent: ethyl acetate/hexane, 1/20 to 1/5, by volume) to obtain Compound (601-f). [Yield: 52%]

In 100 ml of tetrahydrofuran, 0.01 mol of Compound (601-f) was dissolved. To the solution, a liquid in which 4 g of sodium hydroxide was dissolved in 20 ml of water was added. The mixture was allowed to react at room temperature for 24 hours. After the reaction was completed, 2 N hydrochloric acid was added so that the pH value might be 1.0 to precipitate crystals of Compound (601-g). The formed precipitate was collected by filtration, and washed with water. The thus-obtained Compound (601-g) was dried in vacuum with phosphorus pentoxide, and used without purification in the following procedure. The yield of Compound (601-g) was 93%.

In 70 ml of ethyl acetate, 0.008 mol of Compound (601-g) and 1,2-O-isopropylideneglycelol were dissolved. To the solution, 0.08 mol of 1,3-dicyclohexylcarbodiimide dissolved in 60 ml of ethyl acetate and 0.18 g of 4-dimethylaminopyridine were added. The mixture was stirred for 24 hours to precipitate crystals, which were filtered off and washed with ethyl acetate. After the solvent was distilled off, purification through silica-gel column chromatography (eluent: chloroform/hexane, 1/8 to 1/2, by volume) was carried out to obtain Compound (601-h). [Yield: 72%]

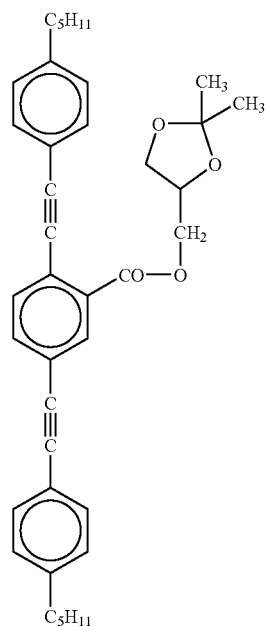

(601-h)

-continued

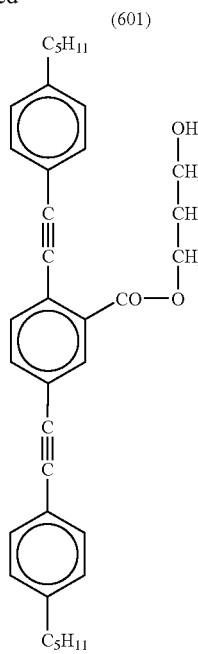
(601)

In a mixture of 150 ml of tetrahydrofuran, 30 ml of methanol and 20 ml of water, 0.005 ml of Compound (601-h) was dissolved. To the solution, 1 g of p-toluenesulfonic acid was added. The mixture was allowed to react at room temperature for 24 hours. After 300 ml of ethyl acetate was added, the organic phase was washed sequentially with water, saturated sodium hydrogencarbonate aqueous solution and water in this order. The organic phase was then dried with sodium sulfate, condensed and purified through silica-gel column chromatography (eluent: chloroform/hexane, 10/0 to 10/1, by volume) to obtain Compound (601), which was confirmed by $^1$H-NMR. [Yield: 68%]

FIG. 1 is a sectional view schematically illustrating a basic structure of an optical film.

The optical film shown in FIG. 1 comprises a transparent support (11) and a polarizing layer (12) provided thereon. The polarizing layer (12) consists of a discontinuous phase (13) and a continuous phase (14). The discontinuous phase (13) comprises an optically anisotropic compound showing birefringence, whose two birefringent indexes (n1, n2) in the discontinuous phase depend on characters and aligning degree of the optically anisotropic compound. In order that the optical film serves as a polarizing element of light-scattering type, it is necessary that either n1 or n2 be essentially the same as the refractive index of the continuous phase (i.e., less than 0.005). The direction giving essentially the same refractive index (n1 or n2) corresponds to the transparent axis of the polarizing layer.

Figure 2:
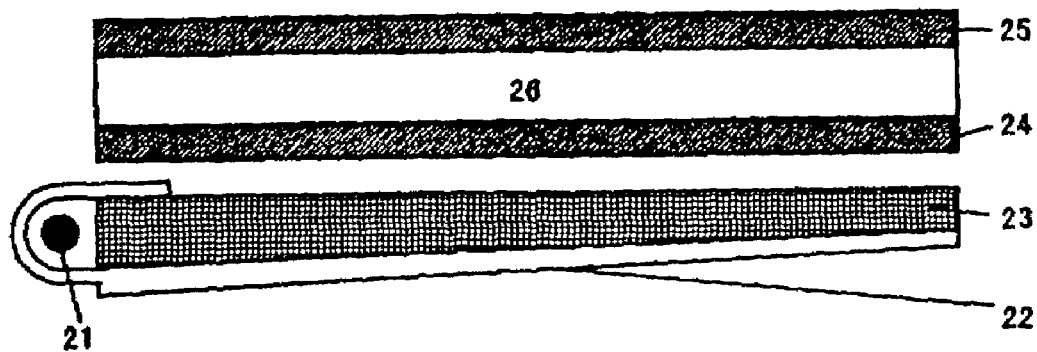
FIG. 2 is a sectional view schematically illustrating a basic structure of a liquid crystal display.

FIG. 2 is a sectional view schematically illustrating a basic structure of a liquid crystal display.

A generally used liquid crystal display comprises a backlight (21) of edge light type as a light source. From the bottom side, a reflecting plate (22) and a light-leading plate (23) are overlaid. These plates make light of the backlight come out to the surface. The backlight may be placed at the bottom (direct type), and in that case the light-leading plate is unnecessary. Even if the liquid crystal display adopts the backlight of direct type without the light-leading plate, the optical film of the invention can be effectively used.

A liquid crystal cell (26) sandwiched between a pair of conventional polarizing elements of light-absorbing type (24, 25) is placed above the light source (21) to display images. The lower polarizing element of light-absorbing type (24) absorbs at least 50% of light emitted from the light source (21), and hence the efficiency of light is theoretically less than 50% in this constitution.

Figure 3:
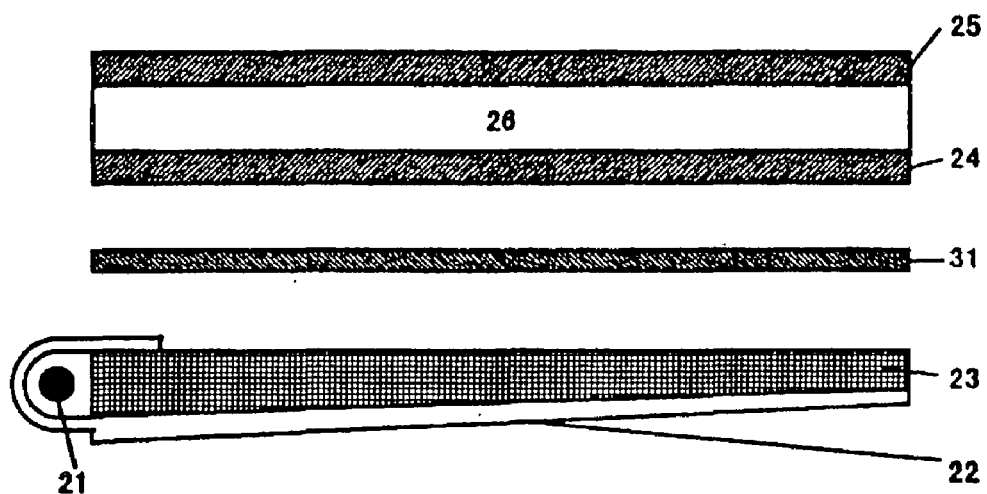
FIG. 3 is a sectional view schematically illustrating a liquid crystal display equipped with an optical film.

FIG. 3 is a sectional view schematically illustrating a liquid crystal display equipped with the optical film.

The liquid crystal display of FIG. 3 is the simplest example in which the optical film effectively works.

The optical film (31) functions as a polarizing element of light-scattering type, which selectively transmits light polarized parallel to the transparent axis of the polarizing element of light-scattering type (24). Light polarized perpendicularly to the transparent axis is partially scattered forward by the film (31), and depolarized so that the polarizing plane may be parallel to the transparent axis. On the other hand, the perpendicularly polarized light is also partially scattered backward by the film (31). The back scattered light comes back to the light source (21) side to be depolarized by the light-leading plate (23) and reflected by the reflection plate (22). The reflected depolarized light reenters the optical film (31) to be reused. Thus, the efficiency of light is improved.

Figure 4:
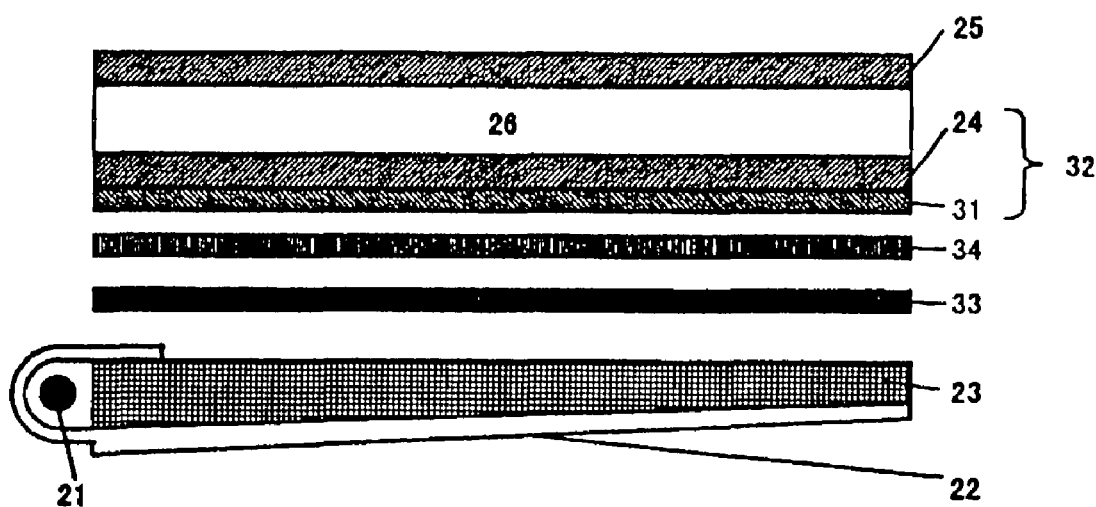
FIG. 4 is a sectional view schematically illustrating another liquid crystal display equipped with an optical film.

FIG. 4 is a sectional view schematically illustrating another liquid crystal display equipped with the optical film.

The liquid crystal display of FIG. 4 is an example in which a polarizing plate of light-scattering type (32) having the optical film as a protective film is used in combination with another functional film.

Light emitted from the light source (21) is made to have even brightness in the plane by a scattering sheet (33). Further, the display comprises a film (34) condensing light to a predetermined direction, and thereby light extremely obliquely coming (users do not see such light) is condensed to the front so as to improve the efficiency of light. In this display, though the amount of light slightly obliquely coming (users may see such light) is reduced, natural viewing angel distribution can be realized because light is adequately defused and the brightness is improved on the same principle as described above in FIG. 3.

In the liquid crystal display of FIG. 3, the amount of usable light is reduced by 10% because of reflection on the surface of the optical film (31) (in the side opposite to the polarizing layer) and that on the polarizing plate of light-absorbing type. In contrast, in the liquid crystal display of FIG. 4, those reflection surfaces are omitted because the optical film is used as a protective film of the polarizing plate, and hence the efficiency of light is improved at least by 10%.

Figure 5:
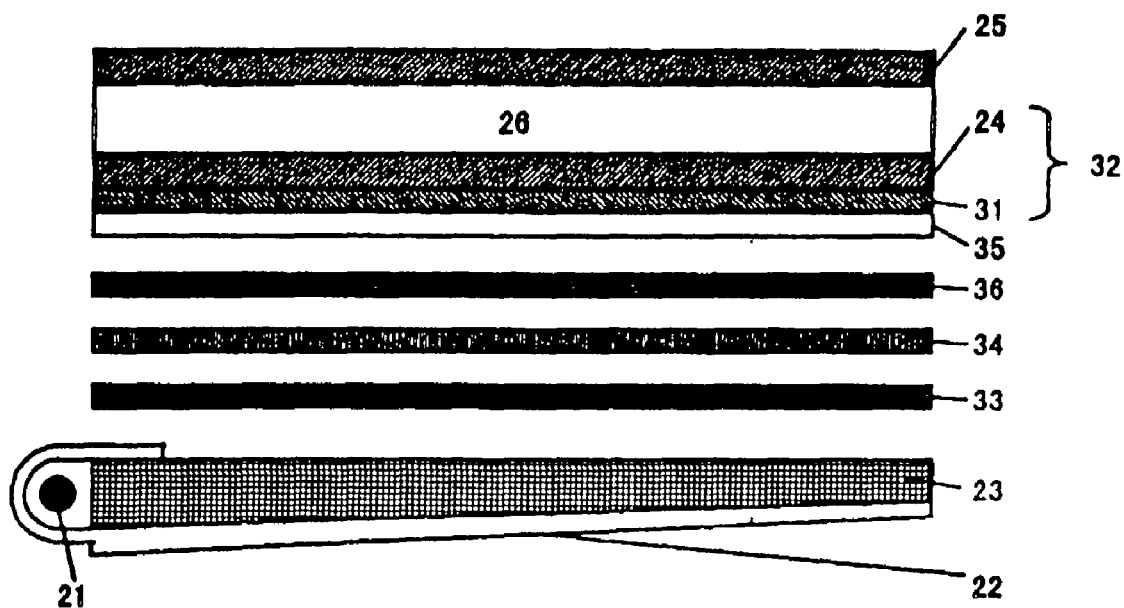
FIG. 5 is a sectional view schematically illustrating a further liquid crystal display equipped with an optical film.

FIG. 5 is a sectional view schematically illustrating a further liquid crystal display equipped with the optical film.

The liquid crystal display of FIG. 5 is further improved in brightness by the optical film and the polarizing plate.

In the display of FIG. 5, an anti-reflection layer (35) is provided on the polarizing layer directly or via another layer so as to reduce reflection on the surfaces and accordingly to increase the amount of light coming into the polarizing layer. Further, a λ/4 plate (36) is provided below the polarizing plate (32). Because of rotation of polarizing direction of light scattered backward (back scattered light), back scattered light polarized perpendicularly to the transparent axis of the polarizing plate of light-absorbing type passes through the λ/4 plate twice, so that the polarizing axis may rotate to be parallel to the transparent axis so as to improve the efficiency of light.

The transparent support preferably has a light transmittance of 80% or more. Further, the support preferably shows optical isotropy when seen from the front. It is, therefore, preferred that the support be made of materials showing small birefringence (e.g., cellulose triacetate). Commercially available polymer films (e.g., Zeonex, Zeonoa [Nippon Zeon Co., Ltd.]; ARTON [JSR Co., Ltd.]; Fujitac [Fiji Photo film Co., Ltd.]; triacetyl cellulose) are also usable. Further, an optically isotropic transparent support can be made of even materials showing large birefringence (e.g., polycarbonate, polyester, polyarylate, polysulfone, polyethersulfone) if conditions of film forming (solvent cast, melt extruding) or stretching laterally or longitudinally are adequately selected.

In the case where a film protecting the polarizing layer of polarizing plate is used as the transparent support, a cellulose triacetate film is particularly preferred.

The thickness of the transparent support is preferably in the range of 10 to 500 μm, more preferably 40 to 200 μm.

An undercoating layer may be provided on the support to enhance adhesion between the support and the neighboring layer. There is no particular restriction on materials for the undercoating layer, but generally gelatin, poly(meth)acrylate resin, substituted resins thereof and styrene-butadiene resin are used for the undercoating layer on an acetyl cellulose support. The support may be subjected to a surface treatment (e.g., chemical treatment, mechanical treatment, corona discharge treatment, glow discharge treatment).

The discontinuous phase contains the liquid crystal compound represented by the formula (I). The polarizing layer has the discontinuous phase in an amount of 5 to 95 wt. %, preferably 10 to 80 wt. %, more preferably 20 to 50 wt. %.

Two or more liquid crystal compounds represented by the formula (I) may be contained in the discontinuous phase. The liquid crystal compound represented by the formula (I) may be used in combination with other optically anisotropic compounds, which are preferably rod-like liquid crystal compounds. Examples of the rod-like liquid crystal compounds include azomethines, azoxys, cyanobiphenyls, cyanophenyl esters, benzoic esters, phenyl esters of cyclohexanecarboxylates, cyanophenylcyclohexanes, cyano-substituted phenylpyrimidines, phenyldioxanes, tolanes and alkenylcyclohexylbenzonitriles. Descriptions of the rod-like liquid crystal compounds are found in "Kagaku-Sosetsu, Ekisho no Kageku" (written in Japanese), vol. 22(1994), Chapters 4, 7 and 11; and "Ekisho Devise Handbook" (written in Japanese), chapter 3.

The discontinuous phase preferably consists of particles whose mean size (radius) is preferably in the range of 0.01 to 1 μm, more preferably in the range of 0.05 to 0.7 μm, providing that the particles are approximated to spheres.

The continuous phase contains an optically isotropic compound, which is not particularly restricted as long as it is optically isotropic in the polarizing layer. The term "optically isotropic" here means having a birefringent index of less than 0.05. If an optically anisotropic compound shows optical isotropy in the polarizing layer, it can be used as the optically isotropic compound. Monomers polymerized by heat or ionization radiation are preferably used because they also serve as a binder forming the layer.

The phase-separating structure of the polarizing layer can be obtained by coating process. In the coating process, a coating solution comprising the liquid crystal compound dispersed in an aqueous phase dissolving an aqua-soluble polymer compound is used since many liquid crystal compounds usable in the discontinuous phase are soluble in organic solvents. Water as a solvent hardly gives adverse effects to the environment, and hence an aqua-soluble polymer compound is preferably used. Besides that, in consideration of dispersion stability and aligning the liquid crystal molecules in stretching, polyvinyl alcohol or modified polyvinyl alcohol is particularly preferred.

The continuous phase is preferably crosslinked so that the external conditions such as temperature and humidity may not affect the phase.

The polarizing layer has the continuous phase in an amount of 5 to 95 wt. %, preferably 20 to 90 wt. %, more preferably 50 to 80 wt. %.

The polymer compound may be soluble either in water or in organic solvents. Examples of the aqua-soluble polymer compound include gelatin, agarose, cellulose, polyvinyl alcohol and derivatives thereof, polyacrylic acid, polygalacturonic acid, polyalginic acid and salts thereof. Examples of the polymer compound soluble in organic solvents include cellulose esters (e.g., triacetyl cellulose, di triacetyl cellulose, propionyl cellulose, butylyl cellulose, acetylpropionyl cellulose, nitrocellulose), polyamide, polycarbonate, polyesters (e.g., polyethylene terephthalate, polyethylene naphthalate, poly-1,4-cyclohexanedimethyleneterephthalate, polyethylene-1,2-diphenoxyethane-4,4'-dicarboxylate, polybutylene terephthalate), polystyrenes (e.g., syndiotactic polystyrene), polyolefin (e.g., polypropylene, polyethylene, polymethylpentene), polysulfone, polyethersulfone, polyarylate, polyether imide, polymethyl methacrylate and polyether ketone.

Examples of the monomers polymerized by heat or ionization radiation include compounds having an ethylenically unsaturated polymerizable group, isocyanate group, epoxy group, aziridine group, oxazolidine group, aldehyde group, carbonyl group, hydrazine group, carbo, epoxy group, aziridine group, oxazolidine group, aldehyde group, carbonyl group, hydrazine group, carboxyl group, methylol group, active methylene group, vinylsulfonic acid, acid anhydride, cyanoacrylate derivatives, melamine, etherized methylol, esters and urethane, or methal alkoxide such as tetramethoxysilane.

A compound having an ethylenically unsaturated polymerizable group is preferably used because it can be easily polymerized by light. Further, a compound having two or more ethylenically unsaturated polymerizable groups is particularly preferred because it is stable to heat after polymerized.

Examples of the compound having two or more ethylenically unsaturated polymerizable groups include esters of polyhydric alcohol and (meth)acrylic acid (e.g., ethylene glycol di(meth)acrylate, 1,4-dichlorohexane acrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,3,5-cyclohexanetriol triacrylate, polyurethane polyacrylate, polyester polyacrylate), vinylbenzene and derivatives thereof (e.g., 1,4-divinylbenzene, 4-vinylbenzoic acid-2-acryloyl ethylester, 1,4-divinylcyclohexanone), vinylsulfones (e.g., divinylsulfone), acrylamides (e.g., methylene bisacrylamide) and methacrylamide.

In the case where an aqua-soluble polymer compound is used in the continuous phase, a surface active agent may be added so that the sizes of dispersed particles may be small enough to obtain good dispersion stability. There is no particular restriction on the surface active agent, and it may be either nonioic or ionic (anion, cation or betaine).

The nonionic surface active agent has a nonionic hydrophilic group such as polyoxyethylene, polyoxypropylene, polyoxybutylene, polyglycidyl or sorbitan. Examples of the nonionic surface active agent include polyoxyethylenealkylether, polyoxyethylenealkylphenylether, polyoxyethylene-polyoxypropyleneglycol, partial ester of polyhydric alcohol with fatty acid, partial ester of polyoxyethylenepolyhydric alcohol with fatty acid, polyoxyethylene fatty acid ester, polyglycelol fatty acid ester, fatty acid diethanolamide and partial ester of triethanolamine with fatty acid.

The anionic surface active agent is, for example, carboxylate, sulfate, sulfonate or phosphate. Examples of the anionic surface active agent include fatty acid salt, alkylbenzenesulfonate, alkylnaphthalenesulfonate, alkylsulfonate, α-olefinsulfonate, dialkylsulfosuccinate, α-sulfonated fatty acid salt, N-methyl-N-oleyltaurine, petroleum sulfonate, alkylsulfonate, sulfonated oil, polyoxyethylenealkylethersulfate, polyoxyethylenealkylphenylethersulfate, polyoxyethylenestyrenated phenylethersulfate, alkylphosphate, polyoxyethylenealkyletherphosphate, and naphthalenesulfonate-formaldehyde condensation product.

The cationic surface active agent is, for example, amine salt, quaternary ammonium salt and pyridinium salt. Examples of the cationic surface active agent include primary, secondary or tertiary amine salt; and quaternary ammonium salt (tetraalkylammonium salt, trialkylbenzylammonium salt, alkylpyridinium salt or alkylimidazolium salt).

The amphoteric surface active agent is, for example, carboxylbetaine or sulfobataine. Examples of the amphoteric surface active agent include N-trialkyl-N-carboxymethylammoniumbetaine and N-trialkyl-N-sulfonealkylammoniumbetaine.

Those surface active agents are described in "Application of Surface Active Agent (written in Japanese)", written by Takao Karimai, published by Sachi-Shobo(1980). The amount of surface active agent used in the invention is not particularly restricted as long as it is enough to give the aimed surface activity. However, the amount is preferably in the range of 0.001 to 1 g, more preferably in the range of 0.01 to 0.1 g based on 1 g of the liquid crystal compound in the discontinuous phase.

The polarizing layer can be formed by coating process according to dip coating method, air-knife coating method, curtain coating method, roller coating method, wire bar coating method, direct gravure coating method or extrusion coating method (described in U.S. Pat. No. 2,681,294). Two or more layers can be simultaneously formed, and the simultaneous coating method is described in U.S. Pat. Nos. 2,761,791, 2,941,898, 3,508,9847, 3,526,528 and "Coating Engineering (written in Japanese)", written by Yuzi Harazaki, pp. 253(1973), published by Asakura-Shoten.

The polarizing layer has a thickness preferably in the range of 1 to 200 μm, more preferably in the range of 10 to 120 μm.

The polarizing layer can be formed, for example, by the steps of applying a coating solution onto an endless support (such as a drum or a band) or onto a transparent support, drying and peeling the formed film, stretching the film, and then laminating the stretched film on the transparent support. Otherwise, after the solution is applied on the transparent support, the formed film may be directly stretched. Further, the film may be laminated or transferred onto another transparent support.

The stretching degree is preferably 10 times or less in consideration of productivity, more preferably 5.0 times or less, further preferably 3.0 times or less, furthermore preferably twice or less, and most preferably 1.5 times or less. On the other hand, for ensuring effect of the stretching, the stretching degree is preferably 1.01 times or more.

An additive for lowering the glass transition temperature of the polymer compound in the continuous phase may be added so that the stretching may be easily performed. There is no restriction on the additive. Examples of the additive include dibutylphthalate, triphenylphosphate and glycerol. If an aqua-soluble polymer compound is used in the continuous phase, glycerol is particularly preferred.

The discontinuous phase of the polarizing layer has a birefringent index ($|n1-n2|$) preferably in the range of 0.05 to 1.0, more preferably in the range of 0.10 to 1.0, further preferably in the range of 0.15 to 1.0. Here, the birefringent index ($|n1-n2|$) is defined as an absolute value of difference between a refractive index ($n1$) along an axis included in the polarizing plane giving the maximum transmittance for all rays and a refractive index ($n2$) along an axis included in the polarizing plane giving the minimum transmittance for all rays.

The continuous phase of the polarizing layer has a birefringent index preferably in the range of 0.05 or less, and the refractive index of the continuous phase is larger or smaller than $n1$ or $n2$ of the optically anisotropic compound by less than 0.05, preferably by less than 0.01, further preferably by less than 0.001.

The above-described relation between the refractive indexes of the continuous and discontinuous phases enables the optical film to select polarized light. The direction in which the refractive index of the continuous phase is essentially the same as that of the discontinuous phase (the difference between them is less than 0.05) corresponds to the transparent axis of the polarizing layer.

The polarizing plate of light-scattering type equipped with the optical film is generally overlaid on the polarizing plate of light-absorbing type so that their transparent axes may be parallel to each other. This laminated composition is placed on the liquid crystal cell as a polarizing element of backlight side so that the polarizing layer may face the backlight, behind which a metal reflection plate is provided.

An anti-reflection layer can be provided on the surface of polarizing layer side in the polarizing plate of light-scattering type. The anti-reflection layer reduces reflection, and consequently improves brightness of the display. The anti-reflection layer may be a layered composition of low and high refractive index layers (described in Nippon Shashin-gakkaisi [Bulletin of Japan Photography Society (written in Japanese)], 29(1966), 29), or it may consist of only a low refractive index layer.

Preferably, a λ/4 plate is provided between the backlight and the laminated composition of polarizing plates of light-scattering type and light-absorbing type. The transparent axes of the polarizing plates are placed at 45° to the slow axis of the λ/4 plate, and thereby the efficiency of light can be improved because of rotation of polarizing direction of back scattered light.

The polarizing optical film or the polarizing plate of light-scattering type improves the efficiency of light in a liquid crystal display, and consequently increases brightness of the display. For effectively increasing the brightness, the transmittances $T_{max}$ and $T_{min}$ in the polarizing planes giving the maximum and minimum transmittances for all rays are preferably 75% or more and 60% or less, respectively. The values $T_{max}$ and $T_{min}$ are more preferably 80% or more and 50% or less, further preferably 85% or more and 40% or less, respectively.

The polarizing optical film can be used in a liquid crystal display which comprises a liquid crystal cell in which a liquid crystal compound is sealed between a pair of substrates having a transparent electrode and a pixel electrode, and also which comprises a pair of polarizing plates sandwiching the liquid crystal cell. The optical film is laminated with adhesive on the surface of the polarizing plate of backlight side in the liquid crystal cell.

The polarizing plate of light-scattering type can be also used in the above liquid crystal display as the polarizing plate of backlight side. In that case, the polarizing plate is placed so that the polarizing layer may be face the backlight side.

The optical film or the polarizing plate of the invention can be used in combination with a viewing angel-compensation film described in Japanese Patent Provisional Publication No. 2(1990)-160204 and Japanese Patent No. 2,587,398.

EXAMPLE 1

(Preparation of Coating Solution for Polarizing Layer)

In 150 g of ethyl acetate, 48 g of Compound (3), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

Independently, 4.0 g of sodium dodecylbenzenesulfonate (surface active agent) was added into 2,000 g of 20 wt. % polyvinyl alcohol aqueous solution (PVA 205, Kuraray Co., Ltd.). The solution was filtered through a polypropylene filter (porous size: 30 μm) to prepare an aqueous solution for continuous phase.

The prepared solutions were mixed in each amount of 200 g, and the mixture was dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 1.25 times at 90° C. under a dry condition, and then ripened for 2 minutes at 90° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 2

(Preparation of Coating Solution for Polarizing Layer)

In 150 g of ethyl acetate, 24 g of Compound (3), 24 g of Compound (4), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 1, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 1.25 times at 50° C. under a dry condition, and then ripened for 2 minutes at 50° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 3

(Preparation of Coating Solution for Polarizing Layer)

In 150 g of ethyl acetate, 48 g of Compound (21), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 1, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 1.25 times at 115° C. under a dry condition, and then ripened for 2 minutes at 90° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 4

(Preparation of Coating Solution for Polarizing Layer)

In 150 g of ethyl acetate, 48 g of Compound (28), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 1, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 1.25 times at 90° C. under a dry condition, and then ripened for 2 minutes at 90° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 5

(Preparation of Coating Solution for Polarizing Layer)

In 150 g of ethyl acetate, 48 g of Compound (27) was dissolved. The solution was filtered through a polypropylene filter (porous size: 30 µm) to prepare a solution of polymerizable liquid crystal for discontinuous phase.

With 200 g of the aqueous solution for continuous phase prepared in Example 1, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 1.25 times at 115° C. under a dry condition. Thus, an optical film was prepared.

COMPARISON EXAMPLE 1

(Preparation of Coating Solution for Polarizing Layer)

In 150 g of ethyl acetate, 48 g of 4'-pentyl-4-biphenyl-carbonitrile was dissolved. The solution was filtered through a polypropylene filter (porous size: 30 µm) to prepare a solution of polymerizable liquid crystal for discontinuous phase.

With 200 g of the aqueous solution for continuous phase prepared in Example 1, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 1.25 times at 25° C. under a dry condition. Thus, an optical film was prepared.

(Evaluation of Optical Film)

Each of the optical films prepared in the above Examples 1 to 5 and Comparison Example 1 was evaluated in the following manners.

1. Birefringence

The birefringence of the continuous phase was measured. For this measurement, each corresponding film without the discontinuous phase was prepared and stretched in the same stretching degree as described above. The refractive index in each direction of MD and TD of the film was measured with an Abbe's refractometer.

2. Transmittance and Scattering Degree (Haze)

The transmittance and the haze of each prepared film were measured with a haze mater (MODEL 1001DP, Nippon Denshoku Kogyo Co., Ltd.). In the measurement, a polarizer was inserted between the light source and the film. The measurement was carried out with the transparent axis of the polarizer placed parallel or perpendicular to that of the polarizing layer. The measured values when the axes are parallel are shown as values in parallel, and those when the axes are perpendicularly placed are shown as values in perpendicular. The scattering degree was evaluated in terms of haze value. If the film has polarizability, the transmittance in parallel is higher than that in perpendicular while the haze in parallel is lower than that in perpendicular.

3. Particle Size of Discontinuous Phase

The particle size of the discontinuous phase of polarizing layer in each film was measured. The film was cut with a microtome, and the section was observed by an electron microscope of scanning type. From the thus-obtained microscopic photograph (×5,000), a hundred of discontinuous phase (particles) were randomly selected and their sizes were measured in terms of radius corresponding circle.

The results are set forth in Table 1. As shown in Table 1, each film of Examples 1 to 5 has transmittances in parallel and perpendicular of 60% or less and 75% or more, respectively. This means that those films have polarizability higher than the film of Comparison Example 1.

The films of Examples 1 to 5 were stored at 40° C., 80% RH for 3 days. Even after the storage, the films of Examples 1 to 3 exhibited the same polarizability as before because the alignments of liquid crystal molecules in these films were fixed well by the polymerizable groups of the molecules. On the other hand, the polarizability of the film of Example 4 was slightly impaired because the liquid crystal compound in this film had only one polymerizable group per one molecule and hence the liquid crystal molecules were insufficiently fixed.

TABLE 1

| Optical film | Birefringence | Transmittance | | Haze | | Particle size* |
|---|---|---|---|---|---|---|
| | | Parallel | Perpendicular | Parallel | Perpendicular | |
| Ex. 1 | <0.01 | 43.2 | 92.8 | 88.4 | 13.2 | 0.25 µm |
| Ex. 2 | <0.01 | 42.1 | 93.5 | 89.8 | 12.9 | 0.24 µm |
| Ex. 3 | <0.01 | 44.7 | 92.2 | 87.3 | 14.0 | 0.21 µm |
| Ex. 4 | <0.01 | 45.0 | 91.9 | 86.8 | 14.1 | 0.20 µm |
| Ex. 5 | <0.01 | 44.3 | 91.6 | 87.2 | 13.8 | 0.21 µm |
| Comp.1 | <0.01 | 50.5 | 89.7 | 82.6 | 18.8 | 0.22 µm |

Remarks
*)Particle size of discontinuous phase

EXAMPLE 6

A protective film on one side of a commercially available iodine polarizing plate was replaced with the optical film prepared in Example 1. The film was laminated on the plate, so that the saponified cellulose triacetate surface without the polarizing layer may be contact with the polarizing layer containining iodine. Thus, a polarizing plate of light-scattering type was prepared.

EXAMPLE 7

The coating solution for polarizing layer prepared in Example 5 was cast onto a band from a die, and then dried. The amount of cast solution was adjusted so that the formed film may have a thickness of 40 μm. After peeled from the band, the film was stretched by 1.2 times at 25° C. under a dry condition. The stretched film was then pressed and laminated without adhesion onto an iodine-adsorbed polyvinyl alcohol film beforehand stretched by six times. The formed composition was immersed in 100 g/l boric acid aqueous solution at 70° C. for 5 minutes, and washed in a water tank at 20° C. for 10 seconds. After the composition was dried at 80° C. for 5 minutes, a saponified triacetyl cellulose film (Fuji Photo Film Co., Ltd.) was laminated on each surface of the composition with a 5 wt. % aqueous solution of polyvinyl alcohol (PVA117, Kuraray Ltd.) as an adhesive. The thus-prepared composition was dried at 120° C. to obtain a polarizing plate of light-scattering type.

Each polarizing plate of light-scattering type prepared in Examples 6 and 7 was laid on an aluminum reflection plate. Independently, a conventional polarizing plate was also laid on the reflection plate. The plates were placed so that their polarizing layers might be on the reflection plate side. The thus-placed plates were observed and compared with each other. As a result, the reflection plate under each polarizing plate of the invention was seen more brightly than that under the conventional one. This indicated that the efficiency of light was improved in the plate of the invention. The reflection plate under the plate of Example 6 or 7 reflects incident light. In the reflected light, a component of polarized in the transparent axis passes through the polarizing layer. The other component scattered backward was reflected again by the reflection plate, and partially reenters the polarizing layer to improve the efficiency of light.

Those plates of light-scattering type were stored at 40° C., 80% RH for 3 days. Even after the storage, the plates still improve the brightness as well as before. This indicates that the alignment of liquid crystal molecules was fixed by crosslinking of boric acid even though the molucules had no polyerizable group.

EXAMPLE 8

The optical film prepared in Example 2 was used to prepare the liquid crystal display shown in FIG. 3. The image on the display was obliquely seen, and thereby it was confirmed that the display gave a bright image.

EXAMPLE 9

The optical film prepared in Example 2 was used to prepare the liquid crystal display shown in FIG. 4. The image on the display was obliquely seen, and thereby it was confirmed that the display gave a bright image.

COMPARISON EXAMPLE 2

A commercially available brightness-increasing film (DBEF, 3M), which had a polarizing layer of optical interference, was used as a polarizing optical film to prepare the liquid crystal display shown in FIG. 3. The image on the display was obliquely seen, and thereby it was confirmed that the brightness was inferior to that of the display of Example 8 or 9.

EXAMPLE 10

(Preparation of Coating Solution for Polarizing Layer)

In 150 g of ethyl acetate, 48 g of Compound (101), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

Independently, 4.0 g of sodium dodecylbenzenesulfonate (surface active agent) was added into 2,000 g of 20 wt. % polyvinyl alcohol aqueous solution (PVA 205, Kuraray Co., Ltd.). The solution was filtered through a polypropylene filter (porous size: 30 μm) to prepare an aqueous solution for continuous phase.

The prepared solutions were mixed in each amount of 200 g, and the mixture was dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 1.25 times at 90° C. under a dry condition, and then ripened for 2 minutes at 90° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 11

(Preparation of Coating Solution for Polarizing Layer)

In 150 g of ethyl acetate, 48 g of Compound (107), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 10, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 µm. The thus-prepared film (having the polarizing layer on the support) was stretched by 1.25 times at 130° C. under a dry condition, and then ripened for 2 minutes at 50° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 12

(Preparation of Coating Solution for Polarizing Layer)

In 150 g of ethyl acetate, 48 g of Compound (121) was dissolved. The solution was filtered through a polypropylene filter (porous size: 30 µm) to prepare a solution of polymerizable liquid crystal for discontinuous phase.

With 200 g of the aqueous solution for continuous phase prepared in Example 10, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 1.25 times at 90° C. under a dry condition. Thus, an optical film was prepared.

EXAMPLE 13

(Preparation of Coating Solution for Polarizing Layer)

In 150 g of ethyl acetate, 48 g of Compound (122) was dissolved. The solution was filtered through a polypropylene filter (porous size: 30 µm) to prepare a solution of polymerizable liquid crystal for discontinuous phase.

With 200 g of the aqueous solution for continuous phase prepared in Example 10, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 1.15 times at 160° C. under a dry condition. Thus, an optical film was prepared.

EXAMPLE 14

(Preparation of Coating Solution for Polarizing Layer)

In 150 g of ethyl acetate, 48 g of Compound (123) was dissolved. The solution was filtered through a polypropylene filter (porous size: 30 µm) to prepare a solution of polymerizable liquid crystal for discontinuous phase.

With 200 g of the aqueous solution for continuous phase prepared in Example 10, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 1.25 times at 90° C. under a dry condition. Thus, an optical film was prepared.

(Evaluation of Optical Film)

The optical films prepared in Examples 10 to 14 were evaluated in the same manners as those in Examples 1 to 5.

The results are set forth in Table 2. As shown in Table 2, each film of Examples 10 to 14 has transmittances in parallel and perpendicular of 60% or less and 75% or more, respectively. This means that those films have high polarizability.

The films of Examples 10 to 14 were stored at 40° C., 80% RH for 3 days. Even after the storage, the films of Examples 10 and 11 exhibited the same polarizability as before because the alignments of liquid crystal molecules in these films were fixed well by the polymerizable groups of the molecules. On the other hand, the polarizability of the films of Examples 12 to 14 was slightly impaired because the liquid crystal compound in this film had no polymerizable group and hence the liquid crystal molecules were not fixed.

TABLE 2

| Optical film | Birefringence | Transmittance | | Haze | | Particle Size*) |
| --- | --- | --- | --- | --- | --- | --- |
| | | Parallel | Perpendicular | Parallel | Perpendicular | |
| Ex. 10 | <0.01 | 43.0 | 94.2 | 89.6 | 13.0 | 0.18 µm |
| Ex. 11 | <0.01 | 43.1 | 93.2 | 89.0 | 13.2 | 0.17 µm |
| Ex. 12 | <0.01 | 43.5 | 93.0 | 88.8 | 13.6 | 0.18 µm |
| Ex. 13 | <0.01 | 44.0 | 92.1 | 87.0 | 14.0 | 0.22 µm |
| Ex. 14 | <0.01 | 43.0 | 94.5 | 89.8 | 13.0 | 0.19 µm |

Remarks
*)Particle size of discontinuous phase

EXAMPLE 15

A protective film on one side of a commercially available iodine polarizing plate was replaced with the optical film prepared in Example 10. The film was laminated on the plate, so that the saponified cellulose triacetate surface without the polarizing layer may be contact with the polarizing layer containing iodine. Thus, a polarizing plate of light-scattering type was prepared.

EXAMPLE 16

The coating solution for polarizing layer prepared in Example 14 was cast onto a band from a die, and then dried. The amount of cast solution was adjusted so that the formed film may have a thickness of 40 µm. After peeled from the band, the film was stretched by 1.2 times at 25° C. under a dry condition. The stretched film was then pressed and laminated without adhesion onto an iodine-adsorbed poly-vinyl alcohol film beforehand stretched by six times. The formed composition was immersed in 100 g/l boric acid aqueous solution at 70° C. for 5 minutes, and washed in a water tank at 20° C. for 10 seconds. After the composition was dried at 80C for 5 minutes, a saponified triacetyl cellulose film (Fuji Photo Film Co., Ltd.) was laminated on each surface of the composition with a 5 wt. % aqueous solution of polyvinyl alcohol (PVA 117, Kuraray Ltd.) as an adhesive. The thus-prepared composition was dried at 120° C. to obtain a polarizing plate of light-scattering type.

Each polarizing plate of light-scattering type prepared in Examples 15 and 16 was laid on an aluminum reflection plate. Independently, a conventional polarizing plate was also laid on the reflection plate. The plates were placed so that their polarizing layers might be on the reflection plate side. The thus-placed plates were observed and compared with each other. As a result, the reflection plate under each polarizing plate of the invention was seen more brightly than that under the conventional one. This indicated that the efficiency of light was improved in the plate of the invention. The reflection plate under the plate of Example 15 or 16 reflects incident light. In the reflected light, a component of polarized in the transparent axis passes through the polarizing layer. The other component scattered backward was reflected again by the reflection plate, and partially reenters the polarizing layer to improve the efficiency of light. Those plates of light-scattering type were stored at 40° C., 80% RH for 3 days. Even after the storage, the plates still improve the brightness as well as before. This indicates that the alignment of liquid crystal molecules was fixed by crosslinking of boric acid even though the molucules contain no polyerizable group

EXAMPLE 17

The optical film prepared in Example 11 was used to prepare the liquid crystal display shown in FIG. 3. The image on the display was obliquely seen, and thereby it was confirmed that the display gave a bright image.

EXAMPLE 18

The optical film prepared in Example 11 was used to prepare the liquid crystal display shown in FIG. 4. The image on the display was obliquely seen, and thereby it was confirmed that the display gave a bright image.

EXAMPLE 19

(Preparation of Coating Solution for Polarizing Layer)

In 150 g of ethyl acetate, 48 g of Compound (201), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

Independently, 4.0 g of sodium dodecylbenzenesulfonate (surface active agent) was added into 2,000 g of 20 wt. % polyvinyl alcohol aqueous solution (PVA 205, Kuraray Co., Ltd.). The solution was filtered through a polypropylene filter (porous size: 30 μm) to prepare an aqueous solution for continuous phase.

The prepared solutions were mixed in each amount of 200 g, and the mixture was dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 2.25 times at 90° C. under a dry condition, and then ripened for 2 minutes at 120° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 20

(Preparation of Coating Solution for Polarizing Layer)

In 150 g of ethyl acetate, 48 g of Compound (202), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 19, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 2.25 times at 130° C. under a dry condition, and then ripened for 2 minutes at 120° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 21

(Preparation of Coating Solution for Polarizing Layer)

In 150 g of ethyl acetate, 48 g of Compound (203) was dissolved. The solution was filtered through a polypropylene filter (porous size: 30 μm) to prepare a solution of polymerizable liquid crystal for discontinuous phase.

With 200 g of the aqueous solution for continuous phase prepared in Example 19, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support)

was stretched by 2.25 times at 130° C. under a dry condition, and then ripened for 2 minutes at 120° C. The film was exposed to ultraviolet light (200 mW/cm², 400 mJ/cm²) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 22

(Preparation of Coating Solution for Polarizing Layer)
In 150 g of ethyl acetate, 48 g of Compound (207) was dissolved. The solution was filtered through a polypropylene filter (porous size: 30 μm) to prepare a solution of polymerizable liquid crystal for discontinuous phase.
With 200 g of the aqueous solution for continuous phase prepared in Example 19, 200 g of the above-prepared solution was mixed. The mixture was then dispersed with an ultrasonic disperser to prepare a coating solution for polarizing layer.

(Preparation of Optical Film)
The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 2.25 times at 130° C. under a dry condition, and then ripened for 2 minutes at 120° C. The film was exposed to ultraviolet light (200 mW/cm², 400 mJ/cm²) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 23

(Preparation of Coating Solution for Polarizing Layer)
In 150 g of ethyl acetate, 48 g of Compound (215) was dissolved. The solution was filtered through a polypropylene filter (porous size: 30 μm) to prepare a solution of polymerizable liquid crystal for discontinuous phase.
With 200 g of the aqueous solution for continuous phase prepared in Example 19, 200 g of the above-prepared solution was mixed. The mixture was then dispersed with an ultrasonic disperser to prepare a coating solution for polarizing layer.

(Preparation of Optical Film)
The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 2.25 times at 130° C. under a dry condition, and then ripened for 2 minutes at 100° C. The film was exposed to ultraviolet light (200 mW/cm², 400 mJ/cm²) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

(Evaluation of Optical Film)
The optical films prepared in Examples 19 to 23 were evaluated in the same manners as those in Examples 1 to 5.

The results are set forth in Table 3. As shown in Table 3, each film of Examples 19 to 23 has transmittances in parallel and perpendicular of 60% or less and 75% or more, respectively. This means that those films have high polarizability.

The films of Examples 19 to 23 were stored at 40° C., 80% RH for 3 days. Even after the storage, the films of Examples 19 to 21, and 23 exhibited the same polarizability as before because the alignments of liquid crystal molecules in these films were fixed well by the polymerizable groups of the molecules. On the other hand, the polarizability of the film of Example 22 was slightly impaired because the liquid crystal compound in this film had only one polymerizable group per one molecule and hence the liquid crystal molecules were insufficiently fixed.

TABLE 3

| Optical film | Birefringence | Transmittance | | Haze | | Particle Size*) |
| --- | --- | --- | --- | --- | --- | --- |
| | | Parallel | Perpendicular | Parallel | Perpendicular | |
| Ex. 19 | <0.01 | 43.4 | 94.1 | 89.3 | 13.1 | 0.31 μm |
| Ex. 20 | <0.01 | 43.6 | 93.1 | 88.9 | 13.5 | 0.28 μm |
| Ex. 21 | <0.01 | 43.5 | 93.0 | 88.8 | 13.5 | 0.36 μm |
| Ex. 22 | <0.01 | 44.7 | 92.3 | 88.3 | 14.1 | 0.32 μm |
| Ex. 23 | <0.01 | 43.8 | 93.8 | 89.2 | 13.2 | 0.38 μm |

Remarks
*)Particle size of discontinuous phase

EXAMPLE 24

A protective film on one side of a commercially available iodine polarizing plate was replaced with the optical film prepared in Example 19. The film was laminated on the plate, so that the saponified cellulose triacetate surface without the polarizing layer may be contact with the polarizing layer containing iodine. Thus, a polarizing plate of light-scattering type was prepared.

EXAMPLE 25

The coating solution for polarizing layer prepared in Example 23 was cast onto a band from a die, and then dried. The amount of cast solution was adjusted so that the formed film may have a thickness of 40 μm. After peeled from the band, the film was stretched by 2.5 times at 25° C. under a dry condition. The stretched film was then pressed and laminated without adhesion onto an iodine-adsorbed polyvinyl alcohol film beforehand stretched by six times. The formed composition was immersed in 100 g/l boric acid aqueous solution at 70° C. for 5 minutes, and washed in a water tank at 20° C. for 10 seconds. After the composition was dried at 80° C. for 5 minutes, a saponified triacetyl cellulose film (Fuji Photo Film Co., Ltd.) was laminated on each surface of the composition with a 5 wt. % aqueous solution of polyvinyl alcohol (PVA 117, Kuraray Ltd.) as an adhesive. The thus-prepared composition was dried at 120° C. to obtain a polarizing plate of light-scattering type.

Each polarizing plate of light-scattering type prepared in Examples 24 and 25 was laid on an aluminum reflection plate. Independently, a conventional polarizing plate was also laid on the reflection plate. The plates were placed so that their polarizing layers might be on the reflection plate side. The thus-placed plates were observed and compared with each other. As a result, the reflection plate under each polarizing plate of the invention was seen more brightly than that under the conventional one. This indicated that the efficiency of light was improved in the plate of the invention. The reflection plate under the plate of Example 24 or 25 reflects incident light. In the reflected light, a component of polarized in the transparent axis passes through the polarizing layer. The other component scattered backward was reflected again by the reflection plate, and partially reenters the polarizing layer to improve the efficiency of light. Those plates of light-scattering type were stored at 40° C., 80% RH for 3 days. Even after the storage, the plates still improve the brightness as well as before. This indicates that the alignment of liquid crystal molecules was fixed by crosslinking of boric acid even though the molucules contain no polyerizable group

EXAMPLE 26

The optical film prepared in Example 19 was used to prepare the liquid crystal display shown in FIG. 3. The image on the display was obliquely seen, and thereby it was confirmed that the display gave a bright image.

EXAMPLE 27

The polarizing plate of light-scattering type prepared in Example 25 was used to prepare the liquid crystal display shown in FIG. 4. The image on the display was obliquely seen, and thereby it was confirmed that the display gave a bright image.

EXAMPLE 28

(Preparation of Coating Solution for Polarizing Layer)

In 150 g of ethyl acetate, 48 g of Compound (301), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

Independently, 4.0 g of sodium dodecylbenzenesulfonate (surface active agent) was added into 2,000 g of 20 wt. % polyvinyl alcohol aqueous solution (PVA 205, Kuraray Co., Ltd.). The solution was filtered through a polypropylene filter (porous size: 30 μm) to prepare an aqueous solution for continuous phase.

The prepared solutions were mixed in each amount of 200 g, and the mixture was dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by 2.25 times at 90° C. under a dry condition, and then ripened for 2 minutes at 120° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 29

(Preparation of Coating Solution for Polarizing Layer)

In 150 g of ethyl acetate, 48 g of Compound (307), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 28, 200 g of the above-prepared solution was mixed. The mixture was then dispersed with an ultrasonic disperser to prepare a coating solution for polarizing layer.

(Preparation of Optical Film)

The procedure of Example 28 was repeated except that the above-prepared coating solution was used, to prepare an optical film.

EXAMPLE 30

(Preparation of Coating Solution for Polarizing Layer)

In 150 g of ethyl acetate, 48 g of Compound (316), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 28, 200 g of the above-prepared solution was mixed. The mixture was then dispersed with an ultrasonic disperser to prepare a coating solution for polarizing layer.

(Preparation of Optical Film)

The procedure of Example 28 was repeated except that the above-prepared coating solution was used, to prepare an optical film.

EXAMPLE 31

(Preparation of Coating Solution for Polarizing Layer)

In 150 g of ethyl acetate, 48 g of Compound (324), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

With 200 g of the aqueous solution for continuous phase prepared in Example 28, 200 g of the above-prepared solution was mixed. The mixture was then dispersed with an ultrasonic disperser to prepare a coating solution for polarizing layer.

(Preparation of Optical Film)

The procedure of Example 28 was repeated except that the above-prepared coating solution was used, to prepare an optical film.

EXAMPLE 32

(Preparation of Coating Solution for Polarizing Layer)

In 150 g of ethyl acetate, 48 g of Compound (330), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

With 200 g of the aqueous solution for continuous phase prepared in Example 28, 200 g of the above-prepared solution was mixed. The mixture was then dispersed with an ultrasonic disperser to prepare a coating solution for polarizing layer.

(Preparation of Optical Film)

The procedure of Example 28 was repeated except that the above-prepared coating solution was used, to prepare an optical film.

EXAMPLE 33

(Preparation of Coating Solution for Polarizing Layer)

In 150 g of ethyl acetate, 48 g of Compound (318) was dissolved. The solution was filtered through a polypropylene filter (porous size: 30 µm) to prepare a solution of polymerizable liquid crystal for discontinuous phase.

With 200 g of the aqueous solution for continuous phase prepared in Example 28, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 2.5 times at 90° C. under a dry condition, and then ripened at 120° C. for 2 minutes. Thus, an optical film was prepared.

EXAMPLE 34

(Preparation of Coating Solution for Polarizing Layer)

In 150 g of ethyl acetate, 48 g of Compound (326) was dissolved. The solution was filtered through a polypropylene filter (porous size: 30 µm) to prepare a solution of polymerizable liquid crystal for discontinuous phase.

With 200 g of the aqueous solution for continuous phase prepared in Example 28, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by 2.5 times at 90° C. under a dry condition, and then ripened at 120° C. for 2 minutes. Thus, an optical film was prepared.

(Evaluation of Optical Film)

The optical films prepared in Examples 28 to 34 were evaluated in the same manners as those in Examples 1 to 5.

The results are set forth in Table 4. As shown in Table 4, each film of Examples 28 to 34 has transmittances in parallel and perpendicular of 60% or less and 75% or more, respectively. This means that those films have high polarizability.

The films of Examples 28 to 34 were stored at 40° C., 80% RH for 3 days. Even after the storage, the films of Examples 30 to 32 exhibited the same polarizability as before because the alignments of liquid crystal molecules in these films were fixed well by the polymerizable groups of the molecules. On the other hand, although the polarizability of the films of Examples 28 and 29 was slightly impaired, the films of Examples 33 and 34 exhibited remarkably impaired polarizability because the liquid crystal compounds in these films had no polymerizable group and hence the liquid crystal molecules were not fixed.

TABLE 4

| Optical film | Birefringence | Transmittance | | Haze | | Particle size*) |
|---|---|---|---|---|---|---|
| | | Parallel | Perpendicular | Parallel | Perpendicular | |
| Ex. 28 | <0.01 | 44.0 | 93.0 | 88.3 | 13.9 | 0.32 µm |
| Ex. 29 | <0.01 | 43.8 | 93.4 | 88.5 | 13.8 | 0.36 µm |
| Ex. 30 | <0.01 | 43.3 | 94.2 | 89.2 | 13.3 | 0.41 µm |
| Ex. 31 | <0.01 | 44.1 | 92.9 | 87.8 | 14.0 | 0.38 µm |
| Ex. 32 | <0.01 | 43.9 | 93.0 | 88.0 | 13.8 | 0.33 µm |
| Ex. 33 | <0.01 | 44.3 | 92.9 | 87.8 | 14.2 | 0.37 µm |
| Ex. 34 | <0.01 | 44.2 | 92.8 | 87.6 | 14.3 | 0.45 µm |

Remarks
*)Particle size of discontinuous phase

EXAMPLE 35

A protective film on one side of a commercially available iodine polarizing plate was replaced with the optical film prepared in Example 28. The film was laminated on the plate, so that the saponified cellulose triacetate surface without the polarizing layer may be contact with the polarizing layer containing iodine. Thus, a polarizing plate of light-scattering type was prepared.

EXAMPLE 36

The coating solution for polarizing layer prepared in Example 32 was cast onto a band from a die, and then dried. The amount of cast solution was adjusted so that the formed film may have a thickness of 40 µm. After peeled from the band, the film was stretched by 2.5 times at 25° C. under a dry condition. The stretched film was then pressed and laminated without adhesion onto an iodine-adsorbed polyvinyl alcohol film beforehand stretched by six times. The formed composition was immersed in 100 g/l boric acid aqueous solution at 70° C. for 5 minutes, and washed in a water tank at 20° C. for 10 seconds. After the composition was dried at 80° C. for 5 minutes, a saponified triacetyl cellulose film (Fuji Photo Film Co., Ltd.) was laminated on each surface of the composition with a 5 wt. % aqueous solution of polyvinyl alcohol (PVA 117, Kuraray Ltd.) as an adhesive. The thus-prepared composition was dried at 120° C. to obtain a polarizing plate of light-scattering type.

Each polarizing plate of light-scattering type prepared in Examples 35 and 36 was laid on an aluminum reflection plate. Independently, a conventional polarizing plate was also laid on the reflection plate. The plates were placed so that their polarizing layers might be on the reflection plate side. The thus-placed plates were observed and compared with each other. As a result, the reflection plate under each polarizing plate of the invention was seen more brightly than that under the conventional one. This indicated that the efficiency of light was improved in the plate of the invention. The reflection plate under the plate of Example 35 or 36 reflects incident light. In the reflected light, a component of polarized in the transparent axis passes through the polarizing layer. The other component scattered backward was reflected again by the reflection plate, and partially reenters the polarizing layer to improve the efficiency of light. Those plates of light-scattering type were stored at 40° C., 80% RH for 3 days. Even after the storage, the plates still improve the brightness as well as before. This indicates that the alignment of liquid crystal molecules was fixed by crosslinking of boric acid even though the molucules contain no polyerizable group

EXAMPLE 37

The optical film prepared in Example 30 was used to prepare the liquid crystal display shown in FIG. 3. The image on the display was obliquely seen, and thereby it was confirmed that the display gave a bright image.

EXAMPLE 38

The polarizing plate of light-scattering type prepared in Example 36 was used to prepare the liquid crystal display shown in FIG. 4. The image on the display was obliquely seen, and thereby it was confirmed that the display gave a bright image.

EXAMPLE 39

(Preparation of Coating Solution for Polarizing Layer)

In 150 g of ethyl acetate, 34 g of Compound (401), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

Independently, 4.0 g of sodium dodecylbenzenesulfonate (surface active agent) was added into 2,000 g of 20 wt. % polyvinyl alcohol aqueous solution (PVA 205, Kuraray Co., Ltd.). The solution was filtered through a polypropylene filter (porous size: 30 µm) to prepare an aqueous solution for continuous phase.

The prepared solutions were mixed in each amount of 200 g, and the mixture was dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by twice at 120° C. under a dry condition, and then ripened for 2 minutes at 60° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 40

(Preparation of Coating Solution for Polarizing Layer)

In 150 g of ethyl acetate, 34 g of Compound (402), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

With 200 g of the aqueous solution for continuous phase prepared in Example 39, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by twice at 120° C. under a dry condition, and then ripened for 2 minutes at 60° C. The film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 41

(Preparation of Coating Solution for Polarizing Layer)

In 150 g of ethyl acetate, 34 g of Compound (404) was dissolved. The solution was filtered through a polypropylene filter (porous size: 30 µm) to prepare a solution of polymerizable liquid crystal for discontinuous phase.

With 200 g of the aqueous solution for continuous phase prepared in Example 39, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 µm), and then dried to form a polarizing layer. The amount of applied solution was adjusted so that the formed polarizing layer may have a thickness of 30 µm. The thus-prepared film (having the polarizing layer on the support) was stretched by twice at 120° C. under a dry condition. Thus, an optical film was prepared.

EXAMPLE 42

(Preparation of Coating Solution for Polarizing Layer)

In 150 g of ethyl acetate, 34 g of Compound (413) was dissolved. The solution was filtered through a polypropylene filter (porous size: 30 μm) to prepare a solution of polymerizable liquid crystal for discontinuous phase.

With 200 g of the aqueous solution for continuous phase prepared in Example 39, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by twice at 130° C. under a dry condition. Thus, an optical film was prepared.

EXAMPLE 43

(Preparation of Coating Solution for Polarizing Layer)

In 150 g of ethyl acetate, 34 g of Compound (427) was dissolved. The solution was filtered through a polypropylene filter (porous size: 30 μm) to prepare a solution of polymerizable liquid crystal for discontinuous phase.

With 200 g of the aqueous solution for continuous phase prepared in Example 39, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate film (thickness: 6 μm), and then dried to form a polarizing layer. The amount of applied solution was adjusted so that the formed polarizing layer may have a thickness of 30 μm. The thus-prepared film (having the polarizing layer on the support) was stretched by twice at 130° C. under a dry condition. Thus, an optical film was prepared.

(Evaluation of Optical Film)

The optical films prepared in Examples 39 to 43 were evaluated in the same manners as those in Examples 1 to 5.

The results are set forth in Table 5. As shown in Table 5, each film of Examples 39 to 43 has transmittances in parallel and perpendicular of 60% or less and 75% or more, respectively. This means that those films have high polarizability.

TABLE 5

| Optical film | Birefringence | Transmittance Parallel | Transmittance Perpendicular | Haze Parallel | Haze Perpendicular | Particle size*) |
|---|---|---|---|---|---|---|
| Ex. 39 | <0.01 | 41.0 | 94.5 | 91.4 | 13.2 | 0.38 μm |
| Ex. 40 | <0.01 | 40.1 | 93.9 | 92.3 | 13.1 | 0.37 μm |
| Ex. 41 | <0.01 | 41.5 | 93.0 | 90.9 | 13.5 | 0.38 μm |
| Ex. 42 | <0.01 | 42.0 | 94.1 | 90.0 | 13.0 | 0.32 μm |
| Ex. 43 | <0.01 | 43.5 | 93.6 | 88.8 | 13.3 | 0.39 μm |

Remarks
*)Particle size of discontinuous phase

EXAMPLE 44

A protective film on one side of a commercially available iodine polarizing plate was replaced with the optical film prepared in Example 39. The film was laminated on the plate, so that the saponified cellulose triacetate surface without the polarizing layer may be contact with the polarizing layer containing iodine. Thus, a polarizing plate of light-scattering type was prepared.

EXAMPLE 45

The coating solution for polarizing layer prepared in Example 43 was cast onto a band from a die, and then dried. The amount of cast solution was adjusted so that the formed film may have a thickness of 40 μm. After peeled from the band, the film was stretched by 1.5 times at 25° C. under a dry condition. The stretched film was then pressed and laminated without adhesion onto an iodine-adsorbed polyvinyl alcohol film beforehand stretched by six times. The formed composition was immersed in 100 g/l boric acid aqueous solution at 70° C. for 5 minutes, and washed in a water tank at 20° C. for 10 seconds. After the composition was dried at 80° C. for 5 minutes, a saponified triacetyl cellulose film (Fuji Photo Film Co., Ltd.) was laminated on each surface of the composition with a 5 wt. % aqueous solution of polyvinyl alcohol (PVA 117, Kuraray Ltd.) as an adhesive. The thus-prepared composition was dried at 120° C. to obtain a polarizing plate of light-scattering type.

Each polarizing plate of light-scattering type prepared in Examples 44 and 45 was laid on an aluminum reflection plate. Independently, a conventional polarizing plate was also laid on the reflection plate. The plates were placed so that their polarizing layers might be on the reflection plate side. The thus-placed plates were observed and compared with each other. As a result, the reflection plate under each polarizing plate of the invention was seen more brightly than that under the conventional one. This indicated that the efficiency of light was improved in the plate of the invention. The reflection plate under the plate of Example 44 or 45 reflects incident light. In the reflected light, a component of polarized in the transparent axis passes through the polarizing layer. The other component scattered backward was reflected again by the reflection plate, and partially reenters the polarizing layer to improve the efficiency of light. Those plates of light-scattering type were stored at 40° C., 80% RH for 3 days. Even after the storage, the plates still improve the brightness as well as before. This indicates that the alignment of liquid crystal molecules was fixed by crosslinking of boric acid even though the molucules contain no polyerizable group

EXAMPLE 46

The optical film prepared in Example 39 was used to prepare the liquid crystal display shown in FIG. 3. The image on the display was obliquely seen, and thereby it was confirmed that the display gave a bright image.

EXAMPLE 47

The optical film prepared in Example 43 was used to prepare the liquid crystal display shown in FIG. 4. The image on the display was obliquely seen, and thereby it was confirmed that the display gave a bright image.

EXAMPLE 48

(Preparation of Coating Solution for Polarizing Layer)

In 150 g of ethyl acetate, 48 g of Compound (521), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

Independently, 4.0 g of sodium dodecylbenzenesulfonate (surface active agent) was added into 2,000 g of 20 wt. % polyvinyl alcohol aqueous solution (PVA 205, Kuraray Co., Ltd.). The solution was filtered through a polypropylene filter (porous size: 30 µm) to prepare an aqueous solution for continuous phase.

The prepared solutions were mixed in each amount of 200 g, and the mixture was dispersed with an ultrasonic disperser to prepare a coating solution for polarizing layer.

(Preparation of Optical Film)

The coating solution for polarizing layer was applied from a die onto a polyethylene terephthalate (PET) support film (thickness: 6 µm), and then dried to form a polarizing layer. The amount of applied solution was adjusted so that the formed polarizing layer may have a thickness of 35 µm. After peeled from the PET support film, the prepared film was stretched by 2.5 times at 60° C./40% RH, and then ripened for 2 minutes at 120° C. The film was exposed to ultraviolet light (200 mW/cm$^2$, 400 mJ/cm$^2$) emitted from a 160 W/cm air-cooling metal halide lamp (Eyegraphics Co., Ltd., wave-length region: 200 to 500 nm, maximum intensity was given at 365 nm), so as to harden the discontinuous phase. Thus, an optical film was prepared.

EXAMPLE 49

(Preparation of Coating Solution for Polarizing Layer)

In 150 g of ethyl acetate, 48 g of Compound (513), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

With 200 g of the aqueous solution for continuous phase prepared in Example 48, 200 g of the above-prepared solution was mixed. The mixture was then dispersed with an ultrasonic disperser to prepare a coating solution for polarizing layer.

(Preparation of Optical Film)

The procedure of Example 48 was repeated except that the above-prepared coating solution was used, to prepare an optical film.

EXAMPLE 50

(Preparation of Coating Solution for Polarizing Layer)

In 150 g of ethyl acetate, 48 g of Compound (515), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

With 200 g of the aqueous solution for continuous phase prepared in Example 48, 200 g of the above-prepared solution was mixed. The mixture was then dispersed with an ultrasonic disperser to prepare a coating solution for polarizing layer.

(Preparation of Optical Film)

The procedure of Example 48 was repeated except that the above-prepared coating solution was used, to prepare an optical film.

EXAMPLE 51

(Preparation of Coating Solution for Polarizing Layer)

In 150 g of ethyl acetate, 48 g of Compound (516), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

With 200 g of the aqueous solution for continuous phase prepared in Example 48, 200 g of the above-prepared solution was mixed. The mixture was then dispersed with an ultrasonic disperser to prepare a coating solution for polarizing layer.

(Preparation of Optical Film)

The procedure of Example 48 was repeated except that the above-prepared coating solution was used, to prepare an optical film.

EXAMPLE 52

(Preparation of Coating Solution for Polarizing Layer)

In 150 g of ethyl acetate, 48 g of Compound (519), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 µm) to prepare a solution of polymerizable liquid crystal for discontinuous phase.

With 200 g of the aqueous solution for continuous phase prepared in Example 48, 200 g of the above-prepared solution was mixed. The mixture was then dispersed with an ultrasonic disperser to prepare a coating solution for polarizing layer.

(Preparation of Optical Film)

The procedure of Example 48 was repeated except that the above-prepared coating solution was used, to prepare an optical film.

EXAMPLE 53

(Preparation of Coating Solution for Polarizing Layer)

In 150 g of ethyl acetate, 48 g of Compound (505) was dissolved. The solution was filtered through a polypropylene filter (porous size: 30 µm) to prepare a solution of polymerizable liquid crystal for discontinuous phase.

With 200 g of the aqueous solution for continuous phase prepared in Example 48, 200 g of the above-prepared solution was mixed. The mixture was then dispersed with an ultrasonic disperser to prepare a coating solution for polarizing layer.

(Preparation of Optical Film)

The coating solution for polarizing layer was applied from a die onto a polyethylene terephthalate (PET) support film (thickness: 6 μm), and then dried to form a polarizing layer. The amount of applied solution was adjusted so that the formed polarizing layer may have a thickness of 35 μm. After peeled from the PET support film, the prepared film was stretched by 2.5 times at 60° C./40% RH. Thus, an optical film was prepared.

(Evaluation of Optical Film)

The optical films prepared in Examples 48 to 53 were evaluated in the same manners as those in Examples 1 to 5.

The results are set forth in Table 6. As shown in Table 6, each film of Examples 48 to 53 has transmittances in parallel and perpendicular of 46% or less and 91% or more, respectively. This means that those films have high polarizability.

The films of Examples 48 to 53 were stored at 40° C., 80% RH for 3 days. Even after the storage, the films of Examples 48 to 52 exhibited the same polarizability as before because the alignments of liquid crystal molecules in these films were fixed well by the polymerizable groups of the molecules. On the other hand, the films of Example 53 and Comparison Example 1 exhibited remarkably impaired polarizability because the liquid crystal compound in these films had no polymerizable group and hence the liquid crystal molecules were not fixed.

TABLE 6

| Optical film | Birefringence | Transmittance | | Haze | | Particle Size*) |
| --- | --- | --- | --- | --- | --- | --- |
| | | Parallel | Perpendicular | Parallel | Perpendicular | |
| Ex. 48 | <0.01 | 44.3 | 92.6 | 87.9 | 13.8 | 0.29 μm |
| Ex. 49 | <0.01 | 44.5 | 91.8 | 87.3 | 14.0 | 0.32 μm |
| Ex. 50 | <0.01 | 45.2 | 92.0 | 86.9 | 14.0 | 0.28 μm |
| Ex. 51 | <0.01 | 45.3 | 91.6 | 87.4 | 14.6 | 0.25 μm |
| Ex. 52 | <0.01 | 45.5 | 91.2 | 86.7 | 14.3 | 0.30 μm |
| Ex. 53 | <0.01 | 45.0 | 91.3 | 87.2 | 14.1 | 0.28 μm |

Remarks
*)Particle size of discontinuous phase

EXAMPLE 54

A protective film on one side of a commercially available iodine polarizing plate was replaced with the optical film prepared in Example 48. The film was laminated on the plate, so that the saponified triacetyl cellulose surface without the polarizing layer may be contact with the polarizing layer containing iodine. Thus, a polarizing plate of light-scattering type was prepared.

EXAMPLE 55

The coating solution for polarizing layer prepared in Example 53 was cast onto a band from a die, and then dried. The amount of cast solution was adjusted so that the formed film may have a thickness of 40 μm. After peeled from the band, the film was stretched by 2.5 times at 25° C. under a dry condition. The stretched film was then pressed and laminated without adhesion onto an iodine-adsorbed polyvinyl alcohol film beforehand stretched by six times. The formed composition was immersed in 100 g/l boric acid aqueous solution at 70° C. for 5 minutes, and washed in a water tank at 20° C. for 10 seconds. After the composition was dried at 80° C. for 5 minutes, a saponified triacetyl cellulose film (Fuji Photo Film Co., Ltd.) was laminated on each surface of the composition with a 5 wt. % aqueous solution of polyvinyl alcohol (PVA 117, Kuraray Ltd.) as an adhesive. The thus-prepared composition was dried at 120° C. to obtain a polarizing plate of light-scattering type.

Each polarizing plate of light-scattering type prepared in Examples 54 and 55 was laid on an aluminum reflection plate. Independently, a conventional polarizing plate was also laid on the reflection plate. The plates were placed so that their polarizing layers might be on the reflection plate side. The thus-placed plates were observed and compared with each other. As a result, the reflection plate under each polarizing plate of the invention was seen more brightly than that under the conventional one. This indicated that the efficiency of light was improved in the plate of the invention. The reflection plate under the plate of Example 54 or 55 reflects incident light. In the reflected light, a component of polarized in the transparent axis passes through the polarizing layer. The other component scattered backward was reflected again by the reflection plate, and partially reenters the polarizing layer to improve the efficiency of light. Those plates of light-scattering type were stored at 40° C., 80% RH for 3 days. Even after the storage, the plates still improve the brightness as well as before. This indicates that the alignment of liquid crystal molecules was fixed by crosslinking of boric acid even though the molucules contain no polyerizable group

EXAMPLE 56

The optical film prepared in Example 48 was used to prepare the liquid crystal display shown in FIG. 3. The image on the display was obliquely seen, and thereby it was confirmed that the display gave a bright image.

EXAMPLE 57

The polarizing plate of light-scattering type prepared in Example 55 was used to prepare the liquid crystal display shown in FIG. 4. The image on the display was obliquely seen, and thereby it was confirmed that the display gave a bright image.

EXAMPLE 58

(Preparation of Coating Solution for Polarizing Layer)

In 28 g of ethyl acetate, 4 g of Compound (601), 2 g of Compound (3), 2 g of the following compound (a), 2 g of Compound (33), 2 g of the following compound (b), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

Independently, 4.0 g of sodium dodecylbenzenesulfonate (surface active agent) was added into 2,000 g of 20 wt. % polyvinyl alcohol aqueous solution (PVA 205, Kuraray Co., Ltd.). The solution was filtered through a polypropylene filter (porous size: 30 μm) to prepare an aqueous solution for continuous phase.

A mixture of 40 g of the above solution of polymerizable liquid crystal for discontinuous phase and 200 g of the aqueous solution for continuous phase was prepared, and dispersed with an ultrasonic disperser to prepare a coating solution for polarizing layer.

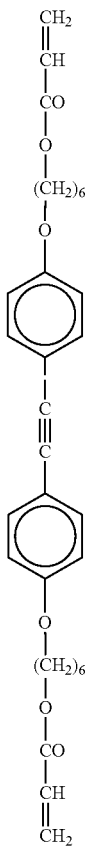

(a)

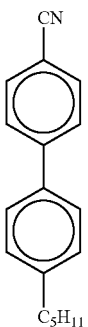

(b)

(Preparation of Optical Film)

The coating solution for polarizing layer was cast from a die onto a band, and then dried to form a film of 100 μm thickness. After peeled from the band, the film was stretched by twice at 40° C./60% RH. The film was then immersed in 100 g/l boric acid aqueous solution at 70° C. for 5 minutes, and washed in a water tank at 20° C. for 10 seconds. After dried at 80° C. for 5 minutes, the film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 59

(Preparation of Coating Solution for Polarizing Layer)

In 27.3 g of ethyl acetate, 5 g of Compound (609), 2.3 g of Compound (3), 1.5 g of the above compound (a), 2 g of Compound (33), 1.5 g of the above compound (b), 1.0 g of a mixture of dipentaerythritolpentaacrylate and dipentaerythritolhexaacrylate (DPHA, Nippon Kayaku Co., Ltd.) and 1.0 g of photopolymerization initiator (Irgacure 907, Ciba-Geigy) were dissolved. The solution was filtered through a polypropylene filter (porous size: 30 μm) to prepare a solution of polymerizable liquid crystal for discontinuous phase.

A mixture of 40 g of the above solution of polymerizable liquid crystal for discontinuous phase and 200 g of the aqueous solution for continuous phase prepared in Example 58 was prepared, and dispersed with an ultrasonic disperser to prepare a coating solution for polarizing layer.

(Preparation of Optical Film)

The coating solution for polarizing layer was cast from a die onto a band, and then dried to form a film of 100 μm thickness. After peeled from the band, the film was stretched by twice at 40° C./60% RH. The film was then immersed in 100 g/l boric acid aqueous solution at 70° C. for 5 minutes, and washed in a water tank at 20° C. for 10 seconds. After dried at 80° C. for 5 minutes, the film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 60

(Preparation of Coating Solution for Polarizing Layer)

In 28 g of ethyl acetate, 4 g of Compound (620), 2 g of Compound (3), 2 g of the above compound (a), 2 g of Compound (33) and 2 g of the above compound (b) were dissolved. The solution was filtered through a polypropylene filter (porous size: 30 μm) to prepare a solution of polymerizable liquid crystal for discontinuous phase.

A mixture of 40 g of the above solution for discontinuous phase and 200 g of the aqueous solution for continuous phase prepared in Example 58 was prepared, and dispersed with an ultrasonic disperser to prepare a coating solution for polarizing layer.

(Preparation of Optical Film)

The coating solution for polarizing layer was cast from a die onto a band, and then dried to form a film of 100 μm thickness. After peeled from the band, the film was stretched by twice at 40° C./60% RH. The film was then immersed in 100 g/l boric acid aqueous solution at 70° C. for 5 minutes, and washed in a water tank at 20° C. for 10 seconds. After dried at 80° C. for 5 minutes, the film was exposed to ultraviolet light (200 mW/cm$^2$, 400 mJ/cm$^2$) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 61

(Preparation of Coating Solution for Polarizing Layer)

In 28 g of ethyl acetate, 10 g of Compound (621), 0.5 g of Compound (3), 0.5 g of the above compound (a), 0.5 g of Compound (33) and 0.5 g of the above compound (b) were dissolved. The solution was filtered through a polypropylene filter (porous size: 150 μm) to prepare a solution of polymerizable liquid crystal for discontinuous phase.

A mixture of 40 g of the above solution for discontinuous phase and 200 g of the aqueous solution for continuous phase prepared in Example 58 was prepared, and dispersed with an ultrasonic disperser to prepare a coating solution for polarizing layer.

(Preparation of Optical Film)

The coating solution for polarizing layer was cast from a die onto a band, and then dried to form a film of 100 μm thickness. After peeled from the band, the film was stretched by twice at 40° C./60% RH. The film was then immersed in 100 g/l boric acid aqueous solution at 70° C. for 5 minutes, and washed in a water tank at 20° C. for 10 seconds. After dried at 80° C. for 5 minutes, the film was exposed to ultraviolet light (200 mW/cm², 400 mJ/cm²) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

EXAMPLE 62

(Preparation of Coating Solution for Polarizing Layer)

In 28 g of ethyl acetate, 4 g of Compound (623), 2.2 g of Compound (3), 2 g of the above compound (a), 2.5.g of Compound (33) and 1.3 g of the above compound (b) were dissolved. The solution was filtered through a polypropylene filter (porous size: 30 μm) to prepare a solution of polymerizable liquid crystal for discontinuous phase.

A mixture of 40 g of the above solution for discontinuous phase and 200 g of the aqueous solution for continuous phase prepared in Example 58 was prepared, and dispersed with an ultrasonic disperser to prepare a coating solution for polarizing layer.

(Preparation of Optical Film)

The coating solution for polarizing layer was cast from a die onto a band, and then dried to form a film of 100 μm thickness. After peeled from the band, the film was stretched by twice at 40° C./60% RH. The film was then immersed in 100 g/l boric acid aqueous solution at 70° C. for 5 minutes, and washed in a water tank at 20° C. for 10 seconds. After dried at 80° C. for 5 minutes, the film was exposed to ultraviolet light (200 mW/cm², 400 mJ/cm²) emitted from a 160 W/cm air-cooling metal halide lamp (Eyegraphics Co., Ltd., wavelength region: 200 to 500 nm, maximum intensity was given at 365 nm), so as to harden the discontinuous phase. Thus, an optical film was prepared.

(Evaluation of Optical Film)

The optical films prepared in Examples 58 to 62 were evaluated in the same manners as those in Examples 1 to 5 immediately after they were prepared and after they were stored under 40° C./80% RH for 7 days.

The results are set forth in Table 7. As shown in Table 7, each film of Examples 58 to 62 has transmittances in parallel and perpendicular of 60% or less and 75% or more, respectively. This means that those films have high polarizability. Further, all the film had good shelf lives.

TABLE 7

| Optical film | Birefringence | Transmittance | | Haze | | Particle size*) |
|---|---|---|---|---|---|---|
| | | Parallel | Perpendicular | Parallel | Perpendicular | |
| (immediately after preparation) | | | | | | |
| Ex. 58 | 0.015 | 34.5 | 84.2 | 88.5 | 19.1 | 0.52 μm |
| Ex. 59 | 0.015 | 33.1 | 83.4 | 87.4 | 18.4 | 0.51 μm |
| Ex. 60 | 0.015 | 35.5 | 83.2 | 88.7 | 17.8 | 0.49 μm |
| Ex. 61 | 0.015 | 34.9 | 81.5 | 87.1 | 18.7 | 0.50 μm |
| Ex. 62 | 0.015 | 34.8 | 82.8 | 88.3 | 17.9 | 0.53 μm |
| (after 7 days) | | | | | | |
| Ex. 58 | 0.015 | 34.4 | 83.6 | 88.1 | 19.7 | 0.52 μm |
| Ex. 59 | 0.015 | 33.3 | 83.2 | 87.3 | 18.6 | 0.51 μm |
| Ex. 60 | 0.015 | 35.6 | 82.7 | 88.6 | 18.1 | 0.49 μm |
| Ex. 61 | 0.015 | 34.8 | 81.1 | 87.1 | 17.9 | 0.50 μm |
| Ex. 62 | 0.015 | 34.9 | 82.6 | 88.3 | 18.0 | 0.53 μm |

Remarks
*)Particle size of discontinuous phase

EXAMPLE 63

A protective film on one side of a commercially available iodine polarizing plate was replaced with the optical film prepared in Example 58. The film was laminated on the plate, so that the saponified triacetyl cellulose surface without the polarizing layer may be contact with the polarizing layer containing iodine. Thus, a polarizing plate of light-scattering type was prepared.

EXAMPLE 64

The coating solution for polarizing layer prepared in Example 62 was cast onto a band from a die, and then dried. The amount of cast solution was adjusted so that the formed film may have a thickness of 40 μm. After peeled from the band, the film was stretched by 2.5 times at 40° C./60% RH. The stretched film was then pressed and laminated without adhesion onto an iodine-adsorbed polyvinyl alcohol film beforehand stretched by six times. The formed composition was immersed in 100 g/l boric acid aqueous solution at 70° C. for 5 minutes, and washed in a water tank at 20° C. for 10 seconds. After the composition was dried at 80° C. for 5 minutes, a saponified triacetyl cellulose film (Fuji Photo Film Co., Ltd.) was laminated on each surface of the composition with a 5 wt. % aqueous solution of polyvinyl alcohol (PVA 117, Kuraray Ltd.) as an adhesive. The thus-prepared composition was dried at 120° C. to obtain a polarizing plate of light-scattering type.

Each polarizing plate of light-scattering type prepared in Examples 63 and 64 was laid on an aluminum reflection plate. Independently, a conventional polarizing plate was also laid on the reflection plate. The plates were placed so that their polarizing layers might be on the reflection plate side. The thus-placed plates were observed and compared with each other. As a result, the reflection plate under each polarizing plate of the invention was seen more brightly than that under the conventional one. This indicated that the efficiency of light was improved in the plate of the invention. The reflection plate under the plate of Example 63 or 64 reflects incident light. In the reflected light, a component of polarized in the transparent axis passes through the polarizing layer. The other component scattered backward was reflected again by the reflection plate, and partially reenters the polarizing layer to improve the efficiency of light.

EXAMPLE 65

The optical film prepared in Example 58 was used to prepare the liquid crystal display shown in FIG. 3. The image on the display was obliquely seen, and thereby it was confirmed that the display gave a bright image.

EXAMPLE 66

The optical film prepared in Example 62 was used to prepare the liquid crystal display shown in FIG. 4. The image on the display was obliquely seen, and thereby it was confirmed that the display gave a bright image.

We claim:

1. An optical film comprising a transparent support and a linearly polarizing layer which selectively transmits polarized light and which selectively reflects or scatters other polarized light, wherein the linearly polarizing layer contains a liquid crystal compound represented by the following formula (I), wherein the compound has a fixed alignment:

$$Ar^1—C\equiv C—Ar^3—C\equiv C—Ar^2 \qquad (I)$$

in which each of $Ar^1$ and $Ar^2$ independently is a monovalent aromatic hydrocarbon group, and $Ar^3$ is a divalent aromatic five-membered heterocyclic group, a divalent condensed aromatic five-membered heterocyclic group or a divalent aromatic group formed by connecting two or three groups thereof.

2. The optical film as defined in claim 1, wherein at least one of $Ar^1$, $Ar^2$ and $Ar^3$ has a substituent group containing hydroxyl.

3. The optical film as defined in claim 1, wherein the linearly polarizing layer comprises an optically isotropic phase and an optically anisotropic phase.

4. The optical film as defined in claim 3, wherein the optically anisotropic phase contains the compound represented by the formula (I).

5. The optical film as defined in claim 3, wherein the film has the minimum difference between the refractive index of the optically isotropic phase and that of the optically anisotropic phase of less than 0.05 along a direction in a surface plane of the film.

6. The optical film as defined in claim 3, wherein the optically isotropic phase or the optically anisotropic phase is a discontinuous phase having a mean particle size of 0.01 to 1.0 μm.

7. The optical film as defined in claim 3, wherein the optically isotropic phase is a continuous phase while the optically anisotropic phase is a discontinuous phase.

8. The optical film as defined in claim 1, wherein the film has a polarizing plane perpendicular to a surface plane of the film, and wherein the film at the polarizing plane has the maximum transmittance for all rays along the transmittance axis of more than 75% and the minimum transmittances for all rays along the non-transmittance axis of less than 60%.

9. The optical film as defined in claim 1, wherein the compound represented by the formula (I) has a polymerizable group.

10. The optical film as defined in claim 9, wherein the alignment is fixed by polymerization of the compound represented by the formula (I).

11. The optical film as defined in claim 10, wherein the polymerization of the compound represented by the formula (I) is conducted by exposing the film to ultraviolet light.

12. The optical film as defined in claim 1, wherein the linearly polarizing layer is formed by stretching the film by ten times or less.

13. The optical film as defined in claim 1, wherein the alignment is fixed by crosslinking of boric acid.

14. The optical film as defined in claim 13, wherein the crosslinking of the boric acid is conducted by immersing the film in a solution of the boric acid.

15. A liquid crystal display which comprises a liquid crystal cell in which a liquid crystal compound is sealed between a pair of substrates having a transparent electrode and a pixel electrode, and also which comprises a pair of polarizing plates sandwiching the liquid crystal cell, wherein the optical film defined in claim 1 is provided between a backlight and the polarizing plate on the backlight side of the cell.

16. A polarizing plate comprising a polarizing element of light-scattering type and a polarizing element of light-absorbing type, said polarizing element of light-scattering type selectively transmitting polarized light and selectively reflecting or scattering other polarized light, and said polarizing element of light-absorbing type selectively transmitting polarized light and selectively absorbing other polarized light, wherein the polarizing element of light-scattering type has a linearly polarizing layer comprising an optically isotropic phase and an optically anisotropic phase, wherein the polarizing element of light-scattering type has a polarizing plane perpendicular to a surface plane of the polarizing element, the polarizing element of light-scattering type at the polarizing plane has the maximum transmittance for all rays along the transmittance axis of more than 75% and the minimum transmittances for all rays along the non-transmittance axis of less than 60%, wherein an axis having the polarizing plane giving the maximum transmittance for all rays is essentially parallel to the transmittance axis of the polarizing element of light-absorbing type, and wherein the optically anisotropic phase contains a compound represented by the following formula (I), wherein the compound has a fixed alignment:

$$Ar^1—C\equiv C—Ar^3—C\equiv C—Ar^2 \qquad (I)$$

in which each of $Ar^1$ and $Ar^2$ independently is a monovalent aromatic hydrocarbon group, and $Ar^3$ is a divalent aromatic five-membered heterocyclic group, a divalent condensed aromatic five-membered heterocyclic group or a divalent aromatic group formed by connecting two or three groups thereof.

17. A liquid crystal display comprising a backlight, a polarizing plate, a liquid crystal cell and another polarizing plate in this order, wherein the polarizing plate placed between the backlight and the liquid crystal cell comprises a polarizing element of light-scattering type and a polarizing element of light-absorbing type, said polarizing element of light-scattering type selectively transmitting polarized light and selectively reflecting or scattering other polarized light, and said polarizing element of light-absorbing type selectively transmitting polarized light and selectively absorbing other polarized light, wherein the polarizing element of light-scattering type has a linearly polarizing layer comprising an optically isotropic phase and an optically anisotropic phase, wherein the polarizing element of light-scattering type has a polarizing plane perpendicular to a surface plane of the polarizing element, the polarizing element of light-scattering type at the polarizing plane has the maximum transmittance for all rays along the transmittance axis of more than 75% and the minimum transmittances for all rays along the non-transmittance axis of less than 60%, wherein an axis having the polarizing plane giving the maximum transmittance for all rays is essentially parallel to the transmittance axis of the polarizing element of light-absorbing type, and wherein the optically anisotropic phase contains a compound represented by the following formula (I), wherein the compound has a fixed alignment:

$$Ar^1\text{—}C\!\equiv\!C\text{—}Ar^3\text{—}C\!\equiv\!C\text{—}Ar^2 \qquad (I)$$

in which each of $Ar^1$ and $Ar^2$ independently is a monovalent aromatic hydrocarbon group, and $Ar^3$ is a divalent aromatic five-membered heterocyclic group, a divalent condensed aromatic five-membered heterocyclic group or a divalent aromatic group formed by connecting two or three groups thereof.

* * * * *